(12) United States Patent
Hsu et al.

(10) Patent No.: US 11,421,048 B2
(45) Date of Patent: Aug. 23, 2022

(54) DUAL ACTIVATED MICROGEL

(71) Applicant: Lubrizol Advanced Materials, Inc., Cleveland, OH (US)

(72) Inventors: Shui-Jen Raymond Hsu, Foothill Ranch, CA (US); Dongcui Li, North Royalton, OH (US); Sinan Li, Hudson, OH (US); Robert Jacobs, Olmsted Falls, OH (US)

(73) Assignee: Lubrizol Advanced Materials, Inc., Cleveland, OH (US)

( * ) Notice: Subject to any disclaimer, the term of this patent is extended or adjusted under 35 U.S.C. 154(b) by 222 days.

(21) Appl. No.: 16/634,939

(22) PCT Filed: May 4, 2018

(86) PCT No.: PCT/US2018/031128
§ 371 (c)(1),
(2) Date: Jan. 29, 2020

(87) PCT Pub. No.: WO2018/204812
PCT Pub. Date: Nov. 8, 2018

(65) Prior Publication Data
US 2020/0255568 A1 Aug. 13, 2020

Related U.S. Application Data

(60) Provisional application No. 62/501,183, filed on May 4, 2017.

(51) Int. Cl.
*C11D 1/00* (2006.01)
*C11D 3/37* (2006.01)
*C08F 2/18* (2006.01)
*C08F 2/20* (2006.01)
*C08F 220/14* (2006.01)
*C08F 220/18* (2006.01)
*C08F 220/20* (2006.01)

(52) U.S. Cl.
CPC .......... *C08F 2/18* (2013.01); *C08F 220/1802* (2020.02); *C11D 3/3765* (2013.01)

(58) Field of Classification Search
CPC .......... C11D 1/00; C11D 3/37; C11D 3/3707; C11D 3/3746; C11D 3/3757; C11D 3/3796; C08F 2/001; C08F 2/18; C08F 2/20; C08F 220/14; C08F 220/18; C08F 220/1802; C08F 220/1804; C08F 220/20; C08F 220/286
See application file for complete search history.

(56) References Cited

U.S. PATENT DOCUMENTS

2007/0197704 A1   8/2007   Walter et al.

FOREIGN PATENT DOCUMENTS

WO   2012/006402 A1   1/2012
WO   2012/044929 A2   4/2012
(Continued)

*Primary Examiner* — Brian P Mruk
(74) *Attorney, Agent, or Firm* — Thoburn Dunlap

(57) ABSTRACT

Disclosed are staged emulsion polymers comprising a crosslinked first stage polymer and a subsequently polymerized linear or slightly crosslinked second stage polymer segment. The staged emulsion polymers possess a dual activation mechanism and provide desirable rheological, clarity, and aesthetic properties in aqueous and aqueous surfactant containing compositions.

38 Claims, 4 Drawing Sheets

(56) References Cited

FOREIGN PATENT DOCUMENTS

| WO | 2013/040174 A1 | 3/2013 | |
| WO | WO 2016/007313 * | 1/2016 | ........... C09D 113/02 |
| WO | 2016/100183 A1 | 6/2016 | |
| WO | 2016/100466 A1 | 6/2016 | |
| WO | 2016/106168 A1 | 6/2016 | |

* cited by examiner

DUAL ACTIVATED MICROGEL

CROSS REFERENCE TO RELATED APPLICATION

This application claims priority from PCT Application Serial No. PCT/US2018/031128 filed on May 4, 2018, which claims the benefit of U.S. Provisional Application No. 62/501,183 filed on May 4, 2017, both of which are incorporated in their entirety by reference herein.

TECHNICAL FIELD

In one aspect, the present technology relates to staged core-shell polymers comprising a crosslinked core and a linear to slightly crosslinked outer shell. In another aspect, the technology relates to a staged or core-shell polymer thickener suitable for use in aqueous systems. A further aspect of the invention relates to the formation of stable yield stress fluid compositions containing a staged core-shell polymer rheology modifier, water, an optional surfactant, and various components that are substantially insoluble materials requiring suspension or stabilization within the fluid. Additionally, a further aspect of the invention relates to the formation of clear, rheologically and phase stable surfactant compositions.

BACKGROUND OF THE INVENTION

Rheology modifiers, also referred to as thickeners or viscosifiers, are ubiquitous in surfactant containing personal care and home care formulations. Rheological properties (e.g., viscosity and flow characteristics, shear thinning, spreadability, and the like), aesthetic properties (e.g., clarity, foamability, sensory effects, and the like), mildness (dermal and ocular irritation mitigation), and the ability to suspend and stabilize soluble and insoluble components within a surfactant based formulation are often modified by the addition of a thickener. The ability of a fluid material to stably suspend insoluble and/or particulate materials is determined by its yield stress properties. Simply stated, yield stress fluids remain stationary until a sufficient stress is placed on the fluid at which point the fluid will flow. It can be thought of as the initial resistance to flow under stress and is also referred to as yield value. Yield stress is a measurable quantity similar to, but not dependent on viscosity. While a certain rheology modifier may thicken or enhance the viscosity of a composition in which it is included, it does not necessarily have desirable yield stress properties. In some cases, suspension with easy pourability (no gelling or thickening) is also highly desired, especially in many home care applications.

A desirable yield stress property is critical to achieving certain physical and aesthetic characteristics in a liquid medium, such as the indefinite suspension of particles, insoluble liquid droplets, or the stabilization of gas bubbles within a liquid medium. Particles dispersed in a liquid medium will remain suspended if the yield stress (yield value) of the medium is sufficient to overcome the effect of gravity or buoyancy on those particles. Insoluble liquid droplets can be prevented from rising and coalescing and gas bubbles can be suspended and uniformly distributed in a liquid medium using yield value as a formulating tool. An example of a yield stress fluid is a microgel rheology modifier which is used generally to adjust or modify the rheological properties of aqueous compositions. Such properties include, without limitation, viscosity, flow rate, stability to viscosity change over time, and the ability to suspend particles. They are useful in many consumer and industrial applications. An important consumer application includes their use in the formulation of personal care and home care products such as body washes, hand cleansers, skin creams, toothpastes, shampoos, hair gels and other cosmetics. Home care products include laundry detergents, dish washing detergents (manual and automatic), hard surface and bathroom cleaners. In industrial applications, they are useful as subterranean treatment fluids in the oil and gas industry as a component in drilling and fracturing fluids. Typically, they comprise chemically crosslinked polymers having a pH responsive functionality that is either base or acid sensitive. The polymers may be mixed with other ingredients in a formulation and then neutralized by the addition of a neutralization agent such as an acid or a base. Acid sensitive thickeners are activated upon contact with an acidic agent, while base-sensitive thickeners are activated upon contact with an alkaline agent. Upon neutralization, these polymers swell significantly to form a randomly closely packed (RCP) jammed network of swollen crosslinked microgel particles imparting a desired rheological profile, i.e., yield stress, elastic modulus, and viscosity, as well as optical clarity to the formulation.

These types of rheology modifiers are well known in the art. For example, U.S. Pat. Nos. 2,798,053; 2,858,281; 3,032,538; and 4,758,641 describe cross-linked carboxylic acid polymers based on acrylic acid, maleic acid, itaconic acid or methacrylic acid monomers. U.S. Pat. No. 6,635,702 describes crosslinked alkali-swellable emulsion (ASE) copolymers comprising one or more carboxylic acid monomers and one or more non-acid vinyl monomers. U.S. Pat. No. 7,378,479 discloses a crosslinked acid-swellable polymer containing at least one basic amino substituent that is cationic at low pH, at least one hydrophobically modified polyoxyalkylene substituent derived from an associative vinyl monomer, and at least one polyoxyalkylene substituent derived from a semihydrophobic vinyl surfactant monomer. A key feature of these pH-responsive microgels is the very large increase in diameter (or size) of individual crosslinked polymer particles upon neutralization. The high swelling efficiency allows formulators to achieve the desired yield stress and viscosity using relatively small amounts of polymer resulting in low cost-in-use.

Although pH-responsive microgels provide yield stress fluids with the high efficiency that is desired by the formulator, they suffer from a major disadvantage. Rheological properties are not uniform across a broad range of pH and show sharp changes as a function of pH. Moreover, formulators must be careful not to use ingredients that may interfere with and reduce the thickening efficiencies of acid or base neutralizable polymer thickeners. To overcome these difficulties, various nonionic thickeners have been proposed. U.S. Pat. No. 4,722,962 describes nonionic associative thickeners comprising a water-soluble monoethylenically unsaturated monomer and a nonionic urethane monomer. These polymers provide increases in viscosity or thickening of aqueous formulations that is relatively independent of pH but the polymers are not cross-linked and the purely associative interactions do not create a yield stress or easy pourability.

Recently, a new class of rheology modifying polymer has been developed as disclosed in International Patent Application Publication Nos. WO 2013/040174 and WO 2016/00183. The rheology modifying polymers disclosed in these publications are crosslinked, nonionic, amphiphilic polymers prepared by a single stage emulsion polymerization process of alkyl (meth)acrylate, hydroxyalkyl (meth)acrylate and an associative and/or a semihydrophobic monomers. The disclosed rheology modifiers make use of surfactant mediated swelling and interaction instead of acid or basic group neutralization (ionization) to provide rheological performance that is independent of pH. While this new surfactant activated rheology modifying polymer is independent of pH, a drawback is that it may lose thickening and yield stress efficiencies in mixtures of different surfactant types, or in highly concentrated ethoxylated surfactant containing formulations (i.e., ethoxylated alcohols), requiring higher polymer dosage levels.

There is a need for a rheology modifying polymer that offers the attributes of a pH dependent thickener and a pH independent surfactant activated thickener without the concomitant drawbacks of each polymer system, and provides efficient thickening, suspension, easy pour and excellent clarity attributes across a wide pH range in aqueous as well as in highly concentrated surfactant containing compositions.

SUMMARY OF THE INVENTION

In one aspect, embodiments of the disclosed technology relate to a staged emulsion polymer comprising a crosslinked first stage (core) and a linear or optionally lightly crosslinked second stage (shell).

In one aspect, an embodiment of the disclosed technology relates to a staged polymer comprising a crosslinked acrylic based first stage polymer, and a linear acrylic based second stage polymer.

In one aspect, an embodiment of the disclosed technology relates to a staged polymer comprising a crosslinked acrylic based first stage polymer, and a lightly crosslinked acrylic based second stage polymer.

In one aspect, an embodiment of the disclosed technology relates to a thickened aqueous composition comprising a staged emulsion polymer comprising a crosslinked first stage polymer (core) and a linear or optionally lightly crosslinked second stage polymer (shell).

In one aspect, an embodiment of the disclosed technology relates to a thickened surfactant containing aqueous composition comprising a crosslinked acrylic based first stage polymer, and a linear acrylic based second stage polymer, wherein the surfactant is selected from an anionic surfactant, a cationic surfactant, an amphoteric surfactant, a nonionic surfactant, and mixtures thereof.

In one aspect, an embodiment of the disclosed technology relates to a thickened surfactant containing aqueous composition comprising a crosslinked acrylic based first stage polymer, and a lightly crosslinked acrylic based second stage polymer, wherein the surfactant is selected from an anionic surfactant, a cationic surfactant, an amphoteric surfactant, a nonionic surfactant, and mixtures thereof.

In one aspect, an embodiment of the disclosed technology relates to a rheology modifier comprising a staged polymer comprising a crosslinked acrylic based first stage polymer, and a linear acrylic based second stage polymer, wherein said polymer can be activated by alkali neutralization, surfactant mediated swelling, and combinations thereof.

In one aspect, an embodiment of the disclosed technology relates to a rheology modifier comprising a staged polymer comprising a crosslinked acrylic based first stage polymer, and a lightly crosslinked acrylic based second stage polymer, wherein said polymer can be activated by alkali neutralization, surfactant mediated swelling, and combinations thereof.

In one aspect, an embodiment of the disclosed technology relates to a rheology modifier comprising a staged polymer comprising a crosslinked acrylic based first stage polymer, and a linear acrylic based second stage polymer, wherein said polymer delivers enhanced temperature stabilities when formulated into personal care, home care, institutional and industrial care products.

A further aspect of the disclosed technology relates to staged polymer particles comprising, or consisting of, or consisting essentially of: (A) from about 50 to about 95, or from about 70 to about 93, or from about 80 to about 90 percent by weight of a first stage crosslinked polymer core which is prepared by polymerizing a first monomer mixture comprising: (a) from about 25 to about 60, or from about 30 to about 55, or from about 35 to about 50 weight percent of at least one $C_1$-$C_8$ alkyl (meth)acrylate monomer; (b) from about 10 to about 30, or from about 12 to about 25, or from about 15 to about 20 weight percent of at least one ethylenically unsaturated $C_3$-$C_6$ carboxylic acid monomer; (c) from about 10 to about 40, or from about 15 to about 35, or from about 18 to about 30 weight percent of at least one $C_1$-$C_5$ hydroxyalkyl ester of (meth)acrylic acid monomer; (d) from about 1 to about 20, or from about 2 to about 10, or from about 3 to about 5 weight percent of at least one monomer selected from an associative monomer, a semihydrophobic monomer, and mixtures thereof; and (e) from about 0.05 to about 1.5, or from about 0.5 to about 1.25, or from about 0.7 to about 1, or from about 0.75 to about 0.9 weight percent of at least one crosslinker (per 100 parts by weight of the monomer mixture); and (B) from about 5 to about 50, or from about 7 to about 30, or from about 10 to about 20 percent by weight of a second stage polymer shell which is prepared by polymerizing a second monomer mixture comprising: (a') from about 20 to about 60 or from about 25 to about 50, or from about 30 to about 45 weight percent of at least one $C_1$-$C_8$ alkyl (meth)acrylate monomer; (b') from about 0 to about 40 or from about 15 to about 35, or from about 20 to about 30 weight percent of at least one ethylenically unsaturated $C_3$-$C_6$ carboxylic acid monomer; (c') from about 0 to about 40 or from about 15 to about 35, or from about 20 to about 30 weight percent of at least one $C_1$-$C_5$ hydroxyalkyl ester of (meth)acrylic acid; (d') from about 0 to about 10, or from about 0.1 to about 7, or from about 1 to about 5 weight percent of at least one monomer selected from an associative monomer, a semi-hydrophobic monomer, and mixtures thereof; and (e') from about 0 to about 0.3, or from about 0.01 to about 0.25, or from about 0.1 to about 0.2 parts by weight of at least one crosslinker (per 100 parts by weight of the monomer mixture), subject to the proviso that when present said the at least one second stage crosslinker ranges from about greater than 0 percent to about 25 percent, or from about 0.01 to about 20 percent of the amount of crosslinker in said first monomer mixture.

In one aspect, embodiments of the present invention relate to polymer compositions comprising staged, structured, or core-shell polymer morphologies.

DETAILED DESCRIPTION

Figure 1:
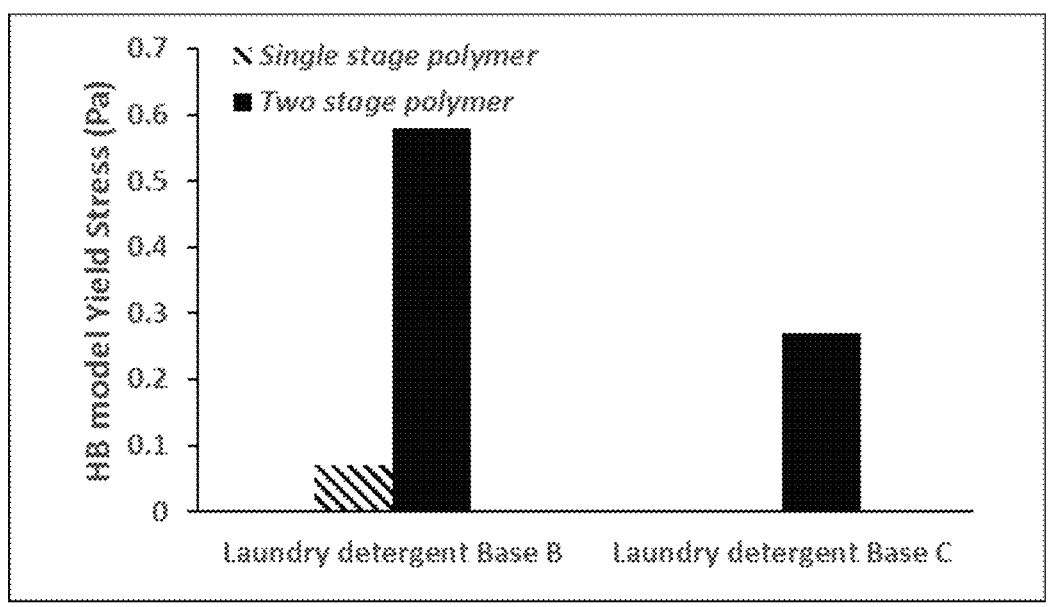
FIG. 1 is a graph comparing the Herschel-Bulkley yield stress values of the laundry bases of Example 12(B) and Example 13(C) each separately formulated with 2.5 wt. % of the two-stage polymer of Example 2 and 2.5 wt. % of the single stage polymer of Comparative Example 1.

Exemplary embodiments in accordance with the disclosed technology will be described. Various modifications, adaptations or variations of the exemplary embodiments described herein may become apparent to those skilled in the art as such are disclosed. It will be understood that all such modifications, adaptations or variations that rely upon the teachings of the present technology, and through which these teachings have advanced the art, are considered to be within the scope and spirit of the present technology.

The polymers and compositions of the present invention may suitably comprise, consist of, or consist essentially of the components, elements, and process delineations described herein. The invention illustratively disclosed herein suitably may be practiced in the absence of any element which is not specifically disclosed herein.

Unless otherwise stated, all percentages, parts, and ratios expressed herein are based upon weight of the total compositions of the present invention.

As used herein and throughout the specification, the term "staged polymer particle" means a polymer particle prepared by a sequential or a staged emulsion polymerization process wherein a first stage monomer mixture is polymerized to completion or near completion to yield a first stage polymer (core) followed by polymerizing a second stage monomer mixture in the presence of the first stage polymer to yield a second stage polymer (shell). Without being bound to any theory, it is theorized that the first stage polymer segment is bonded to and/or associated with the second stage polymer segment by covalent bonding, or by hydrogen bonding, or by physical entanglement of the first and second polymer segments, or by a combination of anyone of the foregoing bonding mechanisms.

The term "linear polymer" means that the polymer is not crosslinked.

The term "lightly crosslinked second stage polymer" means that the second stage polymer contains an amount of second stage crosslinker ranging from about greater than 0 percent to about 25 percent, or from about 0.01 to about 20 percent of the amount of crosslinker present in the first stage polymer.

As used herein, the term "(meth)acrylic" acid is meant to include both acrylic acid and methacrylic acid. Similarly, the term "alkyl (meth)acrylate" as used herein is meant to include alkyl acrylate and alkyl methacrylate.

The term "high clarity" means visually transparent, or a turbidity value of ≤100 NTU, ≤50 NTU, or ≤40 NTU, or ≤30 NTU, or ≤20 NTU.

Unless otherwise stated, the disclosed weight percentages of ingredients, components and materials are based on 100 percent active materials.

The term "ambient room temperature (RT)" or room temperature" refers to a temperature ranging from about 20 to about 25® C.

The term "personal care products" as used herein includes, without being limited thereto, cosmetics, toiletries, cosmeceuticals, beauty aids, insect repellents, personal hygiene and cleansing products applied to the body, including the skin, hair, scalp, and nails of humans and animals.

The term "home care products" as used herein includes, without being limited thereto, products employed in a domestic household for surface cleaning or maintaining sanitary conditions, such as in the kitchen and bathroom (e.g., hard surface cleaners, manual and automatic dish care, toilet bowl cleaners and disinfectants), and laundry products for fabric care and cleaning (e.g., detergents, fabric conditioners, pre-treatment stain removers), and the like.

The term "institutional and industrial care" ("I&I") as used herein includes, without being limited thereto, products employed for surface cleaning or maintaining sanitary conditions in institutional and industrial environments, textile treatments (e.g., textile conditioners, carpet and upholstery cleaners), automobile care (e.g., hand and automatic car wash detergents, tire shines, leather conditioners, liquid car polishes, plastic polishes and conditioners), paints and coatings, and the like.

Here, as well as elsewhere in the specification and claims, individual numerical values (including carbon atom numerical values), or limits, can be combined to form additional non-disclosed and/or non-stated ranges.

While overlapping weight ranges for the various components, ingredients, materials and monomers that are contained in the disclosed compositions, mixtures, polymers or copolymers have been expressed for selected embodiments and aspects of the disclosed technology, it should be readily apparent that the specific amount of each component in the disclosed range is selected such that the amount is adjusted such that the sum of all components, ingredients, materials and monomers, etc., for a given composition will total 100 weight percent. The amounts employed will vary with the purpose and character of the desired product and can be readily determined by one skilled in the art.

Staged emulsion polymers of the disclosed technology may suitably comprise, consist essentially of, or consist of, the monomers, monomer residues, crosslinkers and process delineations described herein.

Compositions containing the staged emulsion polymer of the disclosed technology may suitably comprise, consist essentially of, or consist of, the components, elements, and process delineations described herein. The disclosed technology illustratively disclosed herein suitably may be practiced in the absence of any element which is not specifically disclosed herein.

The headings provided herein serve to illustrate, but not to limit the invention in any way or manner.

First Stage Polymer Components

The first stage polymer segment (A) is a crosslinked acrylic copolymer that is prepared from a monomer mixture comprising, or consisting of, or consisting essentially of: (a) from about 25 to about 60, or from about 30 to about 55, or from about 35 to about 50 weight percent of at least one $C_1$-$C_8$ alkyl (meth)acrylate monomer; (b) from about 10 to about 30, or from about 12 to about 25, or from about 15 to about 20 weight percent of at least one ethylenically unsaturated $C_3$-$C_6$ carboxylic acid monomer; (c) from about 10 to about 40, or from about 15 to about 35, or from about 18 to about 30 weight percent of at least one $C_1$-$C_5$ hydroxyalkyl ester of (meth)acrylic acid; (d) from about 1 to about 20, or from about 2 to about 10, or from about 3 to about 5 weight percent of at least one monomer selected from an associative monomer, a semi-hydrophobic monomer, and mixtures thereof; and (e) from about 0.05 to about 1.5, or from about 0.5 to about 1.25, or from about 0.7 to about 1, or from about 0.75 to about 0.9 weight percent of at least one crosslinker (per 100 parts by weight of the monomer mixture).

Exemplary $C_1$-$C_8$ alkyl (meth)acrylate monomers include methyl (meth)acrylate, ethyl (meth)acrylate, n-butyl (meth) acrylate, isobutyl (meth)acrylate, t-butyl (meth)acrylate, isopentyl (meth)acrylate, hexyl (meth)acrylate, 2-ethylhexyl (meth)acrylate, and mixtures thereof.

Exemplary ethylenically unsaturated $C_3$-$C_6$ carboxylic acid monomers include (meth)acrylic acid, itaconic acid, citraconic acid, maleic acid, maleic anhydride, fumaric acid, crotonic acid, aconitic acid, and mixtures thereof.

Exemplary $C_1$-$C_5$ hydroxyalkyl esters of (meth)acrylic acid include 2-hydroxyethyl(meth)acrylate, 2-hydroxy-1-methylethyl (meth)acrylate, 2-hydroxypropyl (meth)acrylate, 3-hydroxypropyl(meth)acrylate, 4-hydroxybutyl(meth) acrylate, and mixtures thereof.

The associative monomer(s) suitable for use in the present technology has an ethylenically unsaturated end group portion (i) for addition polymerization with the other first stage monomers in the polymerizable monomer mixture; a polyoxyalkylene mid-section portion (ii) for imparting selective hydrophilic and/or hydrophobic properties to the product polymer, and a hydrophobic end group portion containing 8 to 30 carbon atoms (iii) for providing selective hydrophobic properties to the polymer.

The semi-hydrophobic monomer(s) suitable for use in the present technology has an ethylenically unsaturated end group portion (i) for addition polymerization with the other first stage monomers in the polymerizable monomer mixture; a polyoxyalkylene mid-section portion (ii) for imparting selective hydrophilic and/or hydrophobic properties to the product polymer, and a semi-hydrophobic end group portion capped by a hydrogen atom or containing 1 to 4 carbon atoms (iii) for providing selective hydrophobic properties to the polymer.

Suitable crosslinkers for use in the first stage monomer mixture are selected from at least one "conventional crosslinker", at least one "amphiphilic crosslinker", and mixtures thereof. By conventional crosslinker is meant that the crosslinking agent contains at least two polymerizable double bonds, has a molecular wt. of from about 100 to 450 g/mol., is nonionizable or nonionic, and does not contain a surfactant moiety.

Amphiphilic crosslinking agents are a subset of compounds known in the art as reactive surfactants. Reactive surfactants commonly only have one polymerizable reactive moiety. The amphiphilic crosslinkers of the present technology have at least two polymerizable double bonds for crosslinking, and have a molecular wt. of 500 g/mol or more.

Exemplary conventional crosslinkers include di(meth) acrylate compounds such as ethylene glycol di(meth)acrylate, polyethylene glycol di(meth)acrylate, triethylene glycol di(meth)acrylate, 1,3-butylene glycol di(meth)acrylate, 1,6-butylene glycol di(meth)acrylate, 1,6-hexanediol di(meth) acrylate, neopentyl glycol di(meth)acrylate, 1,9-nonanediol di(meth)acrylate, 2,2'-bis(4-(acryloxy-propyloxyphenyl) propane, 2,2'-bis(4-(acryloxydiethoxy-phenyl)propane, and zinc acrylate (i.e., $2(C_3H_3O_2)Zn^{++}$); tri(meth)acrylate compounds such as, trimethylolpropane tri(meth)acrylate, trimethylolethane tri(meth)acrylate, and tetramethylolmethane tri(meth)acrylate; tetra(meth)acrylate compounds such as ditrimethylolpropane tetra(meth)acrylate, tetramethylolmethane tetra(meth)acrylate, and pentaerythritol tetra(meth) acrylate; hexa(meth)acrylate compounds such as dipentaerythritol hexa(meth)acrylate; allyl compounds such as allyl (meth)acrylate, diallylphthalate, diallyl itaconate, diallyl fumarate, and diallyl maleate; polyallyl ethers of sucrose having from 2 to 8 allyl groups per molecule, polyallyl ethers of pentaerythritol such as pentaerythritol diallyl ether, pentaerythritol triallyl ether, and pentaerythritol tetraallyl ether; polyallyl ethers of trimethylolpropane such as trimethylolpropane diallyl ether and trimethylolpropane triallyl ether. Other suitable polyunsaturated compounds include divinyl glycol, divinyl benzene, and methylenebisacrylamide.

Exemplary amphiphilic crosslinking agents of the present technology are represented by formulas I and II as follows.

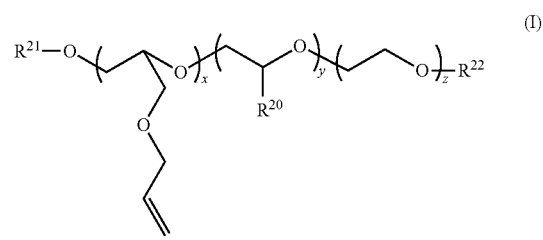

(I)

wherein:
$R^{21}$ is a $C_{10\text{-}24}$ alkyl, alkaryl, alkenyl, or cycloalkyl;
$R^{20}$ is $CH_3$, $CH_2CH_3$, $C_6H_5$, or $C_{14}H_{29}$;
$R^{22}$ is H or $Z^- M^+$;
$Z^-$ is $SO_3^-$, or $PO_3^{2-}$;
$M^+$ is $Na^+$, $K^+$, $NH_4^+$, or an alkanolamine;
x is 2-10;
y is 0-200; and
z is 4-200.

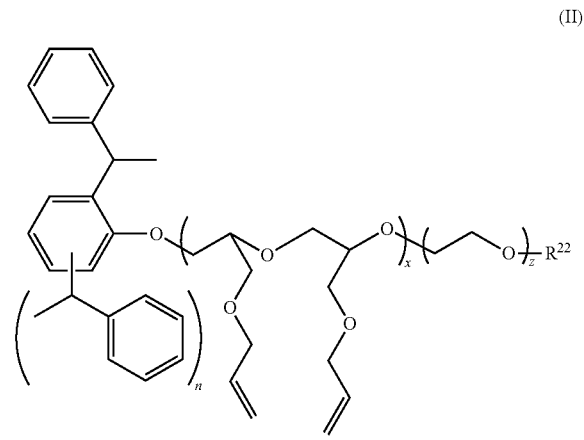

(II)

wherein:
n is 1 or 2;
x is 1-4
z is 4 to 40 in one aspect, 5 to 38 in another aspect, and 10 to 20 in a further aspect; and
$R^{22}$ is H, $SO_3^-M^+$ or $PO_3^{2-}M^+$, and M is selected from $Na^+$, $K^+$, $NH_4^+$ or an alkanolamine.

In one aspect, the amphiphilic crosslinkers have a molecular weight of at least 500 g/mol, or 500 to 60,000 g/mol, or 1,000 to 50,000 g/mol, or 1500 to 30,000 g/mol, or 2,000 to 25,000 g/mol.

The foregoing amphiphilic crosslinking agents conforming to formulas (I) and (II) are disclosed in U.S. Patent Application Publication Nos. US 2013/0047892 and US 2014/0114006, the relevant disclosures of which are herein incorporated by reference, and are commercially available under the E-Sperse™ RS Series trade name (e.g., product designations RS-1617, RS-1618, RS-1684) from Ethox Chemicals, LLC.

Second Stage Polymer Components

The second stage polymer segment (B) is a linear to lightly crosslinked acrylic copolymer that is prepared from a monomer mixture comprising, or consisting of, or consisting essentially of (a') from about 20 to about 60 or from about 25 to about 50, or from about 30 to about 45 weight percent of at least one $C_1$-$C_8$ alkyl (meth)acrylate monomer; (b') from about 0 to about 40 or from about 15 to about 35, or from about 20 to about 30 weight percent of at least one ethylenically unsaturated $C_3$-$C_6$ carboxylic acid monomer; (c') from about 0 to about 40 or from about 15 to about 35, or from about 20 to about 30 weight percent of at least one $C_1$-$C_5$ hydroxyalkyl ester of (meth)acrylic acid; (d') from about 0.1 to about 10, or from about 0.3 to about 7, or from about 1 to about 5 weight percent of at least one monomer selected from an associative monomer, a semi-hydrophobic monomer, and mixtures thereof; and (e') from about 0 to about 0.3, or from about 0.01 to about 0.25, or from about 0.1 to about 0.2 parts by weight of at least one crosslinker (per 100 parts by weight of the monomer mixture), subject to the proviso that when present said the at least one second stage crosslinker ranges from about greater than 0 percent to about 25 percent, or from about 0.01 to about 20 percent of the amount of crosslinker in said first monomer mixture.

Exemplary $C_1$-$C_8$ alkyl (meth)acrylate monomers include methyl (meth)acrylate, ethyl (meth)acrylate, n-butyl (meth)acrylate, isobutyl (meth)acrylate, t-butyl (meth)acrylate, isopentyl (meth)acrylate, hexyl (meth)acrylate, 2-ethylhexyl (meth)acrylate, and mixtures thereof.

Exemplary ethylenically unsaturated $C_3$-$C_6$ carboxylic acid monomers include (meth)acrylic acid, itaconic acid, citraconic acid, maleic acid, maleic anhydride, fumaric acid, crotonic acid, aconitic acid, and mixtures thereof.

The associative monomer(s) suitable for use in the present technology has an ethylenically unsaturated end group portion (i) for addition polymerization with the other first stage monomers in the polymerizable monomer mixture; a polyoxyalkylene mid-section portion (ii) for imparting selective hydrophilic and/or hydrophobic properties to the product polymer, and a hydrophobic end group portion containing 8 to 30 carbon atoms (iii) for providing selective hydrophobic properties to the polymer.

The semi-hydrophobic monomer(s) suitable for use in the present technology has an ethylenically unsaturated end group portion (i) for addition polymerization with the other first stage monomers in the polymerizable monomer mixture; a polyoxyalkylene mid-section portion (ii) for imparting selective hydrophilic and/or hydrophobic properties to the product polymer, and a semi-hydrophobic end group portion capped by a hydrogen atom or containing 1 to 4 carbon atoms (iii) for providing selective hydrophobic properties to the polymer.

The second stage polymer segment can be linear (contains no crosslinker) or can be lightly crosslinked. When lightly crosslinked, the second stage polymer segment comprises an amount of crosslinker that ranges from about above 0 to about 25 percent, or about 0.01 to about 20 percent of the amount of crosslinker present in the first stage polymer segment.

As disclosed for the first stage polymer segment, the crosslinker is selected from at least one "conventional crosslinker", at least one "amphiphilic crosslinker", and mixtures thereof. The conventional crosslinkers and the amphiphilic crosslinkers that are suitable for utilization in the second polymerizable monomer mixture are identical to the disclosed crosslinkers for the preparation of the first stage polymer segment.

In one aspect of the disclosed technology, the sum of the respective amounts of monomer (b) (the at least one ethylenically unsaturated $C_3$-$C_6$ carboxylic acid monomer) and monomer (c) (the at least one $C_1$-$C_5$ hydroxyalkyl ester of (meth)acrylic acid) ranges from about 25 to about 55, or from about 30 to about 50, or from about 35 to about 45 wt. % of said first monomer mixture, based on the weight of the total monomers present in the mixture.

In one aspect of the disclosed technology, the sum of the respective amounts of monomer (b') (the at least one ethylenically unsaturated $C_3$-$C_6$ carboxylic acid monomer) and monomer (c') (the at least one $C_1$-$C_5$ hydroxyalkyl ester of (meth)acrylic acid) ranges from about 25 to about 55, or from about 30 to about 50, or from about 35 to about 45 wt. % of said second monomer mixture, based on the weight of the total monomers present in the mixture, wherein at least one of b' and c' is present in the second monomer mixture.

In one aspect, the associative monomer employed in the first stage monomer mixture and in the second stage monomer mixture is independently selected from a monomer represented by formulas (III) and (IV) as follows:

(III)

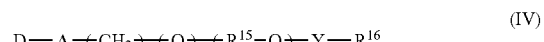

(IV)

wherein $R^{14}$ is hydrogen or methyl; A is —$CH_2C(O)O$—, —$C(O)O$—, —$O$—, —$CH_2O$—, —$NHC(O)NH$—, —$C(O)NH$—, —$Ar$—$(CE_2)_z$-$NHC(O)O$—, —$Ar$—$(CE_2)_z$-$NHC(O)NH$—, or —$CH_2CH_2NHC(O)$—; Ar is a divalent arylene (e.g., phenylene); E is H or methyl; z is 0 or 1; k is an integer ranging from about 0 to about 30, and m is 0 or 1, with the proviso that when k is 0, m is 0, and when k is in the range of 1 to about 30, m is 1; D represents a vinyl or an allyl moiety; $(R^{15}$—$O)_n$ is a polyoxyalkylene moiety, which can be a homopolymer, a random copolymer, or a block copolymer of $C_2$-$C_4$ oxyalkylene units, $R^{15}$ is a divalent alkylene moiety selected from $C_2H_4$, $C_3H_6$, or $C_4H_8$, and combinations thereof; and n is an integer in the range of about 2 to about 150 in one aspect, from about 10 to about 120 in another aspect, and from about 15 to about 60 in a further aspect; Y is —$R^{15}O$—, —$R^{15}NH$—, —$C(O)$—, —$C(O)NH$—, —$R^{15}NHC(O)NH$—, or —$C(O)NHC(O)$—; $R^{16}$ is a substituted or unsubstituted alkyl selected from a $C_8$-$C_{30}$ linear alkyl, a $C_8$-$C_{30}$ branched alkyl, a $C_8$-$C_{30}$ carbocyclic alkyl, a $C_8$-$C_{30}$ alkyl-substituted phenyl, an araalkyl substituted phenyl, an aryl-substituted $C_8$-$C_{30}$ alkyl and the moiety

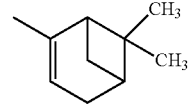

wherein the $R^{16}$ alkyl group, aryl group, phenyl group optionally includes one or more substituents selected from the group consisting of a hydroxyl group, an alkoxyl group, benzyl group styryl group, and a halogen group.

In one aspect, the associative monomer employed in the first stage monomer mixture and in the second stage monomer mixture is independently selected from a monomer represented by formula (V) as follows:

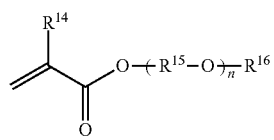
(V)

wherein $R^{14}$ is hydrogen or methyl; $R^{15}$ is a divalent alkylene moiety independently selected from $C_2H_4$, $C_3H_6$, and $C_4H_8$, and n represents an integer ranging from about 10 to about 60, ($R^{15}$—O) can be arranged in a random or a block configuration; $R^{16}$ is a substituted or unsubstituted alkyl selected from a $C_8$-$C_{30}$ linear alkyl, a $C_8$-$C_{30}$ branched alkyl, a $C_8$-$C_{30}$ carbocyclic alkyl, a $C_8$-$C_{30}$ alkyl-substituted phenyl, an araalkyl substituted phenyl, and an aryl-substituted $C_8$-$C_{30}$ alkyl, wherein the $R^{16}$ alkyl group, aryl group, phenyl group optionally comprises one or more substituents selected from the group consisting of a hydroxyl group, an alkoxyl group, benzyl group styryl group, and a halogen group.

Representative associative monomers under Formula (V) include lauryl polyethoxylated (meth)acrylate (LEM), cetyl polyethoxylated (meth)acrylate (CEM), cetearyl polyethoxylated (meth)acrylate (CSEM), stearyl polyethoxylated (meth)acrylate, arachidyl polyethoxylated (meth)acrylate, behenyl polyethoxylated (meth)acrylate (BEM), cerotyl polyethoxylated (meth)acrylate, montanyl polyethoxylated (meth)acrylate, melissyl polyethoxylated (meth)acrylate, phenyl polyethoxylated (meth)acrylate, nonylphenyl polyethoxylated (meth)acrylate, w-tristyrylphenyl polyoxyethylene (meth)acrylate, where the polyethoxylated portion of the monomer contains about 2 to about 150 ethylene oxide units, or from about 5 to about 120, or from about 10 to about 60, or from about 15 to about 30; octyloxy polyethyleneglycol (8) polypropyleneglycol (6) (meth)acrylate, phenoxy polyethylene glycol (6) polypropylene glycol (6) (meth)acrylate, and nonylphenoxy polyethylene glycol polypropylene glycol (meth)acrylate.

In one aspect, the semi-hydrophobic monomer employed in the first stage monomer mixture and in the second stage monomer mixture is independently selected from a monomer represented by formulas (VI) and (VII) as follows:

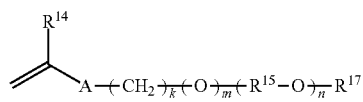
(VI)

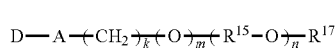
(VII)

wherein $R^{14}$ is hydrogen or methyl; A is —$CH_2C(O)O$—, —$C(O)O$—, —O—, —$CH_2O$—, —$NHC(O)NH$—, —$C(O)NH$—, —Ar—$(CE_2)_z$-$NHC(O)O$—, —Ar—$(CE_2)_z$-NHC(O)NH—, or —$CH_2CH_2NHC(O)$—; Ar is a divalent arylene (e.g., phenylene); E is H or methyl; z is 0 or 1; k is an integer ranging from about 0 to about 30, and m is 0 or 1, with the proviso that when k is 0, m is 0, and when k is in the range of 1 to about 30, m is 1; ($R^{15}$—O)$_n$ is a polyoxyalkylene moiety, which can be a homopolymer, a random copolymer, or a block copolymer of $C_2$-$C_4$ oxyalkylene units, $R^{15}$ is a divalent alkylene moiety selected from $C_2H_4$, $C_3H_6$, or $C_4H_8$, and combinations thereof; and n is an integer in the range of about 2 to about 150, or from about 5 to about, or from about 10 to about 60; $R^{17}$ is selected from hydrogen and a linear or branched $C_1$-$C_4$ alkyl group; and D represents a vinyl or an allyl moiety.

In one aspect, the semi-hydrophobic monomer employed in the first stage monomer mixture and in the second stage monomer mixture is independently selected from a monomer represented by formulas (VIII) and (IX) as follows:

$CH_2=C(R^{14})C(O)O$—$(C_2H_4O)_a(C_3H_6O)_b$—H (VIII)

$CH_2=C(R^{14})C(O)O$—$(C_2H_4O)_a(C_3H_6O)_b$—$CH_3$ (IX)

wherein $R^{14}$ is hydrogen or methyl, and "a" is an integer ranging from 0 or 2 to about 120, or from about 5 to about 45, or from about 10 to about 25; and "b" is an integer ranging from about 0 or 2 to about 120, or from about 5 to about 45, or from about 10 to about 25, subject to the proviso that "a" and "b" cannot be 0 at the same time.

Examples of semi-hydrophobic monomers under formula (VIII) include polyethyleneglycol methacrylate available under the product names Blemmer® PE-90 ($R^{14}$=methyl, a=2, b=0), PE-200 ($R^{14}$=methyl, a=4.5, b=0), and PE-350 ($R^{14}$=methyl a=8, b=0); polypropylene glycol methacrylate available under the product names Blemmer® PP-1000 ($R^{14}$=methyl, b=4-6, a=0), PP-500 ($R^{14}$=methyl, a=0, b=9), PP-800 ($R^{14}$=methyl, a=0, b=13); polyethyleneglycol polypropylene glycol methacrylate available under the product names Blemmer® 50PEP-300 ($R^{14}$=methyl, a=3.5, b=2.5), 70PEP-350B ($R^{14}$=methyl, a=5, b=2); polyethyleneglycol acrylate available under the product names Blemmer® AE-90 ($R^{14}$=hydrogen, a=2, b=0), AE-200 ($R^{14}$=hydrogen, a=2, b=4.5), AE-400 ($R^{14}$=hydrogen, a=10, b=0); polypropyleneglycol acrylate available under the product names Blemmer® AP-150 ($R^{14}$=hydrogen, a=0, b=3), AP-400 ($R^{14}$=hydrogen, a=0, b=6), AP-550 ($R^{14}$=hydrogen, a=0, b=9). Blemmer® is a trademark of NOF Corporation, Tokyo, Japan.

In one aspect, the semi-hydrophobic monomer set forth in formula (VII) can be represented by the following formulas:

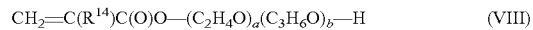
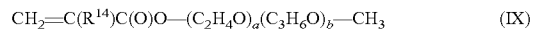
(VIIA)

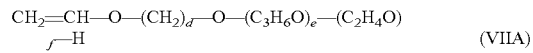
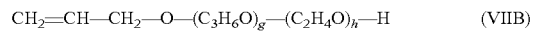
(VIIB)

wherein d is an integer of 2, 3, or 4; e is an integer in the range of from about 1 to about 10, or from about 2 to about 8, or from about 3 to about 7; f is an integer in the range of from about 5 to about 50, or from about 8 to about 40, or from about 10 to about 30; g is an integer in the range of from 1 to about 10, or from about 2 to about 8, or from about 3 to about 7; and h is an integer in the range of from about 5 to about 50, or from about 8 to about 40; e, f, g, and h can be 0 subject to the proviso that e and f cannot be 0 at the same time, and g and h cannot be 0 at the same time.

Monomers under formulas (VIIA) and (VIIB) are commercially available under the trade names Emulsogen® R109, R208, R307, RAL109, RAL208, and RAL307 sold by Clariant Corporation; BX-AA-E5P5 sold by Bimax, Inc.; and combinations thereof. EMULSOGEN7 R109 is a randomly ethoxylated/propoxylated 1,4-butanediol vinyl ether having the empirical formula $CH_2=CH-O(CH_2)_4O(C_3H_6O)_4(C_2H_4O)_{10}H$; Emulsogen® R208 is a randomly ethoxylated/propoxylated 1,4-butanediol vinyl ether having the empirical formula $CH_2=CH-O(CH_2)_4O(C_3H_6O)_4(C_2H_4O)_{20}H$; Emulsogen® R307 is a randomly ethoxylated/propoxylated 1,4-butanediol vinyl ether having the empirical formula $CH_2=CH-O(CH_2)_4O(C_3H_6O)_4(C_2H_4O)_3H$; Emulsogen® RAL109 is a randomly ethoxylated/propoxylated allyl ether having the empirical formula $CH_2=CHCH_2O(C_3H_6O)_4(C_2H_4O)_{10}H$; Emulsogen® RAL208 is a randomly ethoxylated/propoxylated allyl ether having the empirical formula $CH_2=CHCH_2O(C_3H_6O)_4(C_2H_4O)_{20}H$; Emulsogen® RAL307 is a randomly ethoxylated/propoxylated allyl ether having the empirical formula $CH_2=CHCH_2O(C_3H_6O)_4(C_2H_4O)_{30}H$; and BX-AA-E5P5 is a randomly ethoxylated/propoxylated allyl ether having the empirical formula $CH_2=CHCH_2O(C_3H_6O)_5(C_2H_4O)_5H$.

Examples of semi-hydrophobic monomers under formula VIIIB include methoxypolyethyleneglycol methacrylate available under the product names Visiomer® MPEG 750 MA W ($R^{14}$=methyl, a=17, b=0), MPEG 1005 MA W ($R^{14}$=methyl, a=22, b=0), MPEG 2005 MA W ($R^{14}$=methyl, a=45, b=0), and MPEG 5005 MA W ($R^{14}$=methyl, a=113, b=0) from Evonik Röhm GmbH, Darmstadt, Germany); Bisomer® MPEG 350 MA ($R^{14}$=methyl, a=8, b=0), and MPEG 550 MA ($R^{14}$=methyl, a=12, b=0) from GEO Specialty Chemicals, Ambler Pa.; Blemmer® PME-100 ($R^{14}$=methyl, a=2, b=0), PME-200 ($R^{14}$=methyl, a=4, b=0), PME400 ($R^{14}$=methyl, a=9, b=0), PME-1000 ($R^{14}$=methyl, a=23, b=0), PME-4000 ($R^{14}$=methyl, a=90, b=0).

In one aspect, the weight percent of the first stage polymer segment to the weight percent of the second stage polymer segment present in the staged emulsion polymer of the present technology ranges from about 50:50 to about 95:5, or from about 70 to about 93 wt. % first stage polymer segment to about 7 to about 30 wt. % second stage polymer segment, or from about 80 about 90 wt. % first stage polymer segment to about 10 to about 20 wt. % second stage polymer segment.

In one aspect, the first stage monomer mixture and/or the second stage monomer mixture independently contains $C_{10}$-$C_{22}$ alkyl (meth)acrylate monomer a selected from decyl (meth)acrylate, isodecyl (meth)acrylate, lauryl (meth)acrylate, tetradecyl (meth)acrylate, hexadecyl (meth)acrylate, stearyl (meth)acrylate, behenyl (meth)acrylate, and mixtures thereof.

The $C_{10}$-$C_{22}$ alkyl (meth)acrylate monomer can be present in the first monomer mixture, in the second monomer mixture, and in both the first and second monomer mixtures in an amount ranging from about 0 or from about 0.1 to about 10 wt. %, or from about 1 to about 7 wt. %, or from about 1.5 to about 5 wt. %, or from about 2 to about 3.5 wt. %, based on the weight of the monomers in each of the first and/or second monomer mixtures.

In one aspect, the weight ratio of the first stage polymer segment to the second stage polymer segment is 9:1, or 8:2, or 7:3 or 6:4, or 1:1.

General Synthesis Procedure

The staged polymer component of the disclosed technology comprises, or consists of, or consists essentially of at least two polymeric stages synthesized sequentially via staged free radical emulsion polymerization techniques. The staged polymer component of the disclosed technology comprises, or consists of, or consists essentially of a first stage polymer segment and a second stage polymer segment.

The first stage polymer segment is synthesized in a first stage emulsion polymerization reaction from a first monomer mixture. The first stage monomers are polymerized in the presence of a suitable free radical forming initiator to form an emulsion of first stage polymeric particles. The second stage polymer segment is sequentially prepared from a second monomer mixture in the presence of the previously prepared first stage polymer and additional free radical forming initiator. The end-product is a two-stage polymer or polymer composition comprising, or consisting of, or consisting essentially of a first stage polymer segment and a second stage polymer segment. Each segment of the staged polymer of the disclosed technology can be prepared from a monomer mixture containing one or more chain transfer agents. The chain transfer agent can be utilized to tailor the molecular weight of the staged polymer segments.

The emulsion polymerization of each stage can be carried out in a staged batch process, in a staged metered monomer addition process, or the polymerization can be initiated as a batch process and then the bulk of the monomers can be continuously staged into the reactor (seed process). In addition, a polymer prepared in accordance with the first stage monomer and crosslinker amounts and a polymer prepared in accordance with the second stage monomer and optional crosslinker amounts may be prepared separately and subsequently blended. To facilitate emulsification of the monomer mixtures, the emulsion polymerization is carried out in the presence of at least one surfactant. In one embodiment, the emulsion polymerization is carried out in the presence of surfactant ranging in the amount from about 0.1% to about 10% by weight, or from about 0.3% to about 5%, or from about 0.5% to about 3% by weight, based on a total emulsion weight basis.

The polymerization can be carried out in a suitable solvent system such as water. Minor amounts of a hydrocarbon solvent, organic solvent, as well as mixtures thereof can be employed. The polymerization reactions are initiated by any means which results in the generation of a suitable free-radical. Thermally derived radicals, in which the radical species is generated from thermal, homolytic dissociation of peroxides, hydroperoxides, persulfates, percarbonates, peroxyesters, hydrogen peroxide and azo compounds can be utilized. The initiators can be water soluble or water insoluble depending on the solvent system employed for the polymerization reaction.

The initiator compounds can be utilized in an amount of up to about 30 wt. %, or from about 0.01 to about 10 wt. %, or from about 0.2 to about 3 wt. %, based on the total monomer weight.

Exemplary free radical water soluble initiators include, but are not limited to, inorganic persulfate compounds, such as ammonium persulfate, potassium persulfate, and sodium persulfate; peroxides such as hydrogen peroxide, benzoyl peroxide, acetyl peroxide, and lauryl peroxide; organic hydroperoxides, such as cumene hydroperoxide and t-butyl hydroperoxide; organic peracids, such as peracetic acid, and water soluble azo compounds, such as 2,2'-azobis(tert-alkyl) compounds having a water solubilizing substituent on the alkyl group such as VA-086 (2,2'-azobis[2-methyl-N-(2-hydroxyethyl)propionamide] from Wako.

Exemplary free radical oil soluble compounds include, but are not limited to 2,2'-azobisisobutyronitrile, and the like. The peroxides and peracids can optionally be activated with reducing agents, such as sodium bisulfite, sodium formaldehyde, or ascorbic acid, transition metals, hydrazine, and the like. In one aspect, azo polymerization catalysts include the Vazo® free-radical polymerization initiators, available from DuPont, such as Vazo® 44 (2,2'-azobis(2-(4, 5-dihydroimidazolyl)propane), Vazo® 56 (2,2'-azobis(2-methylpropionamidine) dihydrochloride), Vazo® 67 (2,2'-azobis(2-methylbutyronitrile)), and Vazo® 68 (4,4'-azobis (4-cyanovaleric acid)).

Optionally, the use of known redox initiator systems as polymerization initiators can be employed. Such redox initiator systems include an oxidant (initiator) and a reductant. Suitable oxidants include, for example, hydrogen peroxide, sodium peroxide, potassium peroxide, t-butyl hydroperoxide, t-amyl hydroperoxide, cumene hydroperoxide, sodium perborate, perphosphoric acid and salts thereof, potassium permanganate, and ammonium or alkali metal salts of peroxydisulfuric acid, typically at a level of 0.01% to 3.0% by weight, based on dry polymer weight, are used. Suitable reductants include, for example, alkali metal and ammonium salts of sulfur-containing acids, such as sodium sulfite, bisulfite, thiosulfate, hydrosulfite, sulfide, hydrosulfide or dithionite, formadinesulfinic acid, hydroxymethanesulfonic acid, acetone bisulfite, amines such as ethanolamine, glycolic acid, glyoxylic acid hydrate, ascorbic acid, isoascorbic acid, lactic acid, glyceric acid, malic acid, 2-hydroxy-2-sulfinatoacetic acid, tartaric acid and salts of the preceding acids typically at a level of 0.01% to 3.0% by weight, based on dry polymer weight, is used. In one aspect, combinations of peroxodisulfates with alkali metal or ammonium bisulfites can be used, for example, ammonium peroxodisulfate and ammonium bisulfite. In another aspect, combinations of hydrogen peroxide containing compounds (t-butyl hydroperoxide) as the oxidant with ascorbic or erythorbic acid as the reductant can be utilized. The ratio of peroxide-containing compound to reductant is within the range from about 30:1 to about 0.05:1.

The polymerization reaction can be carried out at temperatures ranging from about 20 to about 200® C., or from about 50 to about 150® C., or from about 60 to about 100® C.

In one aspect, the polymerization can be carried out the presence of a chain transfer agent. Suitable chain transfer agents include, but are not limited to, thio- and disulfide containing compounds, such as $C_1$-$C_{18}$ alkyl mercaptans, such as tert-butyl mercaptan, n-octyl mercaptan, n-dodecyl mercaptan, tert-dodecyl mercaptan hexadecyl mercaptan, dodecyl mercaptan, octadecyl mercaptan; mercaptoalcohols, such as 2-mercaptoethanol, 2-mercaptopropanol; mercaptocarboxylic acids, such as mercaptoacetic acid and 3-mercaptopropionic acid; mercaptocarboxylic acid esters, such as butyl thioglycolate, isooctyl thioglycolate, dodecyl thioglycolate, isooctyl 3-mercaptopropionate, and butyl 3-mercaptopropionate; thioesters; $C_1$-$C_{18}$ alkyl disulfides; aryldisulfides; polyfunctional thiols such as trimethylolpropane-tris-(3-mercaptopropionate), pentaerythritol-tetra-(3-mercaptopropionate), pentaerythritol-tetra-(thioglycolate), pentaerythritol-tetra-(thiolactate), dipentaerythritol-hexa-(thioglycolate), and the like; phosphites and hypophosphites; $C_1$-$C_4$ aldehydes, such as formaldehyde, acetaldehyde, propionaldehyde; haloalkyl compounds, such as carbon tetrachloride, bromotrichloromethane, and the like; hydroxylammonium salts such as hydroxylammonium sulfate; formic acid; sodium bisulfite; isopropanol; and catalytic chain transfer agents such as, for example, cobalt complexes (e.g., cobalt (II) chelates).

The aqueous polymerization medium optionally can contain an organic solvent. If utilized, the organic solvent is less than about 5 wt. % of the aqueous medium. Suitable examples of water-miscible organic solvents include, without limitation, esters, alkylene glycol ethers, alkylene glycol ether esters, lower molecular weight aliphatic alcohols, and the like.

To facilitate emulsification of the monomer mixture, the emulsion polymerization is carried out in the presence of at least one stabilizing surfactant. The term "stabilizing surfactant" is used in the context of surfactants employed to facilitate emulsification. In one embodiment, the emulsion polymerization is carried out in the presence of stabilizing surfactant (active weight basis) ranging in the amount of about 0.2% to about 5% by weight, or from about 0.5% to about 3%, or from about 1% to about 2% by weight, based on a total monomer weight basis.

Stabilizing surfactants for facilitating the emulsion polymerization include anionic, nonionic, amphoteric, and cationic surfactants, as well as reactive derivatives thereof, and mixtures thereof. By "reactive derivatives thereof" it is meant surfactants, or mixtures of surfactants, having on average less than one reactive moiety. Most commonly, anionic and nonionic surfactants can be utilized as stabilizing surfactants as well as mixtures thereof.

Suitable anionic surfactants for facilitating emulsion polymerization are well known in the art and include, but are not limited to ($C_6$-$C_{18}$) alkyl sulfates, ($C_6$-$C_{18}$) alkyl ether sulfates (e.g., sodium lauryl sulfate and sodium laureth sulfate), amino and alkali metal salts of dodecylbenzenesulfonic acid, such as sodium dodecyl benzene sulfonate and dimethylethanolamine dodecylbenzenesulfonate, sodium ($C_6$-$C_{16}$) alkyl phenoxy benzene sulfonate, disodium ($C_6$-$C_{16}$) alkyl phenoxy benzene sulfonate, disodium ($C_6$-$C_{16}$) di-alkyl phenoxy benzene sulfonate, disodium laureth-3 sulfosuccinate, sodium dioctyl sulfosuccinate, sodium di-sec-butyl naphthalene sulfonate, disodium dodecyl diphenyl ether sulfonate, disodium n-octadecyl sulfosuccinate, phosphate esters of branched alcohol ethoxylates, and the like, as well as reactive derivatives thereof. Nonionic surfactants suitable for facilitating emulsion polymerizations are well known in the polymer art, and include, without limitation, linear or branched $C_8$-$C_{30}$ fatty alcohol ethoxylates, such as capryl alcohol ethoxylate, lauryl alcohol ethoxylate, myristyl alcohol ethoxylate, cetyl alcohol ethoxylate, stearyl alcohol ethoxylate, cetearyl alcohol ethoxylate, sterol ethoxylate, oleyl alcohol ethoxylate, and, behenyl alcohol ethoxylate; alkylphenol alkoxylates, such as octylphenol ethoxylates; and polyoxyethylene polyoxypropylene block copolymers, and the like, as well as reactive derivatives thereof. Additional fatty alcohol ethoxylates suitable as non-ionic surfactants are described below. Other useful nonionic surfactants include $C_8$-$C_{22}$ fatty acid esters of polyoxyethylene glycol, ethoxylated mono- and diglycerides, sorbitan esters and ethoxylated sorbitan esters, $C_8$-$C_{22}$ fatty acid glycol esters, block copolymers of ethylene oxide and propylene oxide, and combinations thereof, as well as reactive derivatives thereof. The number of ethylene oxide units in each of the foregoing ethoxylates can range from about 2 and above, or from about 2 to about.

Optionally, other emulsion polymerization additives and processing aids which are well known in the emulsion polymerization art, such as solvents, buffering agents, chelating agents, inorganic electrolytes, biocides, protective colloids, amphiphilic additives, and pH adjusting agents can be included in the polymerization system.

Examples of typical protective colloids are cellulose derivatives, polyethylene glycol, polypropylene glycol, copolymers of ethylene glycol and propylene glycol, polyvinyl acetate, poly(vinyl alcohol), partially hydrolyzed poly (vinyl alcohol), polyvinyl ether, starch and starch derivatives, dextran, polyvinylpyrrolidone, polyvinylpyridine, polyethyleneimine, polyvinylimidazole, polyvinylsuccinimide, polyvinyl-2-methylsuccinimide, polyvinyl-1,3-oxazolid-2-one, polyvinyl-2-methylimidazoline and maleic acid or anhydride copolymers. In one embodiment, the protective colloid is selected from poly(vinyl alcohol) that has a degree of hydrolysis ranging from about 80 to about 95%, or from about 85 to about 90% in another aspect. The protective colloids are customarily used in concentrations from 0.05 to 20 wt. %, based on the weight of the total monomers.

In one embodiment, an amphiphilic additive selected from a polyethoxylated alkyl glucoside, a poly(ethylene glycol) diester esterified with a saturated and unsaturated $C_{10}$ to $C_{22}$ fatty acid, and a poly(propylene glycol)-block-poly(ethylene glycol)-block-poly(propylene glycol)-block copolymer. Amphiphilic additives are disclosed in International Patent Application No. PCT/US2017/06655, the relevant disclosure of which is herein incorporated by reference. The amount of amphiphilic additive that is mixed with the polymerizable monomer mixture ranges from about 1 to about 15 parts by wt., or from about 2 to about 10 parts by wt., or from about 3 to about 6 parts by wt./100 parts by wt. of the monomers utilized to prepare the polymers of the disclosed technology.

The second stage monomer emulsion prepared from the second stage monomer mixture can be formed in a separate reactor following the same procedures as outlined for formulating the first stage emulsion of monomers. The second stage monomer emulsion is metered or batched into the second reactor at a constant rate and mixed with the first stage polymer emulsion. Simultaneous with the second stage monomer feed, a free radical initiator in an amount sufficient to initiate polymerization is metered into the reaction mixture and the second stage monomers are polymerized in the presence of the first stage polymer segment. The temperature is maintained at about 60 to 90® C. for about 1 to 3 hours or until polymerization is complete. Unreacted monomer can be eliminated by addition of more initiator, as is well-known in the emulsion polymerization art. Typically, the staged polymer emulsion product has a total polymer solids (total active polymer) content ranging from about 10 to about 55 weight percent (based on the weight of the total emulsion). While the polymer is synthesized in an emulsion, it should be recognized that the staged polymer can be supplied in dried powder form if desired.

Yield Stress Fluids

In one exemplary aspect, the yield stress fluid comprises: i) at least one staged emulsion polymer of the present technology; ii) water; and iii) a neutralizing agent.

In one exemplary aspect, the yield stress fluid comprises: i) at least one staged emulsion polymer of the present technology; ii) water; iii) at least one surfactant and iv) an optional neutralizer.

In one exemplary aspect, the amount of the at least one staged emulsion polymer that is incorporated into the yield stress fluids of the present technology ranges from about 0.1 to about 10 wt. %, or from about 0.5 to about 7 wt. %, or from about 1 to about 5 wt. %, or from about 1.5 to about 3 wt. %, based on the weight of the total yield stress composition.

In one exemplary aspect, the amount of the at least one surfactant that is utilized to formulate the yield stress fluids of the present technology is present in an amount ranging from about 5 to about 50 wt. %, or from about 6 to about 40 wt. %, or from about 7 to about 35 wt. %, or from about 8 to 35 wt. %, or from about 9 to about 20 wt. %, or from about 10 to 15 wt. %.

In one non-limiting exemplary aspect, the weight ratio of anionic surfactant to amphoteric surfactant present in the yield stress fluid of the present technology is 10:1 to about 2:1, or 9:1, or 8:1, or 7:1, or 6:1, or 5:1, or 4.5:1, or 4:1, or 3:1.

In one non-limiting exemplary aspect, the weight ratio of anionic surfactant to nonoionic surfactant present in the yield stress fluid of the present technology is 10:1 to about 1:10.

The thickening mechanism of the staged emulsion polymers of the present technology can be activated by base neutralization, by surfactant activation, or by both base neutralization and surfactant activation. Accordingly, the staged emulsion polymers of the disclosed technology are advantageous over the prior art thickening polymers in that they can be utilized to enhance viscosity and to convey yield stress properties to aqueous media (absent a surfactant) or to enhance the viscosity and convey yield stress properties to surfactant containing compositions without having to adjust the pH of the formulation, allowing for process formulation that is independent of pH. The dual activation thickening mechanism gives the formulator of personal care products, home care products and institutional and industrial care products more process versatility over thickening polymers that can only be activated by one mechanism given that the polymer can be added at any point during the formulation process. The staged emulsion polymers of the disclosed technology allow the formulator to tailor viscosities (low to high) without sacrificing yield stress in the formulated product. This is advantageous in that some formulations require lower viscosities for easy pour attributes while maintaining yield stress for the stable suspension of desired insoluble and particulate materials. Moreover, the staged emulsion polymer having a crosslinked first stage or core and a linear to lightly crosslinked second stage or shell provides a highly efficient rheology modifying polymer with quicker swelling attributes and the ability to achieve clear formulations.

If desired, particularly in strictly aqueous systems (absent a surfactant), the pH of the yield stress compositions of the present invention can be adjusted with any basic pH adjusting agent known to the art. The staged polymeric rheology modifiers of the present invention are generally supplied in their acidic form. In one mechanism these polymers modify the rheology of a formulation through the neutralization of the carboxyl groups on the polymer with an alkaline material. Without wishing to be bound by theory, this causes ionic repulsion between like charged moieties along the backbone of the polymer and a three-dimensional expansion of the polymer network, resulting in the viscosity modification and other rheological properties.

Exemplary alkaline pH adjusting agents for neutralizing the carboxy moieties on the polymer backbone include inorganic and organic bases, and combinations thereof. Examples of inorganic bases include but are not limited to the alkali metal hydroxides (especially sodium, potassium, and ammonium), and alkali metal salts of inorganic acids, such as sodium borate (borax), sodium phosphate, sodium pyrophosphate, and the like, and mixtures thereof. Examples of organic bases include but are not limited to triethanolamine (TEA), diisopropanolamine, triisopropanolamine, aminomethyl propanol, dodecylamine, cocamine, oleamine, morpholine, triamylamine, triethylamine, tetrakis(hydroxypropyl)ethylenediamine, L-arginine, aminomethyl propanol, tromethamine (2-amino 2-hydroxymethyl-1,3-propanediol), and PEG-15 cocamine.

If desired, the pH of the of the yield stress compositions of the present invention can be adjusted with any acidic pH adjusting agent known to the art. Given that the staged emulsion polymers of the disclosed technology are not pH dependent, the acidic material can be added to the yield stress fluid before or after the addition of an alkaline material or in lieu of an alkaline material to reduce the pH of the composition without negatively impacting the viscosity, rheological, and clarity properties of the composition.

Such acidic materials include organic acids and inorganic acids, for example, acetic acid, citric acid, tartaric acid, alpha-hydroxy acids, beta-hydroxy acids, salicylic acid, lactic acid, glycolic acid, and natural fruit acids, or inorganic acids, for example, hydrochloric acid, nitric acid, sulfuric acid, sulfamic acid, phosphoric acid, and combinations thereof.

Buffering agents can be used in the compositions of the invention. Suitable buffering agents include, but are not limited to, alkali or alkali earth metal carbonates, phosphates, bicarbonates, citrates, borates, acetates, acid anhydrides, succinates, and the like, such as sodium phosphate, sodium citrate, sodium acetate, sodium bicarbonate, and sodium carbonate.

The pH adjusting agent (acidic or basic) and/or buffering agent is utilized in any amount necessary to obtain and/or maintain a desired pH value in the composition.

Surfactant Chassis

In one, the yield stress compostions aspect of the present technology comprise a surfactant selected from an anionic surfactant, a cationic surfactant, an amphoteric surfactant, a nonionic surfactant, and mixtures thereof.

In one aspect of the present technology, the yield stress compositions comprise an anionic surfactant and an amphoteric surfactant.

In one aspect of the present technology, the yield stress compositions comprise an anionic surfactant and a nonionic surfactant.

Suitable anionic surfactants include, but are not limited to, alkyl sulfates, alkyl ether sulfates, alkyl sulphonates, linear and branched alkylbenzene sulfonates, α-olefin-sulfonates, alkylamide sulfonates, alkarylpolyether sulphates, alkylamidoether sulfates, alkyl monoglyceryl ether sulfates, alkyl monoglyceride sulfates, alkyl monoglyceride sulfonates, alkyl succinates, alkyl sulfosuccinates, alkyl ether sulfosuccinates, alkyl sulfosuccinamates, alkyl amidosulfosuccinates; alkyl sulfoacetates, alkyl phosphates, alkyl ether phosphates, alkyl ether carboxylates, alkyl amidoethercarboxylates, acyl lactylates, alkyl isethionates, acyl isethionates, carboxylate salts and amino acid derived surfactants such as N-alkyl amino acids, N-acyl amino acids, as well as alkyl peptides. Mixtures of these anionic surfactants are also useful.

In one aspect, the cation moiety of the forgoing surfactants is selected from sodium, potassium, magnesium, ammonium, and alkanolammonium ions such as monoethanolammonium, diethanolammonium triethanolammonium ions, as well as monoisopropylammonium, diisopropylammonium and triisopropylammonium ions. In one embodiment, the alkyl and acyl groups of the foregoing surfactants contain from about 6 to about 24 carbon atoms in one aspect, from 8 to 22 carbon atoms in another aspect and from about 12 to 18 carbon atoms in a further aspect and may be unsaturated. The aryl groups in the surfactants are selected from phenyl or benzyl. The ether containing surfactants set forth above can contain from 1 to 10 ethylene oxide and/or propylene oxide units per surfactant molecule in one aspect, and from 1 to 3 ethylene oxide units per surfactant molecule in another aspect.

In one aspect, surfactant component (a) is a nonethoxylated anionic surfactant selected from the alkali metal, ammonium or alkanolamine salts of alkali metal, ammonium or alkanolamine salts of alkyl sulfates and alkyl benzene sulfonates. The alkyl sulfates are those in which the alkyl groups contain 8 to 26 carbon atoms in one aspect, 10 to 22 carbon atoms in another aspect, and 12 to 18 carbon atoms in still another aspect. In one aspect the alkyl sulfates conform to the formula:

$$R'\text{—}OSO_3^-M^+$$

wherein R' is a $C_8$ to $C_{26}$ alkyl radical, and M is an alkali metal (e.g., sodium, potassium), ammonium or alkanolamine cation moiety.

In one aspect, the alkyl substituent is linear, i.e., normal alkyl, however, branched chain alkyl sulfonates can be employed, although they are not as good with respect to biodegradability. The alkyl, substituent may be terminally sulfonated or the sulfonation can occur on any carbon atom of the alkyl chain, i.e., may be a secondary sulfonate. In one aspect, the alkyl sulfonates can be used as the alkali metal salts, such as sodium and potassium.

The alkyl group in the alkyl benzene sulfonate contains 8 to 16 carbon atoms in one aspect, and 10 to 15 carbon atoms in another aspect. In one aspect, the alkyl group is linear. It is understood that the benzene sulfonate moiety can be attached to any carbon atom on the linear alkyl chain. Such linear alkyl benzene sulfonate surfactants are known by the abbreviation "LAS". In one aspect, the LAS surfactant is the sodium, potassium or ethanolamine $C_{10}$ to $C_{16}$ linear alkyl benzene sulfonate, e.g., sodium linear dodecyl benzene sulfonate. Sodium linear dodecyl benzene sulfonate is one compound of a mixture of surfactant compounds that contain variable linear alkyl chain lengths ranging from about 10 to about 16 carbon atoms. Dodecyl benzene sulfonate is considered representative of the entire range of alkyl chain substituents because the average number of carbon atoms in the alkyl chain is about 12.

In one aspect, surfactant component is an ethoxylated anionic surfactant selected from the alkali metal, ammonium or alkanolamine salt of an ethoxylated alkyl sulfate having from about 8 to 20 carbon atoms in the alkyl moiety in one aspect, and 10 to 18 carbon atoms in another aspect, with an ethylene oxide content of about 1 to 7 moles per mole of alkyl sulfate. In one aspect the ethoxylated alkyl sulfates conform to the formula:

$$R''\text{—}O\text{—}(CH_2CH_2O)_n\text{—}SO_3^-M^+$$

wherein R" is a $C_8$ to $C_{20}$ alkyl group, M is an alkali metal (e.g., sodium, potassium), ammonium or alkanolammonium cation moiety, and n is from about 1 to 7 in one aspect, from about 2 to 6 in another aspect, and from about 3 to 5 in still another aspect. In one aspect the ethoxylated alky sulfate surfactant comprises sodium ethoxylated lauryl sulfate containing 1, 2, or 3 moles of ethylene oxide, and mixtures thereof.

In one aspect, the amino acid surfactants are selected from a N-acyl amino acid of the formula:

$$R_1\overset{\overset{\displaystyle O}{\|}}{\text{—}C}\text{—}\overset{}{\underset{}{N}}\text{—}\overset{\overset{\displaystyle R_2}{|}}{\underset{}{CH}}\text{—}(CH_2)_n\text{—}X^-\ M^+$$

wherein $R_1$ is a saturated or unsaturated, straight or branched alkyl chain containing 7 to 17 carbon atoms, $R_2$ is H or a methyl group, $R_3$ is H, $COO^-M^+$, $CH_2COO^-M^+$ or COOH, n is 0 to 2, X is $COO^-$ or $SO_3^-$ and M independently represents H, sodium, potassium, ammonium or triethanolammonium.

In one aspect, the N-acyl amino acid surfactants represented by the formula immediately above are derived from taurates, glutamates, alanine, alaninates, sacosinates, aspartates, glycinates, and mixtures thereof.

Representative taurate surfactants conform to the formula:

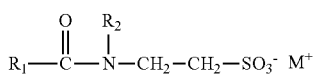

wherein $R_1$ is a saturated or unsaturated, straight or branched alkyl chain containing 7 to 17 carbon atoms in one aspect and 9 to 13 carbon atoms in another aspect, $R_2$ is H or methyl, and M is H, sodium, potassium, ammonium or triethanolammonium.

Non-limiting examples of taurate surfactants are potassium cocoyl taurate, potassium methyl cocoyl taurate, sodium caproyl methyl taurate, sodium cocoyl taurate, sodium lauroyl taurate, sodium methyl cocoyl taurate, sodium methyl lauroyl taurate, sodium methyl myristoyl taurate, sodium methyl oleoyl taurate, sodium methyl palmitoyl taurate, sodium methyl stearoyl taurate, and mixtures thereof.

Representative glutamate surfactants conform to the formula:

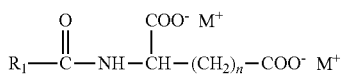

wherein $R_1$ is a saturated or unsaturated, straight or branched alkyl chain containing 7 to 17 carbon atoms in one aspect and 9 to 13 carbon atoms in another aspect, n is 0 to 2, and M independently is H, sodium, potassium, ammonium or triethanolammonium.

Non-limiting examples of glutamate surfactants are di-potassium capryloyl glutamate, di-potassium undecylenoyl glutamate, di-sodium capryloyl glutamate, di-sodium cocoyl glutamate, di-sodium lauroyl glutamate, di-sodium stearoyl glutamate, di-sodium undecylenoyl glutamate, potassium capryloyl glutamate, potassium cocoyl glutamate, potassium lauroyl glutamate, potassium myristoyl glutamate, potassium stearoyl glutamate, potassium undecylenoyl glutamate, sodium capryloyl glutamate, sodium cocoyl glutamate, sodium lauroyl glutamate, sodium myristoyl glutamate, sodium olivoyl glutamate, sodium palmitoyl glutamate, sodium stearoyl glutamate, sodium undecylenoyl glutamate, and mixtures thereof.

Representative alanine and alaninate surfactants conform to the formula:

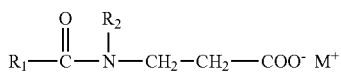

wherein $R_1$ is a saturated or unsaturated, straight or branched alkyl chain containing 7 to 17 carbon atoms in one aspect and 9 to 13 carbon atoms in another aspect, $R_2$ is H or methyl, and M is H, sodium, potassium, ammonium or triethanolammonium.

Non-limiting examples of alanine and alaninate surfactants are cocoyl methyl β-alanine, lauroyl β-alanine, lauroyl methyl β-alanine, myristoyl β-alanine, potassium lauroyl methyl β-alanine, sodium cocoyl alaninate, sodium cocoyl methyl β-alanine, sodium myristoyl methyl β-alanine, and mixtures thereof.

Representative glycinate surfactants conform to the formula:

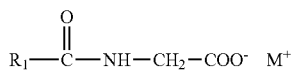

wherein $R_1$ is a saturated or unsaturated, straight or branched alkyl chain containing 7 to 17 carbon atoms in one aspect and 9 to 13 carbon atoms in another aspect, and M is H, sodium, potassium, ammonium or triethanolammonium.

Non-limiting examples of glycinate surfactants are sodium palmitoyl glycinate, sodium lauroyl glycinate, sodium cocoyl glycinate, sodium myristoyl glycinate, potassium lauroyl glycinate, potassium cocoyl glycinate, sodium stearoyl glycinate, and mixtures thereof.

Representative sarcosinate surfactants conform to the formula:

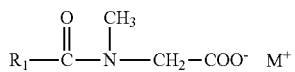

wherein $R_1$ is a saturated or unsaturated, straight or branched alkyl chain containing 7 to 17 carbon atoms in one aspect and 9 to 13 carbon atoms in another aspect, and M is H, sodium, potassium, ammonium or triethanolamine.

Non-limiting examples of sarcosinate surfactants are potassium lauroyl sarcosinate, potassium cocoyl sarcosinate, sodium cocoyl sarcosinate, sodium lauroyl sarcosinate, sodium myristoyl sarcosinate, sodium palmitoyl sarcosinate, and mixtures thereof.

Representative aspartate surfactants conform to the formula:

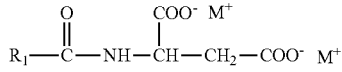

wherein $R_1$ is a saturated or unsaturated, straight or branched alkyl chain containing 7 to 17 carbon atoms in one aspect and 9 to 13 carbon atoms in another aspect, and M independently is H, sodium, potassium, ammonium or triethanolammonium.

Non-limiting examples of aspartate surfactants are sodium lauroyl aspartate, sodium myristoyl aspartate, sodium cocoyl aspartate, sodium caproyl aspartate, di-sodium lauroyl aspartate, di-sodium myristoyl aspartate, di-sodium cocoyl aspartate, di-sodium caproyl aspartate, potassium lauroyl aspartate, potassium myristoyl aspartate, potassium cocoyl aspartate, potassium caproyl aspartate, di-potassium lauroyl aspartate, di-potassium myristoyl aspartate, di-potassium cocoyl aspartate, di-potassium caproyl aspartate, and mixtures thereof.

In one aspect, the anionic surfactant is a fatty acid soap containing from about 8 to about 22 carbon atoms. In another aspect of the disclosed technology the cleansing composition contains at least one fatty acid salt soap containing from about 10 to about 18 carbon atoms. In a further aspect of the disclosed technology the composition contains at least one fatty acid salt soap containing from about 12 to about 16 carbon atoms. The fatty acids utilized in the soaps can be saturated and unsaturated and can be derived from synthetic sources, as well as from the hydrolysis of fats and natural oils.

Exemplary saturated fatty acids include but are not limited to octanoic, decanoic, lauric, myristic, pentadecanoic, palmitic, margaric, steric, isostearic, nonadecanoic, arachidic, behenic, and the like, and mixtures thereof. Exemplary unsaturated fatty acids include but are not limited to myristoleic, palmitoleic, oleic, linoleic, linolenic, and the like, and mixtures thereof. The fatty acids can be derived from animal fat such as tallow, lard, poultry fat or from vegetable sources such as coconut oil, red oil, palm kernel oil, palm oil, cottonseed oil, linseed oil, sunflower seed oil, olive oil, soybean oil, peanut oil, corn oil, safflower oil, sesame oil, rapeseed oil, canola oil, and mixtures thereof.

The soap can be prepared by a variety of well-known means such as by the direct base neutralization of a fatty acid or mixtures thereof or by the saponification of suitable fats and vegetable oils or mixtures thereof with a suitable base. Exemplary bases include ammonium hydroxide, potassium hydroxide, potassium carbonate, sodium hydroxide and alkanol amines such as triethanolamine. Generally, the fat or oil is heated until liquefied and a solution of the desired base is added thereto. Soaps included in a personal care composition utilized in the method of the disclosed technology can be made, for example, by a classic kettle process or modern continuous manufacturing process wherein natural fats and oils such as tallow or coconut oil or their equivalents are saponified with an alkali metal hydroxide using procedures well known to those skilled in the art. Alternatively, soaps can be made by the direct neutralization of free fatty acids such as lauric acid ($C_{12}$), myristic acid ($C_{14}$), palmitic acid ($C_{16}$), steric acid ($C_{18}$), isostearic ($C_{18}$), and mixtures thereof, with an alkali metal hydroxide or carbonate. The fatty acid can be pre-neutralized (before addition to the formulation) or can be neutralized in situ during the formulation process.

In one aspect of the disclosed technology, the fatty acid salt soap comprises a fatty acid salt wherein the fatty acid is selected from a mixture of lauric acid, myristic acid, and palmitic acid. In another aspect of the technology, the fatty acid soap is the potassium salt of lauric, myristic and palmitic acids.

In one aspect of the present technology, suitable amphoteric surfactants include but are not limited to alkyl betaines, e.g., lauryl betaine; alkylamido betaines, e.g., cocamidopropyl betaine, lauramidopropyl betaine and cocohexadecyl dimethylbetaine; alkylamido sultaines, e.g., cocamidopropyl hydroxysultaine; (mono- and di-) amphocarboxylates, e.g., sodium cocoamphoacetate, sodium lauroamphoacetate, sodium capryloamphoacetate, disodium cocoamphodiacetate, disodium lauroamphodiacetate, disodium caprylamphodiacetate, disodium capryloamphodiacetate, disodium cocoamphodipropionate, disodium lauroamphodipropionate, disodium caprylamphodipropionate, and disodium capryloamphodipropionate; and mixtures thereof.

The foregoing amphoteric surfactants (i.e., the betaines and sultaines) are disclosed without a counter ion, as one of ordinary skill in the art will recognize that the under the pH conditions of the compositions containing the amphoteric surfactants, these surfactants are either electrically neutral by virtue of having balanced positive and negative charges, or they contain counter ions such as alkali metal, alkaline earth or ammonium ions as a charge balancing moiety.

In one aspect of the present technology, suitable cationic surfactants include but are not limited to alkylamines, amidoamines, alkyl imidazolines, ethoxylated amines, quaternary compounds, and quaternized esters. In addition, alkylamine oxides can function as a cationic surfactant at a lower pH values.

Non-limiting examples of alkylamines and salts thereof include dimethyl cocamine, dimethyl palmitamine, dioctylamine, dimethyl stearamine, dimethyl soyamine, soyamine, myristyl amine, tridecyl amine, ethyl stearylamine, N-tallowpropane diamine, ethoxylated stearylamine, dihydroxy ethyl stearylamine, arachidylbehenylamine, dimethyl lauramine, stearylamine hydrochloride, soyamine chloride, stearylamine formate, N-tallowpropane diamine dichloride, and amodimethicone (INCI name for a silicone polymer and blocked with amino functional groups, such as aminoethylamino propylsiloxane).

Non-limiting examples of amidoamines and salts thereof include stearamido propyl dimethyl amine, stearamidopropyl dimethylamine citrate, palmitamidopropyl diethylamine, and cocamidopropyl dimethylamine lactate Non-limiting examples of alkyl imidazoline surfactants include alkyl hydroxyethyl imidazoline, such as stearyl hydroxyethyl imidazoline, coco hydroxyethyl imidazoline, ethyl hydroxymethyl oleyl oxazoline, and the like.

Non-limiting examples of ethyoxylated amines include PEG-cocopolyamine, PEG-15 tallow amine, quaternium-52, and the like.

Exemplary quaternary ammonium surfactants include, but are not limited to cetyl trimethylammonium chloride, cetylpyridinium chloride, dicetyl dimethyl ammonium chloride, dihexadecyl dimethyl ammonium chloride, stearyl dimethyl benzyl ammonium chloride, dioctadecyl dimethyl ammonium chloride, dieicosyl dimethyl ammonium chloride, didocosyl dimethyl ammonium chloride, dihexadecyl dimethyl ammonium chloride, dihexadecyl dimethyl ammonium acetate, behenyl trimethyl ammonium chloride, benzalkonium chloride, benzethonium chloride, and di(cocoalkyl) dimethyl ammonium chloride, ditallowdimethyl ammonium chloride, di(hydrogenated tallow) dimethyl ammonium chloride, di(hydrogenated tallow) dimethyl ammonium acetate, ditallowdimethyl ammonium methyl sulfate, ditallow dipropyl ammonium phosphate, and ditallow dimethyl ammonium nitrate.

At low pH values, alkylamine oxides can protonate and behave similarly to N-alkyl amines. Examples include, but are not limited to, dimethyl-dodecylamine oxide, oleyldi(2-hydroxyethyl) amine oxide, dimethyltetradecylamine oxide, di(2-hydroxyethyl)-tetradecylamine oxide, dimethylhexadecylamine oxide, behenamine oxide, cocamine oxide, decyltetradecylamine oxide, dihydroxyethyl $C_{12-15}$ alkoxypropylamine oxide, dihydroxyethyl cocamine oxide, dihydroxyethyl lauramine oxide, dihydroxyethyl stearamine oxide, dihydroxyethyl tallowamine oxide, hydrogenated palm kernel amine oxide, hydrogenated tallowamine oxide, hydroxyethyl hydroxypropyl $C_{12}$-$C_{15}$ alkoxypropylamine oxide, lauramine oxide, myristamine oxide, cetylamine oxide, oleamidopropylamine oxide, oleamine oxide, palmitamine oxide, PEG-3 lauramine oxide, dimethyl lauramine oxide, potassium trisphosphonomethylamine oxide, soyamidopropylamine oxide, cocamidopropylamine oxide, stearamine oxide, tallowamine oxide, and mixtures thereof.

The nonionic surfactant can be any of the nonionic surfactants known or previously used in the art of aqueous surfactant compositions. Suitable nonionic surfactants include but are not limited to aliphatic $C_6$ to $C_{18}$ primary or secondary linear or branched chain acids, alcohols or phenols, linear alcohol and alkyl phenol alkoxylates (especially ethoxylates and mixed ethoxy/propoxy), block alkylene oxide condensate of alkyl phenols, alkylene oxide condensates of alkanols, ethylene oxide/propylene oxide block copolymers, semi-polar nonionics (e.g., amine oxides and phosphine oxides), as well as alkyl amine oxides. Other suitable nonionics include mono or di alkyl alkanolamides and alkyl polysaccharides, sorbitan fatty acid esters, polyoxyethylene sorbitan fatty acid esters, polyoxyethylene sorbitol esters, and polyoxyethylene acids. Examples of suitable nonionic surfactants include coco mono- or diethanolamide, cocamidopropyl and lauramine oxide, polysorbate 20, 40, 60 and 80, ethoxylated linear alcohols, cetearyl alcohol, lanolin alcohol, stearic acid, glyceryl stearate, PEG-150 distearate, PEG-100 stearate, PEG-80 sorbitan laurate, and oleth 20. Other suitable nonionic surfactants include the alkyl glucosides and the alkyl polyglucosides, such as, for example, coco-glucoside, decyl glucoside, lauryl glucoside, decyl diglucoside, lauryl diglucoside and coco diglucoside.

In one aspect, the nonionic surfactant is an alcohol alkoxylate derived from a saturated or unsaturated fatty alcohol containing 8 to 18 carbon atoms, and the number of alkylene oxide groups present in the alcohol range from about 3 to about 12. The alkylene oxide moiety is selected from ethylene oxide, propylene oxide and combinations thereof. In another aspect, the alcohol alkoxylate is derived from a fatty alcohol containing 8 to 15 carbon atoms and contains from 5 to 10 alkoxy groups (e.g. ethylene oxide, propylene oxide, and combinations thereof). Exemplary nonionic fatty alcohol alkoxylate surfactants in which the alcohol residue contains 12 to 15 carbon atoms and contain about 7 to 9 ethylene oxide groups are available under the Tomadol® (e.g., product designations 25-7 and 25-9) and Neodol® (e.g., product designation 25-7) trade names from Tomah Products, Inc. and Shell Chemicals, respectively.

An exemplary nonionic alcohol alkoxylated surfactant derived from an unsaturated fatty alcohol and containing about 10 ethylene oxide groups is available from Lubrizol Advanced Materials, Inc. under the trade Chemonic™ oleth-10 ethoxylated alcohol.

Another commercially available alcohol alkoxylate surfactant is sold under the Plurafac® trade name from BASF. The Plurafac surfactants are reaction products of a higher linear alcohol and a mixture of ethylene and propylene oxides, containing a mixed chain of ethylene oxide and propylene oxide, terminated by a hydroxyl group. Examples include $C_{13}$ to $C_{15}$ fatty alcohols condensed with 6 moles ethylene oxide and 3 moles propylene oxide, $C_{13}$ to $C_{15}$ fatty alcohols condensed with 7 moles propylene oxide and 4 moles ethylene oxide, and $C_{13}$ to $C_{15}$ fatty alcohols condensed with 5 moles propylene oxide and 10 moles ethylene oxide.

Another commercially suitable nonionic surfactant is available from Shell Chemicals under the Dobanol™ trade name (product designations 91-5 and 25-7). Product designation 91-5 is an ethoxylated $C_9$ to $C_{11}$ fatty alcohol with an average of 5 moles ethylene oxide and product designation 25-7 is an ethoxylated $C_{12}$ to $C_{15}$ fatty alcohol with an average of 7 moles ethylene oxide per mole of fatty alcohol.

Other surfactants which can be utilized in the cleansing compositions of the present technology are set forth in more detail in WO 99/21530, U.S. Pat. Nos. 3,929,678, 4,565,647, 5,456,849, 5,720,964, 5,858,948, and 7,115,550, which are herein incorporated by reference. Additionally, suitable surfactants are described in McCutcheon's Emulsifiers and Detergents (North American and International Editions, by Schwartz, Perry and Berch) which is hereby fully incorporated by reference.

In one aspect, the yield stress fluids can be formulated as personal care product, and in another aspect as home care products. Depending on the product and use, the yield stress fluids can be formulated with personal care adjuvants and benefit agents or with home care adjuvants and benefit agents. As one of skill in the art can readily determine, various personal care and home care adjuvants and benefit agents are interchangeable and are employed in both product areas. The following listing of personal care and home care adjuvants and benefit agents are not intended to be limiting, and it is to be recognized that various of the disclosed adjuvants and benefit agents may be employed in both technical fields.

Personal Care Adjuvants and Benefit Agents

The personal care compositions of the present technology can include one or more optional components which are customarily used in the formulation of personal care products for use on the skin, hair and scalp. Non-limiting examples of such optional components are disclosed in the *International Cosmetic Ingredient Dictionary*, Fifth Edition, 1993, and the Cosmetic, Toiletry, and Fragrance Association (CTFA) *Cosmetic Ingredient Handbook*, Second edition, 1992, each of which are incorporated by reference. Exemplary, non-limiting, optional components are discussed below.

Cationic Polymers

Cationic polymers are components that can enhance the delivery and deposition of conditioning agents and/or provide auxiliary conditioning benefits to the hair, scalp or skin to improve and enhance the conditioning benefits delivered by the compositions of the present technology. Cationic polymer refers to polymers containing at least one cationic moiety or at least one moiety that can be ionized to form a cationic moiety. Typically, these cationic moieties are nitrogen containing groups such as quaternary ammonium or protonated amino groups. The cationic protonated amines can be primary, secondary, or tertiary amines. The cationic polymer typically has a cationic charge density ranging from about 0.2 to about 7 meq/g at the pH of the intended use of the composition. The average molecular weight of the cationic polymer ranges from about 5,000 daltons to about 10,000,000 daltons. Non-limiting examples of such polymers are described in the CTFA *International Cosmetic Ingredient Dictionary/Handbook* via the CTFA website as well as the CTFA *Cosmetic Ingredient Handbook*, Ninth Ed., Cosmetic and Fragrance Assn., Inc., Washington D.C. (2002), incorporated herein by reference, can be used.

Suitable cationic polymers can be synthetically derived or natural polymers can be synthetically modified to contain cationic moieties. In one aspect, the cationic polymer contains at least one repeating unit containing a quaternary ammonium salt moiety. Such polymers can be prepared by the polymerization of a diallylamine such as dialkyldiallylammonium salt or copolymer thereof in which the alkyl group contains 1 to about 22 carbon atoms in one aspect and methyl or ethyl in another aspect. Copolymers containing a quaternary moiety derived from a dialkyldiallylammonium salt and an anionic component derived from anionic monomers of acrylic acid and methacrylic acid are suitable conditioning agents. Also suitable are, polyampholyte terpolymers having a cationic component prepared from a derivative of diallylamine, such as a dimethyldiallylammonium salt, an anionic component derived from anionic monomers of acrylic acid or 2-acrylamido-2-methylpropane sulfonic acid and a nonionic component derived from nonionic monomers of acrylamide. The preparation of such quaternary ammonium salt moiety containing polymers can be found, for example, in U.S. Pat. Nos. 3,288,770; 3,412,019; 4,772,462 and 5,275,809, the pertinent disclosures of which are incorporated herein by reference.

In one aspect, suitable cationic polymers include the chloride salts of the foregoing quaternized homopolymers and copolymers in which the alkyl group is methyl or ethyl, and are commercially available under the Merquat® series of trademarks from Lubrizol Advanced Materials, Inc. A homopolymer prepared from diallyl dimethyl ammonium chloride (DADMAC) having the CTFA name, Polyquaternium-6, is available under the Merquat 100 and Merquat 106 trademark. A copolymer prepared from DADMAC and acrylamide having the CTFA name, Polyquaternium-7, is sold under the Merquat 550 trademark. Another copolymer prepared from DADMAC and acrylic acid having the CTFA name, Polyquaternium-22, is sold under the Merquat 280 trademark. The preparation of Polyquaternium-22 and its related polymers is described in U.S. Pat. No. 4,772,462, the pertinent disclosures of which are incorporated herein by reference.

Also useful is an ampholytic terpolymer prepared from a nonionic component derived from acrylamide or methyl acrylate, a cationic component derived from DADMAC or methacrylamidopropyl trimethyl ammonium chloride (MAPTAC), and an anionic component derived from acrylic acid or 2-acrylamido-2-methylpropane sulfonic acid or combinations of acrylic acid and 2-acrylamido-2-methylpropane sulfonic acid. An ampholytic terpolymer prepared from acrylic acid, DADMAC and acrylamide having the CTFA name, Polyquarternium-39, is available under the Merquat Plus 3330 and Mequat 3330PR trademarks. Another ampholytic terpolymer prepared from acrylic acid, methacrylamidopropyl trimethyl ammonium chloride (MAPTAC) and methyl acrylate having the CTFA name, Polyquarternium-47, is available under the Merquat 2001 trademark. Still another ampholytic terpolymer prepared from acrylic acid, MAPTAC and acrylamide having the CTFA name, Polyquarternium-53, is available under the Merquat 2003PR trademark. The preparation of such terpolymers is described in U.S. Pat. No. 5,275,809, the pertinent disclosures of which are incorporated herein by reference.

Exemplary cationically modified natural polymers suitable for use in the hair conditioning composition includes polysaccharide polymers, such as cationically modified cellulose and cationically modified starch derivatives modified with a quaternary ammonium halide moiety. Exemplary cationically modified cellulose polymers are salts of hydroxyethyl cellulose reacted with trimethyl ammonium substituted epoxide (CTFA, Polyquaternium-10). Other suitable types of cationically modified cellulose include the polymeric quaternary ammonium salts of hydroxyethyl cellulose reacted with lauryl dimethyl ammonium substituted epoxide (CTFA, Polyquaternium-24). Cationically modified potato starch having the CTFA name, Starch Hydroxypropyltrimonium Chloride, is available under the Sensomer™ CI-50 trademark, from Lubrizol Advanced Materials, Inc.

Other suitable cationically modified natural polymers include cationic polygalactomannan derivatives such as guar gum derivatives and cassia gum derivatives, e.g., CTFA: Guar Hydroxypropyltrimonium Chloride and Cassia Hydroxypropyltrimonium Chloride. Guar hydroxypropyltrimonium chloride is commercially available under the Jaguar™ trade name series from Rhodia Inc. and the N-Hance trade name series from Ashland Inc. Cassia Hydroxypropyltrimonium Chloride is commercially available under the Sensomer™ CT-250 and Sensomer™ CT-400 trademarks from Lubrizol Advanced Materials, Inc.

Exemplary cationic polymers and copolymers suitable as conditioners and/or deposition aids in the disclosed technology have the CTFA names Polyquaternium-1, Polyquaternium-2, Polyquaternium-4, Polyquaternium-5, Polyquaternium-6, Polyquaternium-7, Polyquaternium-8, Polyquaternium-9, Polyquaternium-10, Polyquaternium-11, Polyquaternium-12, Polyquaternium-13, Polyquaternium-14, Polyquaternium-15, Polyquarternium-16, Polyquaternium-17, Polyquaternium-18, Polyquaternium-19, Polyquaternium-20, Polyquaternium-22, Polyquaternium-24, Polyquaternium-27, Polyquaternium-28, Polyquaternium-29, Polyquaternium-30, Polyquaternium-31, Polyquaternium-32, Polyquaternium-33, Polyquaternium-34, Polyquaternium-35, Polyquaternium-36, Polyquaternium-37, Polyquaternium-39, Polyquaternium-42, Polyquaternium-43, Polyquaternium-44, Polyquaternium-45, Polyquaternium-46, Polyquaternium-47, Polyquaternium-48, Polyquaternium-49, Polyquaternium-50, Polyquaternium-51, Polyquaternium-52, Polyquaternium-53, Polyquaternium-54, Polyquarternium-55, Polyquaternium-56, Polyquaternium-57, Polyquaternium-58, Polyquaternium-59, Polyquaternium-60, Polyquaternium-61, Polyquaternium-62, Polyquaternium-63, Polyquaternium-64, Polyquaternium-65, Polyquaternium-66, Polyquaternium-67, Polyquaternium-68, Polyquaternium-69, Polyquaternium-70, Polyquaternium-71, Polyquaternium-72, Polyquaternium-73, Polyquaternium-74, Polyquaternium-75, Polyquaternium-76, Polyquaternium-77, Polyquaternium-78, Polyquaternium-79, Polyquaternium-80, Polyquaternium-81, Polyquaternium-82, Polyquaternium-83, Polyquaternium-84, Polyquaternium-85, Polyquaternium-86, Polyquaternium-87, and mixtures thereof.

The cationic compounds can be present from about 0.05 to about 5 wt. % percent, or from about 0.1 to about 3 wt. %, or from about 0.5 to about 2.0 wt. % (based on the total weight of the composition).

Humectants

Suitable humectants include allantoin; pyrrolidonecarboxylic acid and its salts; hyaluronic acid and its salts; sorbic acid and its salts, salicylic acid and its salts; urea, hydroxyethyl urea; lysine, arginine, cystine, guanidine, and other amino acids; polyhydroxy alcohols such as glycerin, propylene glycol, hexylene glycol, hexanetriol, ethoxydiglycol, dimethicone copolyol, and sorbitol, and the esters thereof; polyethylene glycol; glycolic acid and glycolate salts (e.g. ammonium and quaternary alkyl ammonium); lactic acid and lactate salts (e.g. ammonium and quaternary alkyl ammonium); sugars and starches; sugar and starch derivatives (e.g. alkoxylated methyl glucose ethers, such as PPG-20 methyl glucose ether); D-panthenol; lactamide monoethanolamine; acetamide monoethanolamine; and the like, and mixtures thereof. Preferred humectants include the $C_3$ to $C_6$ diols and triols, such as glycerin, propylene glycol, 1,3-propanediol, hexylene glycol, hexanetriol, and the like, and mixtures thereof.

Humectants typically comprise from about 1 wt. % to about 10 wt. % in one aspect, from about 2 wt. % to about 8 wt. % in another aspect, and from about 3 wt. % to about 5 wt. % in a further aspect of the present technology, based on the total weight of the yield stress composition.

Fragrances and Perfumes

Exemplary perfumes, fragrances and fragrance oils include but are not limited to allyl cyclohexane propionate, ambrettolide, Ambrox® DL (dodecahydro-3a,6,6,9a-tetramethylnaphtho[2,1-b]furan), amyl benzoate, amyl cinnamate, amyl cinnamic aldehyde, amyl salicylate, anethol, aurantiol, benzophenone, benzyl butyrate, benzyl iso-valerate, benzyl salicylate, cadinene, campylcyclohexal, cedrol, cedryl acetate, cinnamyl cinnamate, citronellyl acetate, citronellyl isobutyrate, citronellyl propionate, cuminic aldehyde, cyclohexylsalicylate, cyclamen aldehyde, cyclomyral, dihydro isojasmonate, diphenyl methane, diphenyl oxide, dodecanal, dodecalactone, ethylene brassylate, ethylmethyl phenylglycidate, ethyl undecylenate, exaltolide, Galoxilide® (1,3,4,6,7,8-hexhydro,4,6,6,7,8,8-hexamethyl-cyclopenta-γ-2-benzopyran), geranyl acetate, geranyl isobutyrate, hexadecanolide, hexenyl salicylate, hexyl cinnamic aldehyde, hexyl salicylate, α-ionone, β-ionone, γ-ionone, α-irone, isobutyl benzoate, isobutyl quinoline, Iso E Super® (7-acetyl,1,2,3,4,5,6,7,8-octahydro,1,1,6,7-tetramethyl napthalene), cis-jasmone, lilial, linalyl benzoate, 20 methoxy naphthaline, methyl cinnamate, methyl eugenol, γ-methylionone, methyl linolate, methyl linolenate, musk indanone, musk ketone, musk tibetine, myristicin, neryl acetate, δ-nonalactone, γ-nonalactone, patchouli alcohol, phantolide, phenylethyl benzoate, phenylethylphenylacetate, 2-phenylethanol, phenyl heptanol, phenyl hexanol, α-santalol, thibetolide, tonalid, δ-undecalactone, γ-undecalactone, vertenex, vetiveryl acetate, yara-yara, ylangene, allo-ocimene, allyl caproate, allyl heptoate, anisole, camphene, carvacrol, carvone, citral, citronellal, citronellol, citronellyl nitrile, coumarin, cyclohexyl ethylacetate, p-cymene, decanal, dihydromyrcenol, dihydromyrcenyl acetate, dimethyl octanol, ethyllinalool, ethylhexyl ketone, eucalyptol, fenchyl acetate, geraniol, gernyl formate, hexenyl isobutyrate, hexyl acetate, hexyl neopentanoate, heptanal, isobornyl acetate, isoeugenol, isomenthone, isononyl acetate, isononyl alcohol, isomenthol, isopulegol, limonene, linalool, linalyl acetate, menthyl acetate, methyl chavicol, methyl octyl acetaldehyde, myrcene, napthalene, nerol, neral, nonanal, 2-nonanone, nonyl acetate, octanol, octanal, α-pinene, β-pinene, rose oxide, α-terpinene, γ-terpinene, α-terpinenol, terpinolene, terpinyl acetate, tetrahydrolinalool, tetrahydromyrcenol, undecenal, veratrol, verdox, acetanisol; amyl acetate; anisic aldehyde; anisylalcohol; benzaldehyde; benzyl acetate; benzyl acetone; benzyl alcohol; benzyl formate; hexenol; laevo-carveol; d-carvone; cinnamaldehyde; cinnamic alcohol; cinnamyl acetate; cinnamyl formate; cis-3-hexenyl acetate; Cyclal C (2,4-dimethyl-3-cyclohexen-1-carbaldehyde); dihydroxyindole; dimethyl benzyl carbinol; ethyl acetate; ethyl acetoacetate; ethyl butanoate; ethyl butyrate; ethyl vanillin; tricyclo decenyl propionate; furfural; hexanal; hexenol; hydratropic alcohol; hydroxycitronellal; indole; isoamyl alcohol; isopulegyl acetate; isoquinoline; ligustral; linalool oxide; methyl acetophenone; methyl amyl ketone; methyl anthranilate; methyl benzoate; methyl benzyl acetate; methyl heptenone; methyl heptyl ketone; methyl phenyl carbinyl acetate; methyl salicylate; octalactone; para-cresol; para-methoxy acetophenone; para-methyl acetophenone; phenethylalcohol; phenoxy ethanol; phenyl acetaldehyde; phenyl ethyl acetate; phenyl ethyl alcohol; prenyl acetate; propyl butyrate; safrole; vanillin and viridine.

Amounts of each of the fragrance or perfume components may range from about 0.000001 to about 2 wt. %, or from 0.00001 to about 1.5 wt. %, or from 0.0001 to about 1 wt. %, or from about 0.001 to about 0.8 wt. %, based on of the weight of the composition.

Vitamins

The composition of the present technology can include a vitamin(s). Illustrative vitamins are vitamin A (retinol), vitamin B2, vitamin B3 (niacinamide), vitamin B6, vitamin C, vitamin E, folic acid and biotin. Derivatives of the vitamins may also be employed. For instance, vitamin C derivatives include ascorbyl tetraisopalmitate, magnesium ascorbyl phosphate and ascorbyl glycoside. Derivatives of vitamin E include tocopheryl acetate, tocopheryl palm itate and tocopheryl linoleate. DL-panthenol and derivatives may also be employed.

The total amount of vitamins when present in compositions according to the present technology may range from about 0.001 to about 10 wt. %, or from 0.01 to about 1 wt. %, or from 0.1 to about 0.5 wt. %, based on the weight of the total composition.

Botanicals

The compositions of the present technology can include water soluble or oil soluble botanical materials extracted from a particular plant, fruit, nut, or seed. Suitable botanicals can include, for example, *Aloe barbadensis* leaf juice, *Echinacea* (e.g., sp. *angustifolia, purpurea, pallida*), yucca glauca, willow herb, basil leaves, Turkish oregano, carrot root, grapefruit, fennel seed, rosemary, tumeric, thyme, blueberry, bell pepper, blackberry, spirulina, black currant fruit, tea leaves, such as for, example, Chinese tea, black tea (e.g., var. Flowery Orange Pekoe, Golden Flowery Orange Pekoe, Fine Tippy Golden Flowery Orange Pekoe), green tea (e.g., var. Japanese, Green Darjeeling), oolong tea, coffee seed, dandelion root, date palm fruit, gingko leaf, green tea, hawthorn berry, licorice, sage, strawberry, sweet pea, tomato, vanilla fruit, comfrey, arnica, centella asiatica, cornflower, horse chestnut, ivy, magnolia, oat, pansy, skullcap, seabuckthorn, white nettle, and witch hazel. Botanicals include, for example, chlorogenic acid, glutathione, glycrrhizin, neohesperidin, quercetin, rutin, morin, myricetin, absinthe, and chamomile.

Botanicals can be present in an amount ranging from about 0.001 to about 10 wt. %, or from about 0.005 to about 8 wt. %, or from about 0.01 to about 5 wt. %, based of the total weight of the composition.

Chelating Agents

The composition of the present technology can include a chelating agent(s). Suitable chelators include EDTA (ethylene diamine tetraacetic acid) and salts thereof such as disodium EDTA and tetrasodium ETDA, citric acid and salts thereof, tetrasodium glutamate diacetate, cyclodextrins, and the like, and mixtures thereof.

Chelating agents typically comprise from about 0.001 to about 3 wt. %, or from about 0.01 to about 2 wt. %, or from about 0.01 to about 1 wt. %, based on the total weight of the yield stress composition.

Preservatives

The composition of the present technology can include a preservative(s). Preservatives include compounds that have antifungal activity, antimicrobial activity, antioxidant activity, UV protection activity, and the like. Non-limiting examples of suitable preservatives include polymethoxy bicyclic oxazolidine, methylparaben, propylparaben, ethylparaben, butylparaben, benzyltriazole, DMDM hydantoin (also known as 1,3-dimethyl-5,5-dimethyl hydantoin), imidazolidinyl urea, phenoxyethanol, phenoxyethylparaben, methylisothiazolinone, methylchloroisothiazolinone, benzophenone-4, dibutylhydroxytoluene (BHT), benzoisothiazolinone, triclosan, quaternium-15, salicylic acid salts, and the like, and mixtures thereof.

The preservative(s) is typically present from about 0.01 to about 3.0 wt. %, or from about 0.1 to about 1 wt. %, or from about 0.3 to about 1 wt. %, based on the total weight of the composition.

Home Care Adjuvants and Benefit Agents (Laundry and Dish Detergents)

In one aspect, the yield stress fluids of the present technology can be formulated as laundry and dish care products, such as, for example liquid laundry and dish detergents. In addition to the at least one stage emulsion polymer and the surfactant(s), the liquid detergents or cleaners may comprise additional ingredients (adjuvants or benefit agents) which further improve the application and/or aesthetic properties of the liquid detergent or cleaner. As a rule, in addition to the thickener and surfactant(s), preferred compositions comprise one or more substances from the group of builders, electrolytes, bleaches, bleach activators, enzymes, nonaqueous cosolvents, pH adjusting agents, perfume, perfume carriers, fluorescent brighteners, suds suppressors, hydrotropes, anti-redeposition agents, optical brighteners, dye transfer inhibitors, antimicrobial active ingredients, auxiliary rheology modifiers, antioxidants, corrosion inhibitors, fabric softeners, and UV absorbers.

Aqueous Carrier

The liquid detergent compositions according to the present technology can be in a "concentrated form", in such case, the liquid compositions according to the present technology will contain a lower amount of water compared to conventional liquid detergents. Typically, the water content of the concentrated liquid composition is 80 wt. % or less in one aspect, 75 wt. % or less in another aspect 70 wt. % or less in still another aspect, 65 wt. % or less in a further aspect, 60 wt. % or less in a still further aspect, 55 wt. % or less in an additional aspect 40 wt. % or less in a still additional aspect, and 35 wt. % or less in a further additional aspect, based on the weight of the total composition.

In one aspect, the aqueous carrier comprises deionized water, although water from natural, municipal or commercial sources can be utilized as long as any mineral cations that may be present in such water do not deleteriously affect the intended function of any of the components contained in the laundry composition.

Cosolvent

In addition to water the aqueous carrier can comprise water miscible cosolvents. Cosolvents can aid in the dissolution of various nonionic laundry and dish detergent adjuvants that require dissolution in the liquid phase. Suitable cosolvents include the lower alcohols such as ethanol and isopropanol but can be any lower monohydric alcohol containing up to 5 carbon atoms. Some or all the alcohol may be replaced with dihydric or trihydric lower alcohols or glycol ethers which in addition to providing solubilizing properties and reducing the flash point of the product, also can provide anti-freezing attributes as well as to improve the compatibility of the solvent system with particular laundry detergent adjuvants. Exemplary dihydric and trihydric lower alcohols and glycol ethers are glycol, propanediol (e.g., propylene glycol, 1,3-propane diol), butanediol, glycerol, diethylene glycol, propyl or butyl diglycol, hexylene glycol, ethylene glycol methyl ether, ethylene glycol ethyl ether, ethylene glycol propyl ether, ethylene glycol mono-n-butyl ether, diethylene glycol methyl ether, diethylene glycol ethyl ether, propylene glycol methyl, ethyl or propyl ether, dipropylene glycol monomethyl ether monoethyl ether, diisopropylene glycol monomethyl ether, diisopropylene glycol monoethyl ether, methoxytriglycol, ethoxytriglycol, butoxytriglycol, isobutoxyethoxy-2-propanol, 3-methyl-3-methoxybutanol, propylene glycol t-butyl ether, and mixtures of these solvents.

The amount of cosolvent(s) if utilized can range from about 0.5 to about 15 wt. % in one aspect, from about 1 to about 10 wt. % in another aspect, and from about 2 to about 5 wt. % in a further aspect, based on the weight of the total composition.

Hydrotrope

The liquid detergent compositions optionally comprise a hydrotrope to aid in the compatibility of the liquid detergent with water. In one aspect, suitable hydrotropes include but are not limited to the anionic hydrotropes such as, for example, the sodium, potassium, ammonium, monoethanolamine, and triethanolamine salts of benzene sulfonate, xylene sulfonate, toluene sulfonate, cumene sulfonate, and mixtures thereof. In one aspect, nonionic hydrotropes such as glycerin, urea and alkanolamines (e.g., triethanolamine) can be employed.

In one aspect, the liquid detergent composition may comprise a hydrotrope when the total amount of surfactant contained in the detergent composition is above about 25 wt. % in one aspect above about 27 wt. % in another aspect, above about 30 wt. % in still another aspect, above about 33, 35, 37, 40, 45, 50, 55, 60, 65 wt. % in a further aspect, based on the weight of the total composition.

The amount of hydrotrope can range from about 0 to about 10 wt. % in one aspect, from about 0.1 to about 5 wt. % in another aspect, from about 0.2 to about 4 wt. % in a further aspect, and from about 0.5 to about 3 wt. % in a still further aspect, based on the weight of the total composition.

Builders/Electrolytes

In one aspect of the present technology, the liquid detergent compositions may optionally comprise dissolved or suspended builders and electrolytes. The builder can be any material that is capable of reducing the level of alkaline earth metal ions, particularly, magnesium and calcium in the wash water. Builders also can provide other beneficial properties such as generation of an alkaline pH and aiding in the suspension of soil removed from the fabric. The electrolyte that may be utilized can be any water-soluble salt. The electrolyte may also be a detergency builder, e.g., sodium tripolyphosphate, or it may be a non-functional electrolyte to promote the solubility of other electrolytes, for example, potassium salts can be used to promote the solubility of sodium salts enabling the amount of dissolved electrolyte to be increased considerably. Suitable builders include those which are commonly used in detergents, e.g., zeolites (aluminosilicate), crystalline and amorphous silicates, carbonates, phosphorous containing compositions, borates, as well as organic based builders.

A suitable zeolite or aluminosilicate which is useful in the compositions of the present technology is an amorphous water insoluble hydrated compound of the formula $(NaAlO_2)_x(SiO_2)_y$, wherein x is a number from 1.0 to 1.2 and y is 1, the amorphous material can be further characterized by a $Mg^{+2}$ exchange capacity of from about 50 mg eq. $CaCO_3$/g, and a particle diameter of from about 0.01 to about 5 μm (volume distribution; measurement method: Coulter counter). This ion exchange builder is more fully described in British Patent No. 1,470,250. In another aspect, a water insoluble synthetic aluminosilicate ion exchange material useful herein is crystalline and conforms to the formula $Na_z[(AlO_2)_y.(SiO_2)]xH_2O$, wherein z and y are integers of at least 6; the molar ratio of z to y is in the range from 1.0 to about 0.5, and x is an integer from about 15 to about 264, the aluminosilicate ion exchange material can be further characterized as having a particle size diameter from about 0.1 to about 100 μm (volume distribution; measurement method: Coulter counter); a calcium ion exchange capacity on an anhydrous basis of at least about 200 mg equivalent of $CaCO_3$ hardness per gram; and a calcium exchange rate on an anhydrous basis of at least about 2 grains/gallon/minute/gram. These synthetic aluminosilicates are more fully described in British Patent No. 1,429,143.

In one aspect, suitable silicates include crystalline, sheet-like sodium silicates having the general formula $NaMSi_xO_{2x+1} \cdot H_2O$, where M denotes sodium or hydrogen, x is a number from 1.9 to 4, and y is a number from 0 to 20. Crystalline silicates or phyllosilicates of this kind are described, for example, in European Patent Application EP-A-0 164 514. In one aspect, M is sodium and x represents a value of 2 or 3.

In one aspect, suitable silicates include amorphous sodium silicates having a $Na_2O:SiO_2$ modulus of from 1:2 to 1:3.3, and which are dissolution-retarded and have secondary detergency properties. The retardation of dissolution relative to conventional amorphous sodium silicates may have been brought about in a variety of ways, for example, by surface treatment, compounding, compacting or overdrying.

Representative carbonates include alkali metal carbonates and bicarbonates, such as, for example, sodium carbonate, potassium carbonate, sodium sesquicarbonate, sodium bicarbonate and potassium bicarbonate.

Exemplary phosphorous containing compositions include the alkali metal pyrophosphates, orthophosphates, polyphosphates and phosphonates, specific examples of which are the sodium and potassium pyrophosphates, tripolyphosphates, phosphates, and hexametaphosphates.

Representative borates include the alkali metal borates such as sodium tetraborate.

Examples of organic builders which can be used as builder salts alone or in admixture with other organic and/or inorganic builders are (1) water-soluble amino polycarboxylates, e.g., sodium and potassium ethylenediaminetetraacetates, nitrilotriacetates and N-(2 hydroxyethyl)-nitrilodiacetates; (2) water-soluble salts of phytic acid, e.g., sodium and potassium phytates as set forth in U.S. Pat. No. 2,379,942; (3) water-soluble polyphosphonates, including the sodium, potassium and lithium salts of ethane-1-hydroxy-1,1-diphosphonic acid; the sodium, potassium and lithium salts of methylene diphosphonic acid; the sodium, potassium and lithium salts of ethylene diphosphonic acid; and the sodium, potassium and lithium salts of ethane-1,1,2-triphosphonic acid. Other examples include the alkali metal salts of ethane-2-carboxy-1,1-diphosphonic acid, hydroxymethanediphosphonic acid, carboxyldiphosphonic acid, ethane-1-hydroxy-1,1,2-triphosphonic acid, ethane-2-hydroxy-1,1,2-triphosphonic acid, propane-1,1,3,3-tetraphosphonic acid, propane-1,1,2,3-tetraphosphonic acid, and propane-1,2,2,3-tetraphosphonic acid; (4) the water-soluble salts of polycarboxylate polymers and copolymers as described in U.S. Pat. No. 3,308,067.

In addition, mono- and polycarboxylate salts also are suitable, including the water-soluble salts of mellitic acid, citric acid, and carboxymethyloxysuccinic acid, imino disuccinate, salts of polymers of itaconic acid and maleic acid, tartrate monosuccinate, tartrate disuccinate and mixtures thereof. Exemplary polycarboxylate salts are the sodium and potassium salts of citric acid and tartaric acid. In one aspect, the polycarboxylate salt is sodium citric acid, e.g., monosodium, disodium and trisodium citrate, or sodium tartaric acid, e.g., monosodium and disodium tartrate. An example of a monocarboxylate salt is sodium formate.

Other organic builders are polymers and copolymers of (meth)acrylic acid and maleic anhydride and the alkali metal salts thereof. More specifically such builder salts can consist of a copolymer which is the reaction product of about equal moles of methacrylic acid and maleic anhydride which has been completely neutralized to form the sodium salt thereof.

Suitable electrolytes for incorporation in the present compositions include inorganic salts. Non-limiting examples of suitable inorganic salts include: $MgI_2$, $MgBr_2$, $MgCl_2$, $Mg(NO_3)_2$, $Mg_3(PO_4)_2$, $Mg_2P_2O_7$, $MgSO_4$, magnesium silicate, NaI, NaBr, NaCl, NaF, $Na_3(PO_4)$, $NaSO_3$, $Na_2SO_4$, $Na_2SO_3$, $NaNO_3$, $NaIO_3$, $Na_3(PO_4)$, $Na_4P_2O_7$, sodium zirconate, $CaF_2$, $CaCl_2$, $CaBr_2$, $CaI_2$, $CaSO_4$, $Ca(NO_3)_2$, KI, KBr, KCl, KF, $KNO_3$, $KIO_3$, $K_2SO_4$, $K_2SO_3$, $K_3(PO_4)$, $K_4(P_2O_7)$, potassium pyrosulfate, potassium pyrosulfite, LiI, LiBr, LiCl, LiF, $LiNO_3$, $AlF_3$, $AlCl_3$, $AlBr_3$, $AlBr_3$, $AlI_3Al_2(SO_4)_3$, $Al(PO_4)$, $Al(NO_3)_3$, and including combinations of these salts or salts with mixed cations e.g. potassium alum $AlK(SO_4)_2$ and salts with mixed anions, e.g. potassium tetrachloroaluminate and sodium tetrafluoroaluminate.

The builders/electrolytes can be used in an amount ranging from about 0 to about 20 wt. % in one aspect, from about 0.1 to about 10 wt. % in another aspect, from about 1 to about 8 wt. % in a further aspect, and from about 2 to about 5 wt. % in a still further aspect, based on the total weight of the composition.

Bleaching Agents

In one aspect, the liquid detergent compositions may optionally comprise bleaching agents and bleaching agent activators to improve the bleaching and cleansing characteristics of the composition. In one aspect, the bleaching agent is selected from an oxygen bleach. Oxygen bleaches liberate hydrogen peroxide in aqueous solution. Among the compounds which produce hydrogen peroxide in water and serve as bleaches are peroxygen compounds. Exemplary peroxygen compounds include sodium perborate tetrahydrate and sodium perborate monohydrate. Additional peroxygen compounds that can be used are, for example, sodium percarbonate, peroxypyrophosphates, citrate perhydrates, and peracidic salts or peracids, such as perbenzoates, peroxophthalates, diperazelaic acid, phthaloimino peracid or diperdodecanedioic acid.

In one aspect, the peroxygen compound is used in combination with an activator. The activator lowers the effective operating temperature of the peroxygen bleaching agent. Bleach activators which can be used are compounds which, under perhydrolysis conditions, produce aliphatic peroxocarboxylic acids having 1 to 10 carbon atoms in one aspect, and from 2 to 4 carbon atoms in another aspect, and/or optionally substituted perbenzoic acid in a further aspect. Substances which contain O- and/or N-acyl groups of the specified number of carbon atoms and/or optionally substituted benzoyl groups are suitable activators. In one aspect the activator is selected from polyacylated alkylenediamines such as tetraacetylethylenediamine (TAED); acylated triazine derivatives such as 1,5-diacetyl-2,4-dioxohexahydro-1,3,5-triazine (DADHT); acylated glycolurils such as tetraacetylglycoluril (TAGU); N-acylimides such as N-nonanoylsuccinimide (NOSI); acylated phenolsulfonates such as n-nonanoyl and isononanoyl oxybenzenesulfonate (n- or iso-NOBS); carboxylic acid anhydrides such as phthalic anhydride; acylated polyhydric alcohols such as glycerin triacetate, ethylene glycol diacetate and 2,5-diacetoxy-2,5-dihydrofuran.

In general, when a bleaching agent is used, the compositions of the present technology may comprise from about 0.1 to about 50 wt. % in one aspect, from about 0.5 to about 35 wt. % in another aspect, and from about 0.75 to about 25 wt. % in a further aspect of bleaching agent by weight of the total weight of composition.

When utilized, the bleach activator is generally present in the composition in an amount of from about 0.1 to about 60 wt % in one aspect, from about 0.5 to about 40 wt % or even from about 0.6 to about 10 wt. % based on the total weight of the composition.

The bleach activator interacts with the peroxygen compound to form a peroxyacid bleaching agent in the wash water. In one aspect, a sequestering agent of high complexing power is included in the composition to inhibit any undesired reaction between such peroxyacid and hydrogen peroxide in the wash solution in the presence of metal ions. Suitable sequestering agents for this purpose include the sodium salts of nitrilotriacetic acid (NTA), ethylene diamine tetraacetic acid (EDTA), diethylene triamine pentaacetic acid (DETPA), diethylene triamine pentamethylene phosphonic acid (DTPMP); and ethylene diamine tetramethylene phosphonic acid (EDITEMPA). The sequestering agents can be used alone or in admixture, the amount of which is conventionally known in the art.

In order to avoid loss of peroxide bleaching agent, e.g. sodium perborate, resulting from enzyme induced decomposition, such as by a catalase enzyme, the compositions may additionally include an enzyme inhibitor compound, i.e., a compound capable of inhibiting enzyme induced decomposition of the peroxide bleaching agent. Suitable inhibitor compounds are disclosed in U.S. Pat. No. 3,606,990, the relevant disclosure of which is incorporated herein by reference. In one aspect, a suitable enzyme inhibitor is hydroxylamine sulfate and other water-soluble hydroxylamine salts.

Suitable amounts of the hydroxylamine salt inhibitors can be as low as about 0.01 to 0.4 wt. % in one aspect. Generally, however, suitable amounts of enzyme inhibitors can range up to about 15 wt. % in another aspect, and from about 1 to about 10 wt. % in a further aspect, based on the total weight of the composition.

Enzymes

The liquid detergent compositions of the present technology can optionally comprise one or more detergent enzymes which provide cleaning performance and/or fabric care benefits. Examples of suitable enzymes include, but are not limited to, hemicellulases, peroxidases, proteases, cellulases, xylanases, lipases, phospholipases, esterases, cutinases, pectinases, keratanases, reductases, oxidases, phenoloxidases, lipoxygenases, ligninases, pullulanases, tannases, pentosanases, malanases, β-glucanases, arabinosidases, hyaluronidase, chondroitinase, laccase, and amylases, or mixtures thereof.

Enzymes for use in compositions, for example, detergents can be stabilized by various techniques. The enzymes employed herein can be stabilized by the presence of water-soluble sources of calcium and/or magnesium ions in the finished compositions that provide such ions to the enzymes, or the enzymes can be adsorbed to carriers to protect them from premature degradation.

In one aspect, the amount of enzymes that can be employed range from about 0.1 to about 5 wt. % in one aspect, and from about 0.15 to about 2.5 wt. % in another aspect, based on the total weight of the composition.

Optical Brighteners

In one aspect, the liquid detergent can optionally comprise optical brighteners (whiteners) in order to eliminate graying and yellowing of the treated textile fabrics. These substances attach to the fibers and bring about a brightening and quasi-bleaching effect by converting invisible ultraviolet radiation into visible longer-wave light, where the ultraviolet light absorbed from the sunlight is emitted as pale bluish fluorescence and produces pure white with the yellow shade of grayed and/or yellowed laundry. Suitable compounds originate, for example, from the substance classes of the 4,4'-diamino-2,2'-stilbenedisulfonic acids (flavonic acids), 4,4'-distyrylbiphenylene, methylumbelliferones, coumarins, dihydroquinolinones, 1,3-diarylpyrazolines, naphthalimides, benzoxazole, benzisoxazole and benzimidazole systems, and the pyrene derivatives substituted by heterocycles.

The optical brighteners are usually used in amounts ranging from about 0.03 to about 0.3 wt. %, based on the total weight of the composition.

Fluorescent Brighteners

The liquid detergent can optionally comprise fluorescent brighteners. In one aspect, exemplary fluorescent brighteners include specific stilbene derivatives, more particularly diaminostilbenedisulphonic acids and their salts. The salts of 4,4'-bis(2-anilino-4-morpholino-1,3,5-triazinyl-6-amino) stilbene-2, 2'-disulphonic acid, and related compounds where the morpholino group is replaced by another nitrogen-comprising moiety, are suitable; as are the 4,4'-bis(2-sulphostyryl) biphenyl type. Mixtures of brighteners can be used. Further examples of stilbene derivatives include disodium 4,4'-bis-(2-diethanolamino-4-anilino-s-triazin-6-ylamino)stilbene-2:2' disulphonate, disodium 4,4'-bis-(2-morpholino-4-anilino-s-triazin-6-ylamino)stilbene-2:2' disulphonate, disodium 4,4'-bis-(2,4-dianilino-s-triazin-6-ylamino)stilbene-2:2'-disulphonate, monosodium 4',4"-bis-(2,4-dianilino-s-triazin-6-ylamino)stilbene-2-sulphonate, disodium 4,4'-bis-(4-phenyl-2,1,3-triazol-2-yl)-stilbene-2,2' disulphonate, disodium 4,4'-bis-(2-anilino-4-(1 methyl-2-hydroxyethylamino)-s-triazin-6-ylamino)stilbene-2,2' disulphonate, sodium 2(stilbyl-4"-(naphtho-1',2':4,5)-1,2,3-triazole-2"-sulphonate and 4,4'-bis(2-sulphostyryl)biphenyl. Brighteners are available as C.I. Fluorescent Brightener (CAS No. 13863-31-5), C.I. Fluorescent Brightener 28 (CAS No. 4404-43-7), C.I. Fluorescent Brightener 28, disodium salt (CAS No. 4193-55-9), C.I. Fluorescent Brightener 71, 244, 250, 260 (CAS No. 16090-02-1), C.I. Fluorescent Brightener 220 (CAS No. 16470-24-9), C.I. Fluorescent Brightener 235 (CAS No. 29637-52-3), and C.I. Fluorescent Brightener 263 (CAS No. 67786-25-8).

Fluorescent brighteners will typically be incorporated into the detergent compositions in concentrations ranging from about 0.001 to about 1 wt. % in one aspect, and from about 0.05 to about 0.5 wt. % in another aspect, based on the total weight of the composition.

Dye Transfer Inhibitors

The liquid detergent compositions of the present technology can optionally comprise one or more dye transfer inhibiting agents. Suitable dye transfer inhibiting agents include, but are not limited to, polyvinylpyrrolidone polymers, polyamine N-oxide polymers, copolymers of N-vinylpyrrolidone and N-vinylimidazole, polyvinyloxazolidones and polyvinylimidazoles or mixtures thereof.

The dye transfer inhibiting agents may be present at levels from about 0.0001 to about 10 wt. % in one aspect, from about 0.01 to about 5 wt. % in another aspect, and from about 0.1 to about 3 wt. % in another aspect, based on the total weigh of the composition.

Soil Release Agents

In the present liquid laundry detergent, a soil release agent may optionally be incorporated into the compositions. In one aspect, such a soil release agent is a polymer having random blocks of ethylene terephthalate and polyethylene oxide (PEO) terephthalate. The molecular weight of this polymeric soil release agent ranges from about 25,000 to about 55,000 daltons. Descriptions of such copolymers and their uses are provided in U.S. Pat. Nos. 3,959,230 and 3,893,929.

In one aspect, the soil release polymer is a crystallizable polyester with repeating units of ethylene terephthalate containing from about 10 to about 15 wt. % of ethylene terephthalate units together with from about 10 to about 50 wt. % of polyoxyethylene terephthalate units that are derived from a polyoxyethylene glycol of average molecular weight of from about 300 to about 6,000 daltons. The molar ratio of ethylene terephthalate units to polyoxyethylene terephthalate units in such a crystallizable polymeric compound is between 2:1 and 6:1. Examples of this polymer include the commercially available materials available under the trade names Zelcon 4780® and Zelcon 5126 from Dupont (see also U.S. Pat. No. 4,702,857).

In one aspect, the polymeric soil release agents useful in the present technology may also include cellulosic derivatives such as hydroxyether cellulosic polymers, and the like. Such agents are commercially available and include hydroxyethers of cellulose such as those available under the METHOCEL™ trade name from Dow Chemical. Cellulosic soil release agents for use herein also include those selected from $C_1$-$C_4$ alkyl and $C_4$ hydroxyalkyl cellulose (see U.S. Pat. No. 4,000,093).

In one aspect, soil release agents include graft copolymers of poly(vinyl ester) segments (e.g., $C_1$-$C_6$ vinyl esters, such as vinyl acetate) grafted onto polyalkylene oxide backbones, such as polyethylene oxide backbones as disclosed in European Patent Application 0 219 048. Soil release agents of this type are commercially available under the Sokalan™ HP-22 trade name from BASF Corporation.

In one aspect, the soil release agent is an oligomer with repeat units of terephthaloyl units, sulfoisoterephthaloyl units, oxyethyleneoxy and oxy-1,2-propylene units. The repeat units form the backbone of the oligomer and are terminated with modified isethionate end-caps. In one aspect, a soil release agent of this type comprises about one sulfoisophthaloyl unit, 5 terephthaloyl units, oxyethyleneoxy and oxy-1,2-propyleneoxy units in a ratio of from about 1.7 to about 1.8, and two end-cap units of sodium 2-(2-hydroxyethoxy)-ethanesulfonate. The soil release agent also comprises from about 0.5 to about 20 wt. %, of the oligomer, of a crystalline reducing stabilizer selected from the group consisting of xylene sulfonate, cumene sulfonate, toluene sulfonate, and mixtures thereof.

A more complete disclosure of soil release agents is contained in U.S. Pat. Nos. 4,018,569; 4,661,267; 4,702,857; 4,711,730; 4,749,596; 4,808,086; 4,818,569; 4,877,896; 4,956,447; 4,968,451; and 4,976,879. If utilized, soil release agents will generally comprise from about 0.01 to about 10.0 wt. % in one aspect, from about 0.1 to about 5 wt. % in another aspect, and from about 0.2 to about 3.0 wt. % in a further aspect, based on the total weight of the composition.

Anti-Redeposition Agents

In one aspect, the liquid detergent compositions can optionally include an anti-redeposition agent which functions to keep the soil removed from the treated fabric suspended in the wash water, thus preventing the redeposition of the soil back onto the fabric. Suitable anti-redeposition agents are, but not limited to, water soluble colloids, for example, gelatin, salts of ether sulfonic acids of starch or of cellulose or salts of acidic sulfuric acid esters of cellulose or of starch. Water soluble polyamides comprising acidic groups are also suitable for this purpose. Furthermore, soluble starch preparations and starch products other than those mentioned above can be used, for example, degraded starch, aldehyde starches, etc. It is also possible to use polyvinylpyrrolidone, polyvinyl alcohol and fatty amides. Acrylic acid/maleic acid copolymers having a molecular weight ranging from about 20,000 to about 100,000 daltons are also suitable for use herein. Such polymers are commercially available under the trade name Sokalan® CP-5 from BASF Corporation. In one aspect, the anti-redeposition agent is selected from cellulose ethers, such as sodium carboxymethyl cellulose, methylcellulose, hydroxyalkyl cellulose, such as hydroxyethyl methylcellulose, hydroxypropyl methylcellulose, carboxymethyl methyl cellulose, and mixtures thereof.

In one aspect, the anti-redeposition agents are used in amounts ranging from about 0.1 to about 5 wt. %, based on the total weight of the composition.

Fabric Softeners

The compositions of the present technology may optionally contain a fabric softening additive. Examples of fabric softening additives useful herein include alkyl quaternary ammonium alkyl quaternary ammonium compounds, ester quaternary ammonium compounds, cationic silicones, cationic polymers, silicones, clays, and mixtures thereof.

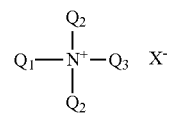

wherein $Q_1$ independently represents an alkyl or alkenyl group containing 15 to 22 carbon atoms; $Q_2$ independently is an alkyl group containing 1 to 4 carbon atoms; $Q_3$ is $Q_1$ or $Q_2$ or phenyl; and X is an anion selected from a halide (e.g., chloride, bromide), methyl sulfate and ethyl sulfate. The foregoing alkyl groups may optionally be substituted or contain functional groups or moieties such as —OH, —O—, —C(O)NH—, C(O)O—. Representative examples of these quaternary softeners include ditallow dimethyl ammonium chloride; ditallow dimethyl ammonium methyl sulphate; dihexadecyl dimethyl ammonium chloride; di(hydrogenated tallow) dimethyl ammonium methyl sulphate or chloride; di(coconut)dimethyl ammonium chloride dihexadecyl diethyl ammonium chloride; dibenhenyl dimethyl ammonium chloride.

In one aspect, the ester quaternary ammonium softeners are represented by the formula:

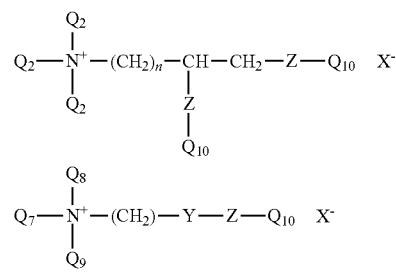

wherein $Q_2$ independently is as defined above, $Q_7$ is and alkyl group containing 1 to 4 carbon atoms, $Q_8$ is —$(CH_2)_n$—Z—$Q_{10}$, $Q_9$ is an alkyl or hydroxyalkyl group containing 1 to 4 carbon atoms or is $Q_8$, $Q_{10}$ is an alkyl or alkenyl group containing 12 to 22 carbon atoms, Y is a divalent alkene group containing 1 to 3 carbon atoms or the moiety —CH(OH)—CH$_2$—, Z is a moiety selected from —O—C(O)—O—, —C(O)O—C(O)O—, and —OC(O)—, and X is an anion as previously defined, and n is an integer from 1 to 4.

An illustrative examples of ester quaternary ammonium compounds are 1,2-ditallowyloxy-3-trimethyl ammoniopropane chloride (a ditallow ester of 2,3-dihydroxy propane trimethyl ammonium chloride), N,N-di(stearyl-oxyethyl)-N,N-dimethyl ammonium chloride and N,N-di(stearyl-oxyethyl)-N-hydroxyethyl-N-dimethyl ammonium chloride, wherein the stearyl group may be replaced with oleyl, palmityl or tallowyl (mixed chain length) groups.

In one aspect, the cationic silicones that are useful in the disclosed technology are found in the CTFA Dictionary and in the International Cosmetic Ingredient Dictionary, Vol. 1 and 2, 5th Ed., published by the Cosmetic Toiletry and Fragrance Association, Inc. (CTFA) (1993), the pertinent disclosures of which are incorporated herein by reference. Quaternium-80, Silicone Quaternium-1, Silicone Quaternium-2, Silicone Quaternium-2 Panthenol Succinate, Silicone Quaternium-3, Silicone Quaternium-4, Silicone Quaternium-5, Silicone Quaternium-6, Silicone Quaternium-7, Silicone Quaternium-9, Silicone Quaternium-10, Silicone Quaternium-11, Silicone Quaternium-12, Silicone Quaternium-15, Silicone Quaternium-16, Silicone Quaternium-16/Glycidoxy Dimethicone Crosspolymer, Silicone Quaternium-17, Silicone Quaternium-18, Silicone Quaternium-20 and Silicone Quaternium-21.

Cationic polymers are also useful as fabric softening agents. Suitable cationic polymers can be synthetically derived or natural polymers can be synthetically modified to contain cationic moieties. Exemplary cationic polymers are disclosed under the personal care adjuvant section hereinabove.

pH Adjusters (Home Care)

In one aspect, the liquid detergent of the present technology has a neat pH of from about 5 to about 13 in one aspect, from about 6 to about 9 in another aspect, from about 7 to about 8.5 in a further aspect, and from about 7.5 to about 8 in a still further aspect. Advantageously, the pH of the liquid detergent composition is not dictated by the need to neutralize the staged emulsion polymer of the present technology, in that the polymer's ability to stably suspend particulates is independent of pH. To adjust or maintain a desired pH, the liquid detergent may contain a pH adjusting agent and/or buffering agent in a sufficient amount to attain the above-mentioned pH. The pH adjusting agents useful in the present detergent compositions include alkalizing agents. Suitable alkalizing agents include, for example, ammonia solution, triethanolamine, diethanolamine, monoethanolamine, potassium hydroxide, sodium hydroxide, sodium phosphate dibasic, soluble carbonate salts, and combinations thereof. In the event that it is necessary to reduce the pH of the liquid laundry composition, inorganic and organic acidity agents may be included. Suitable inorganic and organic acidifying agents include, for example, HF, HCl, HBr, HI, boric acid, sulfuric acid, phosphoric acid, and/or sulphonic acid; or boric acid. The organic acidifying agent can include substituted and substituted, branched, linear and/or cyclic carboxylic acids and anhydrides thereof (e.g., citric acid, lactic acid).

Perfumes and Fragrances (Home Care)

The liquid detergent composition of the present technology optionally comprises one or more enduring perfume ingredients which are substantive to fabrics, thus minimizing the perfume lost during the laundering process. Substantive perfume ingredients are those fragrance compounds that effectively deposit on fabrics during the cleaning process and are detectable on the subsequently dried fabrics by people with normal olfactory acuity. Enduring perfumes are those which are effectively retained and remain on the laundry for a long-lasting aesthetic benefit with a minimum amount of material, and not lost and/or wasted in the cleaning, rinsing, and/or drying steps of the laundering process. In one aspect, the perfume may be selected from alcohols, ketones, aldehydes, esters, ethers, nitriles, alkenes, and mixtures thereof. Suitable perfumes, for example, are disclosed in U.S. Pat. Nos. 8,357,649 and 8,293,697, the pertinent disclosures of which is incorporated herein by reference.

If present, the perfume is typically incorporated in the present compositions at a level from about 0.001 to about 10 wt. %, or from about 0.01 to 5 wt. %, or from about 0.1 to about 3 wt. %, based on the total weight of the composition.

Deposition Aids

Both for the efficient deposition of perfume and for the deposition of other benefit agents, such as silicone the liquid laundry composition optionally comprises a deposition aid. In one aspect, a suitable deposition aid includes those which are substantive to cellulose.

In one aspect, the deposition aid is a polysaccharide. In one aspect the polysaccharide is a β-1,4-linked backbone of saccharide repeating units which is substantive to cellulose. Exemplary polysaccharides are cellulose, a cellulose derivative, or another β-1,4-linked polysaccharide having an affinity for cellulose, such as polymannan, polyglucan, polyglucomannan, polyxyloglucan and polygalactomannan, and mixtures thereof. In one aspect, the polysaccharide is selected from polyxyloglucans and polygalactomannans. In one aspect, the polysaccharides are locust bean gum, tamarind, xyloglucan, guar gum, cassia gum or mixtures thereof.

Cationic polymers can also be used as deposition aids. Examples of such cationic polymers are cationically modified cellulose (e.g., Polyquaternium-4 and 10), cationically modified starch (e.g., Starch Hydroxypropyl Trimonium Chloride), cationically modified guar (e.g., Guar Hydroxypropyl Trimonium Chloride), and cationically modified cassia (e.g., Cassia Hydroxypropyl Trimonium Chloride), polymers and copolymers comprising repeating units derived from poly diallyl dimethyl ammonium halides DADMAC, and copolymers derived from DADMAC and vinyl pyrrolidone, acrylamides, imidazoles, imidazolinium halides, (e.g., Polyquarternium-6, 7, 22 and 39). The cationically modified celluloses, starches, guar and cassia have a molecular weight ranging from about 15,000 to about 500,000,000 daltons in one aspect, from about 50,000 to about 10,000,000 daltons in another aspect, and from about 250,000 to about 5,000,000 daltons in a further aspect, and from about 350,000 to about 800,000 daltons in a still further aspect.

In one aspect, a suitable deposition aid includes those which are substantive to polyester. The polyester substantive deposition aid is a polymer that is derived from dicarboxylic acids and polyols. In one aspect, the polymer comprises units derived from (poly)ethylene glycol and terephthalic acid.

In one embodiment, the deposition aid is a perfume deposition polyamine having a molecular weight of from about 1,000 to about 50,000 daltons in one aspect and from about 5,000 to about 30,000 daltons in another aspect. In one aspect, the perfume deposition aid is a polyamine selected from polyethyleneimines available under the Lupasol™ trade name from BASF Corporation; poly[oxy(methyl-1,2-ethanediyl)], α-(2-aminomethylethyl)-ω-(2-aminomethylethoxy)-(CAS No. 9046-10-0); poly[oxy(methyl-1,2-ethanediyl)], α-hydro-ω-(2-aminomethylethoxy)-, ether with 2-ethyl-2-(hydroxymethyl)-1,3-propanediol (3:1) (CAS No. 39423-51-3), which are commercially available under the Jeffamine™ trade name from Huntsman Corporation. In one aspect the deposition aid is an amino group containing compound selected from 1,2-ethanediamine, $N^1,N^1$-bis(2-aminoethyl)- (CAS No. 4097-89-6); 1,2-ethanediamine, $N^1$-(2-aminoethyl)- (CAS No. 98824-35-2); 1,3-propanediamine, $N^1$-(3-aminopropyl)-, (CAS No. 56-18-8); and 1,3-cyclohexanediethanamine (CAS No. 40027-36-9); and mixtures thereof.

The amount of deposition aid utilized in the liquid detergent compositions of the present technology can range from about 0.01 to about 5 wt. %, or from about 0.05 to about 3 wt. %, or from about 0.1 to about 2 wt. %, or from about 0.5 to about 1 wt. %, based on the weight of the total composition.

Odor Control Agents

In yet another embodiment, the liquid detergent composition optionally comprises odor control agents such as cyclodextrin. As used herein, the term "cyclodextrin" includes any of the known cyclodextrins such as unsubstituted cyclodextrins containing from six to twelve glucose units, especially, alpha-cyclodextrin, beta-cyclodextrin, gamma-cyclodextrin and/or their derivatives and/or mixtures thereof. The alpha-cyclodextrin consists of six glucose units, the beta-cyclodextrin consists of seven glucose units, and the gamma-cyclodextrin consists of eight glucose units arranged in donut-shaped rings. The specific coupling and conformation of the glucose units give the cyclodextrins rigid, conical molecular structures with hollow interiors of specific volumes. The "lining" of each internal cavity is formed by hydrogen atoms and glycosidic bridging oxygen atoms; therefore, this surface is fairly hydrophobic. The unique shape and physical-chemical properties of the cavity enable the cyclodextrin molecules to absorb (form inclusion complexes with) organic molecules or parts of organic molecules which can fit into the cavity. Many odorous molecules can fit into the cavity including many malodorous molecules and perfume molecules. Cyclodextrins, particularly the cationic cyclodextrins described below, can also be utilized for the delivery of perfume actives to cellulosic fabrics (see also in U.S. Pat. No. 8,785,171).

Cyclodextrins that are useful in the present technology are highly water-soluble such as, alpha-cyclodextrin and/or derivatives thereof, gamma-cyclodextrin and/or derivatives thereof, derivatized beta-cyclodextrins, and/or mixtures thereof. The derivatives of cyclodextrin consist mainly of molecules wherein some of the OH groups are converted to OR groups. Cyclodextrin derivatives include, e.g., those with short chain alkyl groups such as methylated cyclodextrins, and ethylated cyclodextrins, e.g., wherein the substituent(s) is a methyl or an ethyl group; those with hydroxyalkyl substituted groups, e.g., wherein the substituent is a hydroxypropyl and/or hydroxyethyl group; branched cyclodextrins such as maltose-bonded cyclodextrins; cationic cyclodextrins, e.g., wherein the substituent(s) is a 2-hydroxy-3-(dimethylamino)propyl ether moiety (which is cationic at low pH); quaternary ammonium, e.g., wherein the substituent(s) is a 2-hydroxy-3-(trimethylammonio)propyl ether chloride moiety; anionic cyclodextrins such as carboxymethyl cyclodextrins, cyclodextrin sulfates, and cyclodextrin succinylates; amphoteric cyclodextrins such as carboxymethyl/quaternary ammonium cyclodextrins; cyclodextrins wherein at least one glucopyranose unit has a 3-6-anhydro-cyclomalto structure, e.g., the mono-3-6-anhydrocyclodextrins, as disclosed in "Optimal Performances with Minimal Chemical Modification of Cyclodextrins", F. Diedaini-Pilard and B. Perly, The 7th International Cyclodextrin Symposium Abstracts, April 1994, p. 49, said references being incorporated herein by reference; and mixtures thereof. Other cyclodextrin derivatives are disclosed in U.S. Pat. Nos. 3,426,011; 3,453,257; 3,453,258; 3,453,259; 3,453,260; 3,459,731; 3,553,191; 3,565,887; 4,535,152; 4,616,008; 4,678,598; 4,638,058; 4,746,734; 5,942,217; and 6,878,695).

Other agents suitable odor control include those described in: U.S. Pat. Nos. 5,968,404; 5,955,093; 6,106,738; 5,942,217; and 6,033,679.

The liquid detergents can optionally comprise other ingredients suitable for laundry and dish applications including, adjuvants, benefit agents or aesthetic agents such as, for example, anti-microbial agents, preservatives, anti-oxidants, UV absorption agents, pigments, anti-shrink agents, anti-wrinkle agents, opacifiers and pearlescent agents (e.g., mica, coated mica, $TiO_2$, ZnO, ethylene glycol monostearate (EGMS), ethylene glycol distearate (EGDS), polyethylene glycol monostearate (PGMS) or polyethyleneglycol distearate (PGDS)), and aesthetic beads and flakes, as well as aesthetic gas bubbles.

Suspended Particles

It is well known that liquid laundry and dish detergents provide a hostile environment for desirable functional components such as, for example, bleaches, enzymes, builders, softeners, perfumes, thickeners, and the like contained in the detergent. Functional components contained in heavy duty liquid detergents, particularly concentrated detergent compositions, can be denatured by surfactants and other incompatible co-ingredients within the composition. This results in decreased efficacy and/or the need for additional materials to compensate for the loss. However, such materials are expensive and some are generally less effective when employed at high levels.

Components which are sensitive to high concentrations of surfactant and/or other co-ingredients can be encapsulated and protected until they are ready for release in the wash medium. Moreover, components (e.g. perfumes, fabric softeners, and suds suppressors) which are more desirably released later in the wash and/or rinse cycle can be encapsulated and controllably released when needed. Other components, such as, for example, anti-redeposition agents, builder zeolites, fungicides, odor control agents, antistatic agents, fluorescent whitening agents, antimicrobial actives, UV protection agents, brighteners, and the like can be granulated, agglomerated, or encapsulated and dosed into the liquid detergent as suspended particles.

Liquid components that are immiscible with the liquid detergent compositions, such as amino silicones and silicone defoamers can be encapsulated. Functional polymers including color protecting polymers, fabric protection polymers and soil release polymers, such as PVP (polyvinylpyrrolidone), and polyacrylate copolymers that are prone to be salted out due to the high electrolyte concentration in liquid detergent compositions also can be incorporated in an encapsulated form.

In one aspect, it may be desirable to encapsulate one or more enzymes since enzymes are highly efficient laundry washing ingredients used to promote removal of soils and stains during the cleaning process. In one aspect, it may also be desirable to encapsulate bleach and enzymes separately due to incompatibility issues with one another to further enhance detergent efficacies.

In one aspect, the liquid detergent composition comprises an encapsulated perfume. Suitable encapsulated perfumes include those described in U.S. Patent Application Publication Nos. 2003/215417; 2003/216488; 2003/158344; 2003/165692; 2004/071742; 2004/071746; 2004/072719; 2004/072720; 2003/2038291; 2003/195133; 2004/087477; 2004/0106536; U.S. Pat. Nos. 6,645,479; 6,200,949; 4,882,220; 4,917,920; 4,514,461; 4,234,627; U.S. Reissue Pat. No. RE 32,713; and European Published Patent Application No. EP 1 393 706.

In one aspect, the detergent ingredients, adjuvants, or benefit agents may be encapsulated in the form of microcapsules or microencapsulates containing one or more of the materials. The terms "microcapsules" and "microencapsulates" are used interchangeably herein. One type of microcapsule, referred to as a wall or shell capsule, comprises a generally spherical hollow shell of insoluble polymer material, within which the ingredient, adjuvant or benefit agent is contained.

In one aspect, the microcapsule is one that is friable. "Friability" refers to the propensity of the microcapsules to rupture or break open when subjected to direct external pressures or shear forces. In one aspect, the microcapsules utilized are "friable" if, while attached to fabrics treated therewith, they can be ruptured by the forces encountered when the capsule containing fabrics are manipulated by being worn or handled (thereby releasing the contents of the capsule).

In one aspect, "friability" refers to the propensity of the microcapsules to rupture or break open when subjected to direct shear forces within the washing media during the wash cycle (thereby releasing the contents of the capsule). In one aspect, the microcapsules utilized are "friable" if they can be ruptured by the temperature and/or forces encountered during the drying cycle (thereby releasing the contents of the capsule).

In one aspect, the shell of the microcapsule comprises an aminoplast resin. A method for forming such shell capsules includes polycondensation. Aminoplast resins are the reaction products of one or more amines with one or more aldehydes, typically formaldehyde. Non-limiting examples of suitable amines include urea, thiourea, melamine and its derivates, benzoguanamine and acetoguanamine and combinations of amines. Suitable cross-linking agents (e.g., toluene diisocyanate, divinyl benzene, butane diol diacrylate etc.) may also be used and secondary wall polymers may also be used as appropriate, e.g. anhydrides and their derivatives, particularly polymers and co-polymers of maleic anhydride as disclosed in International Published Patent Application No. WO 02/074430. In another embodiment, the shell of the microcapsules comprises urea-formaldehyde; melamine-formaldehyde; or combinations thereof.

In one aspect, the encapsulated material includes encapsulated materials, particles or beads having liquid cores. These particles function especially well in terms of stability within the detergent composition prior to use, yet are suitably unstable in the washing media formed from such products. In one aspect the liquid core has an ionically charged polymeric material encapsulated by a semipermeable membrane. This membrane is one which can be formed by interaction of some of the ionically charged polymer in the core with another polymeric material of opposite charge. Non-limiting examples of suitable liquid core suspension particles are available in U.S. Pat. No. 7,169,741.

In one aspect, the suspension particles are visibly distinct beads suspended within the liquid detergent composition. In another aspect, the suspension particles are not visibly distinct in the liquid detergent composition. Particle or bead visibility is, of course, determined by a number of interrelated factors including size of the beads and the various optical properties of the beads and of the liquid composition they are dispersed within. A transparent or translucent liquid matrix in combination with opaque or translucent beads will generally render the particles visible if they have a minor dimension of 0.2 mm or greater, but smaller beads may also be visible under certain circumstances. Even transparent beads in a transparent liquid matrix might be visibly distinct if the refractive properties of the particles and liquid are sufficiently different. Furthermore, even particles dispersed in a somewhat opaque liquid matrix might be visibly distinct if they are big enough and are different in color from the matrix.

In one aspect, the suspension particles, encapsulated materials and beads have a particle size in the range from about 300 nanometers to about 5 mm. As defined herein, "particle size" means that at least one of said suspension particles have a longest linear dimension as defined. Those of skill in the art will understand that suitable techniques to measure particle size are available. For example, suspension particles having a particle size of from about 0.017 to about 2000 microns can be measured by a light scattering technique such as with a Beckman Coulter Particle Size Analyzer, wherein a sample of the composition is diluted to a concentration ranging from 0.001 to 1% v/v using a suitable wetting and/or dispersing agents. The measurements are recorded providing average particle diameter with distribution; optical microscopy can be used to detect particle sizes between 5 microns to about 500 microns; and macroscopic measuring techniques can measure from 0.5 mm to 5 mm.

It has importantly been found that the liquid detergent composition of the present technology can suspend a vast range of particles, from visibly distinct particles with particle size up to about 5 mm to capsules below 500 µm. In one embodiment, the particle size is from about 0.5 mm to about 5 mm in one aspect, from about 0.5 mm to about 3 mm in another aspect, and from about 0.5 mm to about 1 mm in a further aspect. In another embodiment, the suspension particles are not visibly distinct, comprising a particle size of from about 1 nanometer to about 500 µm, or from about 1 µm to about 300 µm, or from about 5 µm to about 200 µm.

The suspension particles, encapsulated materials and beads useful herein will have a density of from about 700 $kg/m^3$ to about 4,260 $kg/m^3$, alternatively from about 800 $kg/m^3$ to about 1,200 $kg/m^3$, alternatively from about 900 $kg/m^3$ to about 1,100 $Kg/m^3$, alternatively from about 940 $kg/m^3$ to about 1,050 $kg/m^3$, alternatively from about and 970 $kg/m^3$ to about 1,047 $kg/m^3$, alternatively from about and 990 $kg/m^3$ to about 1,040 $kg/m^3$ at about 25® C.

In one aspect, the difference between the density of the liquid matrix and the density of the particles is less than about 10% of the liquid matrix density in one aspect, less than about 5% in another aspect, less than about 3% in still another aspect, less than about 1% in a further aspect, and less than about 0.5% in a still further aspect, at about 25® C. In one aspect, the liquid matrix and the suspension particle have a density difference of from about 1 $kg/m^3$ to about 3,260 $kg/m^3$ in one aspect, from about 10 $kg/m^3$ to about 200 $kg/m^3$ in another aspect, and from about 10 $kg/m^3$ to about 100 $kg/m^3$ in a further aspect.

The liquid detergent compositions of the present technology are capable of suspending particles for at least 4 weeks at 25® C. Stability can be evaluated by direct observation or by image analysis, by having colored particles suspended in a transparent liquid contained in a transparent bottle. A freshly made composition of the present technology is considered to be stable if less than 10 wt. %, or less than 5 wt. %, or less than 1 wt. % in a further aspect of the particles settle to the bottom or cream to the top of the container after 4 weeks static storage.

Particles suitable for use in the liquid detergents of the present technology should be physically and chemically compatible with the detergent matrix ingredients, but they can disintegrate in use without leaving residues on fabrics and/or hard surfaces such as wash machine and dryer interiors. Thus, within the liquid matrix of the detergent compositions, the particles are capable of withstanding a force before bursting or breaking of from about 20 mN to about 20,000 mN in one aspect, from about 50 mN to about 15,000 mN in another aspect, and from about 100 mN to about 10,000 mN in a further aspect. This strength makes them suitable for industrial handling, including the liquid detergent manufacturing processes. They can also withstand pumping and mixing operations without significant breakage and are also stable on transport. At the same time, the particles herein disintegrate readily in use by virtue of their osmotic behavior in dilute aqueous media such as agitated washing media.

The present technology is illustrated by the following examples that are merely for illustration and are not to be regarded as limiting the scope of the technology or the way it can be practiced. Unless specifically indicated otherwise, parts and percentages are given by weight and are based on 100 percent active material.

Test Methodology
Yield Stress

The yield stress values for the formulations containing the polymers of the present technology are determined by two methods:

Method 1: Oscillatory measurements on a controlled stress rheometer (TA Instruments Discovery HR-2 rheometer, New Castle, Del.) utilizing plate geometry (40 mm 2® cone-plate geometry) at 25® C. The oscillatory measurements are performed at a fixed frequency of 1 rad/sec. The elastic and viscous moduli (G' and G", respectively) are obtained as a function of increasing stress amplitude. The stress corresponding to the crossover of G' and G" is noted as the Crossover Yield Stress.

Method 2: Steady state shear measurement utilizing plate geometry (40 mm 2° cone-plate geometry) at 25® C. The steady shear flow curve measurements were performed with a shear rate range from $0.0001 \text{ s}^{-1}$ to $10 \text{ s}^{-1}$. The H-B Yield Stress (HB) is obtained by fitting the data with a Herschel-Bulkley model.

Elevated Temperature Rheology

The elevated temperature rheology experiments are performed to characterize the formula stability at elevated temperatures. Oscillatory temperature sweep measurements on rheometer utilizing plate geometry (40 mm 2® cone-plate geometry) is performed with a temperature range from 20® C. to 45® C. at a fixed frequency of 0.1 rad/sec and a fixed oscillatory stress of 1 Pa. The elastic and viscous moduli (G' and G" respectively) are obtained as a function of increasing temperature. Tan δ is defined as G"/G' which characterizes the material liquid-like or solid-like behavior. Higher numbers of tan δ (i.e., >1) corresponds to less stable formulation (more liquid like) and lower numbers of tan δ (i.e., <1) indicates more stable formulation.

Brookfield Viscosity (BFV)

Brookfield rotating spindle method (all viscosity measurements reported herein are conducted by the Brookfield method whether mentioned or not): The viscosity measurements are calculated in mPa·s, employing a Brookfield rotating spindle viscometer, Model RVT (Brookfield Engineering Laboratories, Inc.), at about 20 revolutions per minute (rpm), at ambient room temperature of about 20 to 25® C. (BV viscosity). Spindle sizes are selected in accordance with the standard operating recommendations from the manufacturer. Generally, spindle sizes are selected as follows:

| Spindle Size No. | Viscosity Range (mPa · s) |
| --- | --- |
| 1 | 1-50 |
| 2 | 500-1,000 |
| 3 | 1,000-5,000 |
| 4 | 5,000-10,000 |
| 5 | 10,000-20,000 |
| 6 | 20,000-50,000 |
| 7 | >50,000 |

The spindle size recommendations are for illustrative purposes only. The artisan of ordinary skill in the art will select a spindle size appropriate for the system to be measured. A No. 3, 4 or 5 spindle was utilized for the viscosity measurements herein.

Bead Suspension Test

The ability of a polymer system to suspend active and/or aesthetically pleasing insoluble oily and particulate materials is important from the standpoint of product efficacy and appeal. A six-dram vial (approximately 70 mm high×25 mm in diameter) is filled to the 50 mm point with the test formulation. Each sample vial is centrifuged to remove any trapped air bubbles contained in the formulation. Approximately 0.1 to 0.2 g of mixed large beads (Lipopearls™ DS5293 beads, commercially available from Lipo Technologies), and medium beads (Unispheres™ NTL-2512 and NTL-2103 beads, commercially available from InduChem AG) and small beads (EcoBeads™ ONYX, commercially available from FloraTech), are placed in each vial and stirred gently with a wooden stick until they are uniformly dispersed throughout the sample. The position of the beads within each sample vial is noted by taking a photograph immediately after preparation to establish the initial position of the beads within the formulation. The vials are placed in an aging oven at 45® C. to age the samples for a 12-week period or in an aging oven at 50® C. to age the samples for a 6-week period. The bead suspension properties of each sample are visually evaluated after the 6 or 12-week test period. If the initial position of the beads is unchanged following the conclusion of the test period, the sample passes. If the initial position of one or more of the beads changes (or the beads settle to the bottom of the vial or cream to the top of the vial) following the conclusion of the test period, the sample fails.

Turbidity

The clarity (turbidity) of a composition is determined in Nephelometric Turbidity Units (NTU) employing a nephelometric turbidity meter (Mircro 100 Turbidimeter, HF Scientific, Inc.) at ambient room temperature of about 20 to 25® C. Distilled water (NTU=0) is utilized as a standard. Six-dram screw cap vials (70 mm×25 mm) are filled almost to the top with test sample and centrifuged at 2200 rpm until all bubbles are removed. Upon centrifugation, each sample vial is wiped with tissue paper to remove any smudges before placement in the turbidity meter. The sample is placed in the turbidity meter and a reading is taken. Once the reading stabilizes the NTU value is recorded. The vial is given one-quarter turn and another reading is taken and recorded. This is repeated until four readings are taken. The lowest of the four readings is reported as the turbidity value. Lower turbidity values indicate clearer (less turbid) compositions.

The following abbreviations and trade names are utilized in the examples.

| Ingredient Descriptions and Abbreviations | |
| --- | --- |
| AM (E-Sperse ® RS-1618) | Amphiphilic crosslinker with two polymerizable reactive groups from Ethox Chemical, LLC |
| BEM | Sipomer ® Polyethoxylated (25 moles) Behenyl Methacrylate (66.67% BEM/33.33% MAA by wt.), Rhodia |
| n-BA | n-Butyl Acrylate |
| APE | Allyl Pentaerythritol (Crosslinker) |
| ASE Polymer | Carbopol ™ Aqua SF-1, INCI Name: Acrylates Copolymer. A single-stage crosslinked emulsion copolymer prepared from (meth)acrylic acid and a $C_1$-$C_4$ alkyl ester of (meth)acrylic acid; Supplied as a polymer emulsion with 30 wt. % active solids, Lubrizol Advanced Materials, Inc. |
| Linear $C_{12}$-$C_{15}$ Ethoxylated (7) Alcohol | Tomadol ™25-7 Nonionic Ethoxylated Surfactant (≈7 moles ethoxylation), INCI: C12-15 Pareth-7, Evonik Corporation (100% active) |
| Linear $C_{12-15}$ Ethoxylated (9) Alcohol | Tomadol ™25-9 Nonionic Ethoxylated Surfactant (≈9 moles ethoxylation), INCI: C12-15 Pareth-9; Evonik (100% active) |
| CAPB | Chembetaine ™ CAD, Cocamidopropyl Betaine (amphoteric surfactant), Lubrizol Advanced Materials, Inc. (35% active) |
| Etidronic acid | 1-Hydroxyl ethylidene-1,1-Diphosphonic Acid, Dequest ™ 2016, Scale Inhibitor, Italmatch Chemicals |
| DI Water | Deionized Water |
| EA | Ethyl Acrylate |
| HEMA | 2-Hydroxyethyl Methacrylate |
| LAS | Linear Alkylbenzene Sulfonic Acid (anionic surfactant), INCI Dodecyl Benzene Sulfonic Acid, Bio-Soft ™ S101, Stepan Company (96% active) |
| PVA | Selvol ®203 Polyvinyl Alcohol (hydrolysis % = 87-89%), Sekisui Corporation |
| SAM Polymer | Surfactant Activated Microgel Polymer, prepared from EA/n-BA/HEMA/BEM (20.5/27.5/45/7 wt. %) and 1 wt. part of the E-Sperse ® RS-1618 amphiphilic crosslinking surfactant per 100 wt. parts of monomer (Example 17 of WO 2016/100183). |
| SLES-1 | Sodium Laureth Sulfate - 1 mole of ethoxylation (anionic surfactant), Sulfochem ™ ES-1, Lubrizol Advanced Materials, Inc. (26.7% active) |
| SLES-2 | Sodium Laureth Sulfate - 2 moles of ethoxylation (anionic surfactant), Sulfochem ™ ES-2, Lubrizol Advanced Materials, Inc. (27% active) |
| SLS | Sulfochem ™ Sodium Lauryl Sulfate (anionic surfactant), Lubrizol Advanced Materials, Inc. (30% active) |
| SLAS | Linear Alkyl Benzene Sodium Sulfonate (anionic surfactant); INCI: Sodium C10-13 Alkyl Benzenesulfonate, Bio-Soft ™ D-40, Stepan Company (38% active) |
| SXS | Sodium Xylene Sulfonate (Hydrotrope) |
| TBHP | t-butyl hydroperoxide (70%), Alfa Aesar |
| TMPTA | trimethylolpropane triacrylate (Crosslinker) |
| VA-086 | Azo VA-086 is 2,2'-azobis[2-methyl-N-(2-hydroxyethyl)propionamide], Wako |

Example 1 (Comparative)

Monomer Composition: EA/n-BA/MAA/HEMA/BEM/AM*(35/15/20/25/5/1*wt. % Total Monomers) (AM*=1 wt. part/100 wt. parts monomer)

An emulsion polymer was prepared in a single stage polymerization process as follows. A monomer premix was made by mixing 150 grams of deionized D.I. water, 5 grams of AM, 8.33 grams of 30% SLS, 175 grams of EA, 75 grams n-BA, 100 grams of MAA, 125 grams of HEMA, and 33.33 grams of BEM. Initiator A was made by dissolving 4 grams of VA-086 in 40 grams of D.I. water. Initiator B was prepared by dissolving 0.75 grams of VA-086 in 100 grams of D.I. water. A 3-liter reactor was charged with 800 grams of D.I. water and 1.67 grams of SLS, and then was heated to 87® C. under a nitrogen blanket with agitation. After the contents of the reactor reached 87® C., initiator A was then added to the reactor. After 3 minutes, the monomer premix was metered into the reactor over a period of 120 minutes at a constant metering rate. About 1 minute after the start of monomer premix metering, Initiator B was metered into the reactor over a period of 150 minutes at a constant metering rate. The reaction temperature was maintained at 87® C. After completion of the Initiator B feed, the temperature of the reactor contents was maintained at 87® C. for 60 minutes. The reactor contents were then cooled to 49® C. A solution of 0.61 grams of 70% TBHP and 0.38 grams of SLS in 15 grams of D.I. water was added to the reactor. After 5 minutes, a solution of 0.59 grams of erythorbic acid in 15 grams of D.I. water was added to the reactor. The reactor contents were maintained at 49® C. After 30 minutes, a solution of 0.69 grams of 70% TBHP and 0.29 grams of SLS in 15 grams of D.I. water was added to the reactor. After 5 minutes, a solution of 0.59 grams of erythorbic acid in 15 grams of D.I. water was added to the reactor. The reactor contents were maintained at 49® C. for about 30 minutes. Then, the reactor contents were cooled to room temperature (approximately 22° C.) and filtered through 100-micron filter cloth. The polymer emulsion had a solids content of 29.7 wt. %.

Example 2

Monomer Composition:
First Stage=EA/n-BA/MAA/HEMA/BEM/AM*(28/12/16/20/4/0.8*wt. % total monomers) (AM*=0.8 wt. part/100 wt. parts monomer)
Second Stage=EA/n-BA/MAA/HEMA/BEM (7/3/4/5/1 wt. % total monomers)
Weight Ratio: 1st stage polymer:2nd stage polymer=8:2

A two-stage emulsion polymer was prepared as follows. A first monomer premix was made by mixing 120 grams of D.I. water, 4 grams of AM, 8.33 grams of SLS, 140 grams of EA, 60 grams of n-BA, 80 grams of MAA, 100 grams of HEMA, and 26.67 grams of BEM. A second monomer premix was made by mixing 40 grams of D.I. water, 1.67 grams of SLS, 35 grams of EA, 15 grams of n-BA, 20 grams of MAA, 25 grams of HEMA, and 6.67 grams of BEM. Initiator A was prepared by dissolving 4 grams of VA-086 in 40 grams of D.I. water. Initiator B was prepared by dissolving 0.75 grams of VA-086 in 100 grams of D.I. water. A 3-liter reactor was charged with 640 grams of D.I. water and 1.33 grams of SLS. The reactor contents were then heated to 87° C. under a nitrogen blanket with agitation and maintained at this temperature throughout the polymerization. Initiator A was then added to the reactor. After about 3 minutes, the first monomer premix was metered into the reactor. About 1 minute after the start of first monomer premix feed, Initiator B was metered into the reactor over a period of 175 minutes without interruption at a constant metering rate. After the first monomer premix addition was completed, a solution of 3.33 grams of SLS and 133 grams of D.I. water was added to the reactor. After a 15-minute hold, the second monomer premix feed was then metered into the reactor. The total metering time of first and second monomer premixes was over a period of 120 minutes at a constant metering rate. After completion of the Initiator B feed, the temperature of the reactor was maintained at 87° C. for an additional 60 minutes at a constant metering rate. The reactor contents were then cooled to 49° C. A solution of 0.61 grams of 70% TBHP and 0.38 grams of SLS in 15 grams of D.I. water was added to the reactor. After 5 minutes, a solution of 0.59 grams of erythorbic acid in 15 grams of D.I. water was added to the reactor. The reactor contents were maintained at 49° C. After 30 minutes, a solution of 0.64 grams of 70% TBHP and 0.29 grams of SLS in 15 grams of D.I. water was added to the reactor. After 5 minutes, a solution of 0.59 grams of erythorbic acid in 15 grams of D.I. water was added to the reactor. The reactor contents were maintained at 49° C. for about 30 minutes. Then, the reactor contents were cooled to room temperature (approximately 22° C.) and filtered through 100-micron filter cloth. The emulsion polymer had a solids content of 30.7%.

Example 3

Monomer Composition:
First Stage=EA/n-BA/MAA/HEMA/BEM/AM*(28/12/16/20/4/0.8*wt. % total monomers) (AM*=0.8 wt. part/100 wt. parts monomer)
Second Stage=EA/n-BA/MAA/HEMA/BEM (7/3/4/5/1 wt. % total monomers)
Weight Ratio: 1st stage polymer:2nd stage polymer=8:2

A two-stage emulsion polymer was prepared as follows. A first monomer premix was prepared by mixing 120 grams of D.I. water, 4 grams of AM, 8.33 grams of SLS, 140 grams of EA, 60 grams of n-BA, 80 grams of MAA, 100 grams of HEMA, and 26.67 grams of BEM. A second monomer premix was prepared by mixing 40 grams of D.I. water, 1.67 grams of SLS, 35 grams of EA, 15 grams of n-BA, 20 grams of MAA, 25 grams of HEMA, and 6.67 grams of BEM. Initiator A was prepared by dissolving 4 grams of VA-086 in 40 grams of D.I. water. Initiator B was prepared by dissolving 0.75 grams of VA-086 in 100 grams of D.I. water. A 3 liter reactor was charged with 640 grams of D.I. water, 1.67 grams of SLS and 12.5 grams of PVA, and the contents were heated to 87° C. under a nitrogen blanket with agitation. The reactor contents were maintained at 87° C. for one hour. Initiator A was then added to the reactor. After 3 minutes, the first monomer premix was metered into the reactor. About 1 minute after the start of monomer premix feed, Initiator B was metered into the reactor over a period of 175 minutes without interruption at a constant metering rate. After the first monomer premix addition was completed, a solution of 3.33 grams of SLS and 133 grams of D.I. water was added to the reactor. After a 15-minute hold at 87° C., the second monomer premix was metered into the reactor. The total metering time of the two monomer premixes was over a period of 120 minutes at a constant metering rate. The reaction temperature was maintained at 87° C. during the course of the reaction. After completion of initiator B feed, the reaction continued for 60 minutes at a constant metering rate. The reactor contents were then cooled to 49° C. A solution of 0.61 grams of 70% TBHP and 0.38 grams of SLS in 15 grams of D.I. water was then added to the reactor. After 5 minutes, a solution of 0.59 grams of erythorbic acid in 15 grams of D.I. water was added to the reactor. The reactor contents were maintained at 49° C. After 30 minutes, a solution of 0.69 grams of 70% TBHP and 0.29 grams of SLS in 15 grams of D.I. water was added to the reactor. After 5 minutes, a solution of 0.59 grams of erythorbic acid in 15 grams of D.I. water was added to the reactor. The reactor was maintained at 49° C. for about 30 minutes. Then, the reactor contents were cooled to room temperature (approximately 22° C.) and filtered through 100-micron cloth. The polymer emulsion had a solids content of 30.0%.

Example 4

Monomer Composition:
First Stage=EA/n-BA/MAA/HEMA/BEM/AM*(28/12/16/20/4/0.8*wt. % total monomers) (AM*=0.8 wt. part/100 wt. parts monomer)
Second Stage=EA/n-BA/MAA/HEMA/BEM (7/3/4/5/1 wt. % total monomers)
Weight Ratio: 1st stage polymer/2nd stage polymer=8:2

A two-stage emulsion polymer was synthesized as in Example 3, except that the 4 grams of VA-086 in Initiator A was replaced with 0.3 grams of ammonium persulfate, and the 0.75 grams of VA-086 in Initiator B was replaced by 0.4 grams of ammonium persulfate. The polymer emulsion had a solids content of 30.2%.

Example 5

Monomer Composition:
First Stage=EA/n-BA/MAA/HEMA/BEM/AM*(31.5/13.5/18/22.5/4.5/0.8*wt. % total monomers) (AM*=0.8 wt. part/100 wt. parts monomer)

Second Stage=EA/n-BA/MAA/HEMA/BEM/AM*(3.5/1.5/2/2.5/0.5/0.025*wt. % total monomers) (AM*=0.025 wt. part/100 wt. parts monomer)
Weight Ratio: 1st stage polymer:2nd stage polymer=9:1

A two-stage emulsion polymer was prepared as follows. A first monomer premix was prepared by mixing 120 grams of D.I. water, 4 grams of AM, 8.33 grams of SLS, 157.5 grams of EA, 67.5 grams of n-BA, 90 grams of MAA, 112.5 grams of HEMA, and 30 grams of BEM. A second monomer premix was prepared by mixing 40 grams of D.I. water, 1.67 grams of SLS, 17.5 grams of EA, 7.5 grams of n-BA, 10 grams of MAA, 12.5 grams of HEMA, and 6.67 grams of BEM. The total metering time of two monomer premixes was over a period of 120 minutes. Initiator A was prepared by dissolving 4 grams of VA-086 in 40 grams of D.I. water. Initiator B was prepared by dissolving 0.75 grams of VA-086 in 100 grams of D.I. water. A 3-liter reactor was charged with 640 grams of D.I. water, 1.67 grams of SLS and 12.5 grams of PVA, and then was heated to 87® C. under a nitrogen blanket with agitation. The reactor contents were maintained at 87® C. for one hour after which Initiator A was added to the reactor. After 3 minutes, the monomer premix was metered into the reactor. About 1 minute after the start of monomer premix addition, Initiator B was metered into the reactor over a period of 175 minutes without interruption at a constant metering rate. After the first monomer premix addition was completed, a solution of 0.83 grams of SLS and 133 grams of D.I. water was added to the reactor. After a 15-minute hold at 87® C., the second monomer premix was metered into the reactor. The total proportioning time of the two monomer premixes was over a period of 120 minutes at a constant metering rate. The reaction temperature was maintained at 87® C. during the course of the reaction. After completion of initiator B feed, the reaction continued for 60 minutes at a constant metering rate. The reactor contents were then cooled to 49® C. A solution of 0.61 grams of 70% TBHP and 0.38 grams of SLS in 15 grams of D.I. water was added to the reactor. After 5 minutes, a solution of 0.59 grams of erythorbic acid in 15 grams of D.I. water was added to the reactor. The reactor contents were maintained at 49® C. After 30 minutes, a solution of 0.69 grams of 70% TBHP and 0.29 grams of SLS in 15 grams of D.I. water was added to the reactor. After 5 minutes, a solution of 0.59 grams of erythorbic acid in 15 grams of D.I. water was added to the reactor. The reactor contents were maintained at 49® C. for about 30 minutes. Then, the reactor contents were cooled to the room temperature and filtered through 100-micron cloth. The polymer emulsion had a solids content of 30.0%.

Example 6

Monomer Composition:
First Stage=EA/n-BA/MAA/HEMA/BEM/AM*(31.5/13.5/18/22.5/4.5/0.8*wt. % total monomers) (AM*=0.8 wt. part/100 wt. parts monomer)
Second Stage=EA/n-BA/MAA/HEMA/BEM (3.5/1.5/2/2.5/0.5 wt. % total monomers)
Weight Ratio: 1st stage polymer:2nd stage polymer=9:1

A two-stage emulsion polymer was prepared as follows. A first monomer premix was made by mixing 120 grams of D.I. water, 4 grams of AM, 8.33 grams of SLS, 157.5 grams of EA, 67.5 grams of n-BA, 90 grams of MAA, 112.5 grams of HEMA, and 30 grams of BEM. A second monomer premix was made by mixing 40 grams of D.I. water, 1.67 grams of SLS, 17.5 grams of EA, 7.5 grams of n-BA, 10 grams of MAA, 12.5 grams of HEMA, and 3.33 grams of BEM. Initiator A was prepared by dissolving 4 grams of VA-086 in 40 grams of D.I. water. Initiator B was prepared by dissolving 0.75 grams of VA-086 in 100 grams of D.I. water. A 3-liter reactor was charged with 640 grams of D.I. water, 10 grams of PVA, and 1.33 grams of SLS. The reactor contents were then heated to 87® C. under a nitrogen blanket with agitation and maintained for one hour. Initiator A was then added to the reactor. After about 3 minutes, the first monomer premix was metered into the reactor. About 1 minute after the start of first monomer premix feed, Initiator B was metered into the reactor. After the first monomer premix addition was completed, the metering of Initiator B was stopped and a solution of 3.33 grams of SLS and 133 grams of D.I. water was added to the reactor. After a 30-minute hold, the second monomer premix feed was then metered into the reactor and the metering of Initiator B was resumed. The total metering time of first and second monomer premixes was over a period of 75 minutes at a constant metering rate. The total metering time of Initiator B was over a period of 120 minutes at a constant metering rate. After completion of the Initiator B feed, the temperature of the reactor was maintained at 87® C. for an additional 60 minutes. The reactor contents were then cooled to 49® C. A solution of 0.61 grams of 70% TBHP and 0.38 grams of SLS in 15 grams of D.I. water was added to the reactor. After 5 minutes, a solution of 0.59 grams of erythorbic acid in 15 grams of D.I. water was added to the reactor. The reactor contents were maintained at 49® C. After 30 minutes, a solution of 0.64 grams of 70% TBHP and 0.29 grams of SLS in 15 grams of D.I. water was added to the reactor. After 5 minutes, a solution of 0.59 grams of erythorbic acid in 15 grams of D.I. water was added to the reactor. The reactor contents were maintained at 49® C. for about 30 minutes. Then, the reactor contents were cooled to room temperature (approximately 22® C.) and filtered through 100-micron filter cloth. The emulsion polymer had a solids content of 30.7%.

Example 7

Monomer Composition:
First Stage=EA/n-BA/MAA/HEMA/BEM/AM*(31.5/13.5/18/22.5/4.5/0.8*wt. % total monomers) (AM*=0.8 wt. part/100 wt. parts monomer)
Second Stage=EA/n-BA/MAA/HEMA/BEM/AM*(3.5/1.5/2/2.5/0.5/0.025 wt. % total monomers) (AM*=0.025 wt. part/100 wt. parts monomer)
Weight Ratio: 1st stage polymer:2nd stage polymer=9:1

A two-stage emulsion polymer was prepared as follows. A first monomer premix was made by mixing 120 grams of D.I. water, 4 grams of AM, 8.33 grams of SLS, 157.5 grams of EA, 67.5 grams of n-BA, 90 grams of MAA, 112.5 grams of HEMA, and 30 grams of BEM. A second monomer premix was made by mixing 40 grams of D.I. water, 0.125 grams of AM, 1.67 grams of SLS, 17.5 grams of EA, 7.5 grams of n-BA, 10 grams of MAA, 12.5 grams of HEMA, and 3.35 grams of BEM. Initiator A was prepared by dissolving 4 grams of VA-086 in 40 grams of D.I. water. Initiator B was prepared by dissolving 0.75 grams of VA-086 in 100 grams of D.I. water. A 3-liter reactor was charged with 640 grams of D.I. water, 10 grams of PVA, and 1.33 grams of SLS. The reactor contents were then heated to 87® C. under a nitrogen blanket with agitation and maintained for I hour. Initiator A was then added to the reactor. After about 3 minutes, the first monomer premix was metered into the reactor. About 1 minute after the start of first monomer premix feed, Initiator B was metered into the reactor. After the first monomer premix addition was completed, the metering of Initiator B was stopped and a solution of 3.33 grams of SLS and 133 grams of D.I. water was added to the reactor. After a 30-minute hold, the second monomer premix feed was then metered into the reactor and the metering of Initiator B was resumed. The reactor was kept at 87® C. throughout the polymerization. The total metering time of first and second monomer premixes was over a period of 75 minutes at a constant metering rate. The total metering time of Initiator B was over a period of 120 minutes at a constant metering rate. After completion of the Initiator B feed, the temperature of the reactor was maintained at 87® C. for an additional 60 minutes at a constant metering rate. The reactor contents were then cooled to 49® C. A solution of 0.61 grams of 70% TBHP and 0.38 grams of SLS in 15 grams of D.I. water was added to the reactor. After 5 minutes, a solution of 0.59 grams of erythorbic acid in 15 grams of D.I. water was added to the reactor. The reactor contents were maintained at 49® C. After 30 minutes, a solution of 0.64 grams of 70% TBHP and 0.29 grams of SLS in 15 grams of D.I. water was added to the reactor. After 5 minutes, a solution of 0.59 grams of erythorbic acid in 15 grams of D.I. water was added to the reactor. The reactor contents were maintained at 49® C. for about 30 minutes. Then, the reactor contents were cooled to room temperature (approximately 22® C.) and filtered through 100-micron filter cloth. The emulsion polymer had a solids content of 30.5%.

Example 8

Monomer Composition:
First Stage=EA/n-BA/MAA/HEMA/BEM/AM*(31.5/13.5/18/22.5/4.5/0.72*wt. % total monomers) (AM*=0.72 wt. part/100 wt. parts monomer)
Second Stage=EA/n-BA/MAA/HEMA/BEM (3.5/1.5/0/4.5/0.5 wt. % total monomers)
Weight Ratio: 1st stage polymer:2nd stage polymer=9:1

A two-stage emulsion polymer was synthesized as in Example 3. The polymer emulsion had a solids content of 30.7%.

Example 9

Monomer Composition:
First Stage=EA/n-BA/MAA/HEMA/BEM/TMPTA*(31.5/13.5/18/22.5/4.5/0.27*wt. % total monomers) (APE*=0.27 wt. part/100 wt. parts monomer)
Second Stage=EA/n-BA/MAA/HEMA/BEM (3.5/1.5/2/2.5/0.5 wt. % total monomers)
Weight Ratio: 1st stage polymer:2nd stage polymer=9:1

A two-stage emulsion polymer was synthesized as in Example 6 except no PVA was added to the reactor. The polymer emulsion had a solids content of 30.3%.

Example 10

Monomer Composition:
First Stage=EA/n-BA/MAA/HEMA/BEM/APE*(31.2/13.5/18/22.5/4.5/0.1*wt. % total monomers) (APE*=0.1 wt. part/100 wt. parts monomer)
Second Stage=EA/n-BA/MAA/HEMA/BEM/AM*(3.5/1.5/2/2.5/0.5/0.025 wt. % total monomers) (AM*=0.025 wt. part/100 wt. parts monomer)
Weight Ratio: 1st stage polymer:2nd stage polymer=9:1

A two-stage emulsion polymer was synthesized as in Example 6 except no PVA was added to the reactor. The polymer emulsion had a solids content of 29.3%.

Table 1 summarizes the monomers utilized to prepare the polymers of the Examples.

TABLE 1

| Ex. No. | 1st Stage Monomers | | | | | | 2nd Stage Monomers | | | | | |
|---|---|---|---|---|---|---|---|---|---|---|---|---|
| | EA | BA | MAA | HEMA | BEM | AM | EA | BA | MAA | HEMA | BEM | AM |
| 1 | 35 | 15 | 20 | 25 | 5 | 1 | 0 | 0 | 0 | 0 | 0 | 0 |
| 2 | 28 | 12 | 16 | 20 | 4 | 0.8 | 7 | 3 | 4 | 5 | 1 | 0 |
| 3 | 28 | 12 | 16 | 20 | 4 | 0.8 | 7 | 3 | 4 | 5 | 1 | 0 |
| 4 | 28 | 12 | 16 | 20 | 4 | 0.8 | 7 | 3 | 4 | 5 | 1 | 0 |
| 5 | 31.5 | 13.5 | 18 | 22.5 | 4.5 | 0.8 | 3.5 | 1.5 | 2 | 2.5 | 0.5 | 0.025 |
| 6 | 31.5 | 13.5 | 18 | 22.5 | 4.5 | 0.8 | 3.5 | 1.5 | 2 | 2.5 | 0.5 | 0 |
| 7 | 31.5 | 13.5 | 18 | 22.5 | 4.5 | 0.8 | 3.5 | 1.5 | 2 | 2.5 | 0.5 | 0.025 |
| 8 | 31.5 | 13.5 | 18 | 22.5 | 4.5 | 0.72 | 3.5 | 1.5 | 0 | 4.5 | 0.5 | 0 |
| 9 | 31.5 | 13.5 | 18 | 22.5 | 4.5 | $0.27^1$ | 3.5 | 1.5 | 2 | 2.5 | 0.5 | 0 |
| 10 | 31.5 | 13.5 | 18 | 22.5 | 4.5 | $0.1^2$ | 3.5 | 1.5 | 2 | 2.5 | 0.5 | 0.025 |

[1]TMPTA x-linker
[2]APE x-linker

Examples 11 to 13 (Laundry Detergents)

Three laundry detergent bases were formulated from the components set forth in Table 2. Base A represents an economy detergent formulation base. Base B represents a premium detergent base containing enzymes. Base C represents a highly concentrated economy to medium cost detergent base. The components for each of bases A, B and C were formulated as follows.

1. Coco fatty acid was placed in 40® C. oven to melt.
2. Weigh the alcohol ethoxylate surfactants for requisite Bases. Add requisite alcohol ethoxylate into the melted coco fatty acid (Bases B and C).
3. Add propylene glycol to requisite Base.
4. Add LAS and SLES-2 surfactants to requisite Bases.
5. Mix with blade and heat up to 40® C. and then remove hot plate (all Bases).
6. Add ethanolamine and triethylamine to requisite Bases.
7. Add half the quantity of warm (50® C.) DI water and mix well (all Bases).
8. Add citric acid and etidronic acid to requisite Bases
9. Add remaining water (all Bases).
10. Add SXS to requisite Base and mix well.
11. Add NaOH solution to desired target pH (all Bases).

The final formulations were prepared by post-adding the emulsion polymer into the pre-made Bases (A, B and C) at the given polymer dosage level (Table 3). The Base samples were then mixed with a magnetic stir bar overnight to obtain a homogeneous laundry detergent composition. The comparative single stage polymer of Example 1 and the commercially available ASE polymer were similarly formulated.

TABLE 2

|  | Example 11 (Base A) | Example 12 (Base B) | Example 13 (Base C) |
|---|---|---|---|
| Total active surfactant wt % | 16 | 26 | 31 |
| DI water | q.s. to 100 | q.s. to 100 | q.s. to 100 |
| Polymer (wt. %) | See Table 3 | See Table 3 | See Table 3 |
| LAS | 13.4 | 12.4 | 14.5 |
| Triethylamine | — | — | 1 |
| Ethanolamine | — | 1 | — |
| NaOH (50% solution) | 4 | 2.1 | 4.2 |
| SLES-2 | — | 14.3 | — |
| Coco Fatty Acid | — | 3 | 1 |
| $C_{12}$-$C_{15}$ Ethoxylated (7) Alcohol | — | 7 | 16 |
| $C_{12}$-$C_{15}$ Ethoxylated (9) Alcohol | 3 | — | — |
| SXS | — | — | 1 |
| Propylene glycol | — | 2 | — |
| Citric acid (50% solution) | — | 4 | 2 |
| Etidronic Acid | — | 1 | — |
| pH | 8.0-9.0 | 8-8.5 | 9.0-9.5 |

The rheology, aesthetic and suspension properties of the laundry detergent formulations containing the polymers of the present technology and the comparative polymers were measured and are reported in Table 3.

TABLE 3

| Polymer Ex. No. | Polymer (wt %) | Base | BFV (mPa · s) | Turbidity (NTU) | Visual Clarity | HB Yield Stress (Pa) | Suspension of Small Beads at 45° C. for 12 Weeks |
|---|---|---|---|---|---|---|---|
| 2 | 1.5 | A | 4,750 | 12.6 | Clear | 0.09 | Pass |
| 2 | 2 | A | 10,550 | 9.7 | Clear | 0.39 | Pass |
| 2 | 2.5 | A | 19,500 | 35.7 | Clear | 0.97 | Pass |
| 2 | 1.5 | B | 5,200 | 7.8 | Clear | 0.06 | Pass |
| 2 | 2 | B | 9,950 | 14.2 | Clear | 0.16 | Pass |
| 2 | 2.5 | B | 16,100 | 8.8 | Clear | 0.58 | Pass |
| 1 | 2.5 | B | 6,150 | 17.2 | Clear | 0.07 | Failed |
| ASE Polymer | 2.5 | B | 4,497 | 61.4 | Haze | 0.09 | Failed |
| 2 | 1.5 | C | 2,600 | 48.7 | Clear | 0.05 | Pass |
| 2 | 2 | C | 4,550 | 32.5 | Clear | 0.16 | Pass |
| 2 | 2.5 | C | 7,900 | 19.2 | Clear | 0.27 | Pass |
| 1 | 2.5 | C | 3,620 | 6.2 | Clear | 0 | Failed |
| ASE Polymer | 2.5 | C | 4,723 | 210 | Haze | 0 | Failed |

Formulations prepared with the two-stage polymer of Example 2 exhibited good rheology properties (viscosity and yield stress), gave clear systems and passed the bead suspension test, while formulations containing the comparative single stage polymer demonstrated inferior yield stress properties at identical treat rates. The yield stress of formulation laundry Bases B and C containing 2.5 wt. % of the two-stage polymer Example 2 and the comparative single-stage polymer of Example 1 is plotted in FIG. 1.

Figure 2:
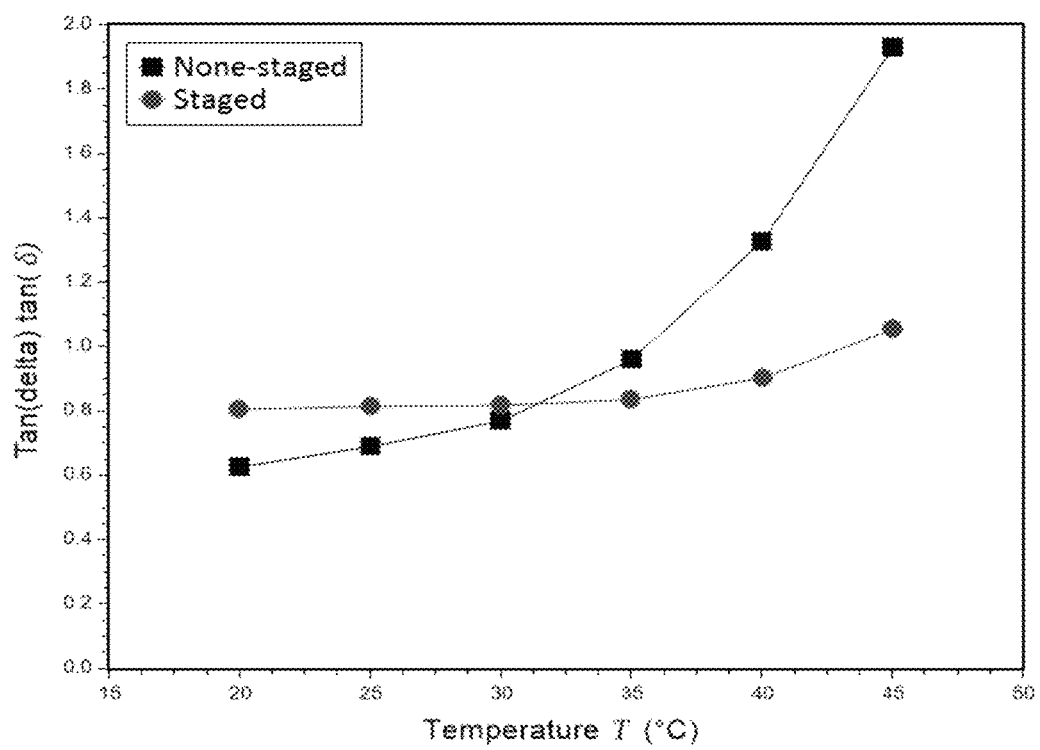
FIG. 2 is a graph plotting temperature (x-axis) versus Tan δ (y-axis) comparing laundry base of 12(B) formulated with 2.5 wt. % of the two-stage polymer of Example 2 and laundry base 12(B) formulated with 2.5 wt. % of the single stage polymer of Comparative Example 1.

An elevated temperature stability evaluation of laundry Base B containing 2.5 wt. % of the two-stage polymer Example 2 compared to 2.5 wt. % of the comparative single-stage polymer of Example 1 was determined by the elevated temperature rheology test, the results of which are plotted in FIG. 2. As shown in the plot laundry Base B containing the two-stage polymer of Example 2 exhibits a lower tan δ value, which is indicative of a more stable composition.

Figure 3:
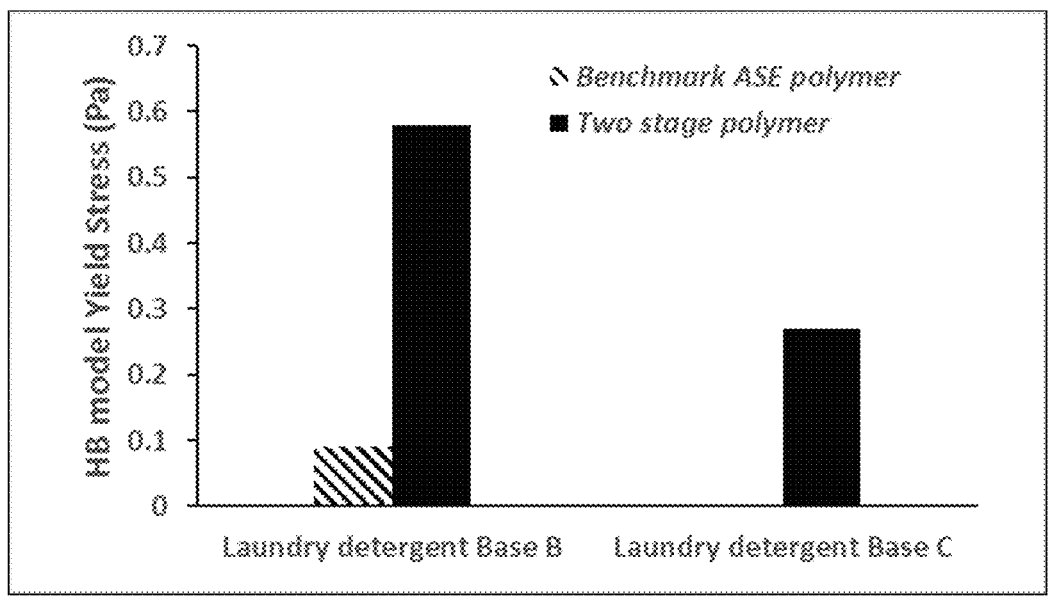
FIG. 3 is a graph comparing the Herschel-Bulkley yield stress values of the laundry bases of Example 12(B) and Example 13(C) each separately formulated with 2.5 wt. % of the two-stage polymer of Example 2 and 2.5 wt. % of a commercially available single stage rheology modifier polymer.

As shown in FIG. 3, laundry Bases B and C containing 2.5 wt. % of the two-stage polymer of Example 2 has significantly higher yield stress values than the identical laundry bases containing 2.5 wt. % of the commercially available ASE polymer.

Figure 4:
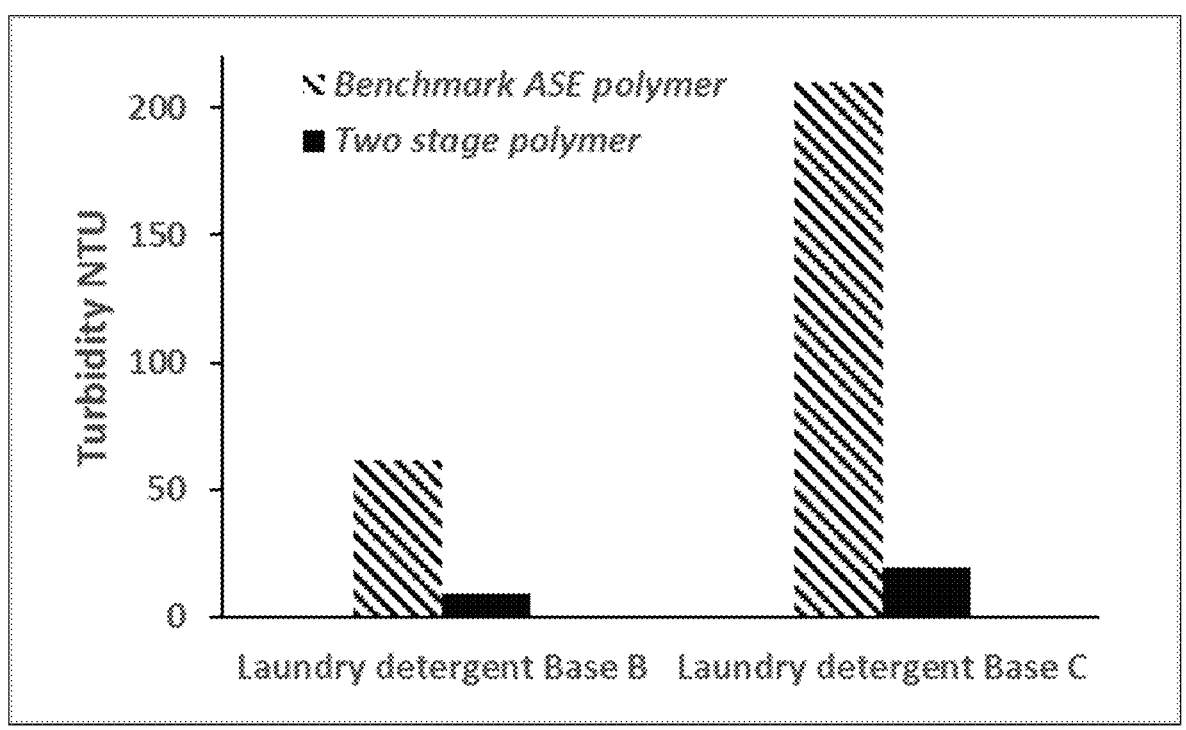
FIG. 4 is a plot of turbidity values (NTU) comparing the laundry detergent bases of Example 12(B) and 13(C) separately formulated with 2.5 wt. % of the two-stage polymer of Example 2 and 2.5 wt. % of a commercially available single-stage rheology modifying polymer.

As illustrated in FIG. 4, laundry Bases B and C containing 2.5 wt. % of the two-stage polymer of Example 2 exhibits significantly lower turbidity values than the identical laundry bases formulated with 2.5 wt. % of the commercially available ASE polymer.

Examples 14 to 17 (Dish Detergents)

Concentrated manual dish washing detergent bases were prepared utilizing the components set forth in Table 4. The components were formulated as follows.
1. Add sodium laureth-2 sulfate to half of the D.I. water.
2. Add CAPB into Part 1 and mix well.
3. Add LAS into Part 2 and mix well.
4. Add NaOH solution to Part 3 to bring the pH up to target pH.

The final detergent formulations were prepared by post-adding the emulsion polymer into the pre-made base at the given polymer dosage level (Table 4) and the remaining water. Samples were mixed with a magnetic stir bar overnight to ensure homogeneous mixing. The rheology, aesthetic and suspension properties of the manual dish washing formulations containing a staged polymer of the present technology were measured and reported in Table 4.

TABLE 4

| Ex. No. | 14 | 15 | 16 | 17 |
|---|---|---|---|---|
| Components | | | | |
| DI water | q.s. to 100 | q.s. to 100. | q.s. to 100 | q.s. to 100 |
| LAS | 7.5 | 7.5 | 7.5 | 7.5 |
| SLES-2 | 7.5 | 7.5 | 7.5 | 7.5 |
| CAPB | 3 | 3 | 3 | 3 |
| Polymer of Ex. No. 2 (wt. %) | 1.8 | 2 | 2.2 | 2.5 |
| NaOH (50% solution) to pH | 8.0-8.5 | 8.0-8.5 | 8.0-8.5 | 8.0-8.5 |

TABLE 4-continued

| Ex. No. | 14 | 15 | 16 | 17 |
|---|---|---|---|---|
| Properties | | | | |
| Turbidity (NTU) | 8.5 | 9.7 | 10.1 | 13.4 |
| HB Yield stress (Pa) | 0.04 | 0.15 | 0.2 | 0.3 |
| Suspension of small beads (45° C., 3 months) | Pass | Pass | Pass | Pass |

Examples 18 to 21 (Facial Soaps)

Facial soap formulations were prepared utilizing the components set forth in Table 5 utilizing the following procedure.
1. Add Part A ingredients together and heat to 70® C. with mixing.
2. Add Part B ingredient to Part A with mixing.
3. Cool Part AB to room temperature while mixing.
4. Add make-up water lost due to evaporation from previous steps.
5. Add Part C ingredients in the order listed one at a time with mixing until uniform.
6. In a separate container, mix Part D ingredients together.
7. Add Part D to the ABCD mixture and mix until uniform.

TABLE 5

| Part | Ingredient (% active) | EX. 18 | EX. 19 | EX. 20 | EX. 21 |
|---|---|---|---|---|---|
| A | DI water | q.s. to 100 | q.s. to 100 | q.s. to 100 | q.s. to 100 |
| | Tetrasodium EDTA | 0.05 | 0.05 | 0.05 | 0.05 |
| | Lauric Acid | 12.00 | 12.00 | 12.00 | 12.00 |
| | Myristic Acid | 2.50 | 2.50 | 2.50 | 2.50 |
| | Palmitic Acid | 0.50 | 0.50 | 0.50 | 0.50 |
| B | Potassium Hydroxide (85%) | 4.25 | 4.25 | 4.25 | 4.25 |
| C | SLES-1 | 4.00 | 4.00 | 4.00 | 4.00 |
| | CAPB | 3.00 | 3.00 | 3.00 | 3.00 |
| D | Polymer Ex. No. 7 (wt. %) | 2.50 | 0 | 2.00 | 0 |
| | Comparative Surfactant Activated Amphiphilic Polymer | 0 | 2.50 | 0 | 2.00 |
| | DI water | q.s. to 100 | q.s. to 100 | q.s to 100. | q.s. to 100 |

Formulations (Examples 18 and 20) containing the dual activated two-stage polymers of the present technology were compared to formulations (Examples 19 and 21) containing a surfactant activated microgel polymer (SAM) which is a single-stage polymer prepared in accordance with Example 17 of WO 2016/100183. The rheology and suspension properties of the soap systems were measured for each soap based formulation and are reported in Table 6.

TABLE 6

| EX. NO. | Polymer | BFV (mPa · s) | Yield Stress[1] (Pa) | Turbidity (NTU) | pH | Suspension of beads (3 months @ 45° C.) |
|---|---|---|---|---|---|---|
| 18 | 2.5 wt. % Polymer Ex. 7 | 4,710 | 5.06 | 17.1 | 9.41 | Passed |
| 19 | 2.5 wt. % SAM Polymer | 1,500 | 1.26 | 18.1 | 9.38 | Passed |
| 20 | 2 wt. % Polymer Ex. 7 | 1,860 | 1.48 | 33.3 | 9.52 | Passed |
| 21 | 2 wt. % SAM Polymer | 730 | 0.48 | 35.5 | 9.36 | Failed |

[1]Crossover Yield Stress Method

As can be determined from the results in Table 6, equivalent amounts the polymer of the present technology formulated into personal care soap formulations exhibit significantly better viscosity profiles and yield stress properties, as well as better clarity than the single-stage SAM polymers prepared in Example 17 of WO 2016/100183.

Examples 22 to 39 (Commercial Dish Detergent Spike Test)

Three commercially available liquid hand dish washing detergents marketed by Procter & Gamble (Belgium market) under the Dreft™ brand were "spike" tested with a two-stage polymer of the present technology, a comparative SAM single-stage polymer prepared in accordance with Example 17 of WO 2016/100183 and a comparative, and a comparative commercially available single stage alkali-swellable emulsion (ASE) polymer (Carbopol™ Aqua SF-1 polymer). The detergents were spiked with the polymer amounts set forth in Table 8. Turbidity, visual clarity and the ability to suspend beads under accelerated oven aging conditions were evaluated and the results reported in Table 8. The publicly available ingredient listing for the tested Dreft™ brand liquid dish detergents are set forth in Table 7.

TABLE 7

| | Dreft ™ Original[1] Detergent (Product A) | Dreft ™ Platinum Original[1] Detergent (Product B) | Dreft ™ Clean & Fresh[1] Detergent (Product C) |
|---|---|---|---|
| Ingredients (INCI Name) | Aqua | Aqua | Aqua |
| | Sodium C12-14 Alkyl Sulfate | Sodium C12-14 Alkyl Sulfate | Sodium C12-14 Alkyl Sulfate |
| | Lauramine Oxide | Lauramine Oxide | Lauramine Oxide |
| | Sodium Laureth Sulfate | Deceth-8 | Sodium Laureth Sulfate |
| | Sodium Lauryl Sulphate | Sodium Laureth Sulfate | Sodium Lauryl Sulphate |
| | Alcohol | Sodium Lauryl Sulphate | Sodium C12-14 Pareth-3 Sulfate |
| | Sodium C12-14 Pareth-3 Sulfate | Alcohol | Sodium Chloride |
| | Sodium Citrate | Sodium C12-14 Pareth-3 Sulfate | PPG-34 |
| | Deceth-8 | Tetrasodium Glutamate Diacetate | PARFUM |
| | PPG-34 | Sodium Chloride | PEG-8 Propylheptyl Ether |
| | Sodium Chloride | 2-Propylheptanol ethoxylated | Phenoxyethanol |
| | 2-Propylheptanol ethoxylated | PARFUM | Sodium Hydroxide |
| | Sodium Hydroxide | PPG-34 | Alcohol |
| | PARFUM | Phenoxyethanol | Linalool |
| | Phenoxyethanol | Sodium Hydroxide | Geraniol |

TABLE 7-continued

| | Dreft ™ Original[1] Detergent (Product A) | Dreft ™ Platinum Original[1] Detergent (Product B) | Dreft ™ Clean & Fresh[1] Detergent (Product C) |
|---|---|---|---|
| | Sodium bicarbonate Methylisothiazolinone Colorant | Methylisothiazolinone Colorant Aqua | Limonene Methylisothiazolinone Colorant |

[1]Obtained in the Belgium market

TABLE 8

| EX. NO. | Formulation | Polymer | Polymer (wt. %) | Turbidity (NTU) | Visual Clarity | HB Yield Stress (Pa) | Suspension Test (3-months @ 45° C.) |
|---|---|---|---|---|---|---|---|
| 22 | Product A | EX. No. 7 | 2.5 | 5.8 | Clear | 1.1 | Large Beads |
| 23 | Product B | EX. No. 7 | 2.5 | 6.6 | Clear | 0.77 | Small-Large Beads |
| 24 | Product C | EX. No. 7 | 2.5 | 8.6 | Clear | 1.48 | Small-Large beads |
| 25 | Product A | EX. No. 7 | 1.5 | 6.8 | Clear | 0.08 | Small Beads |
| 26 | Product B | EX. No. 7 | 1.5 | 10 | Clear | 0.07 | Small Beads |
| 27 | Product C | EX. No. 7 | 1.5 | 7.4 | Clear | 0.16 | Small-Medium Beads |
| 28 | Product A | SAM | 2.5 | 6.3 | Clear | 0.14 | Failed |
| 29 | Product B | SAM | 2.5 | 9.9 | Hazy | 0 | Failed |
| 30 | Product C | SAM | 2.5 | 7.5 | Clear | 0.76 | Small-Large Beads |
| 31 | Product A | SAM | 1.5 | 11.1 | Clear | 0 | Failed |
| 32 | Product B | SAM | 1.5 | 31 | Hazy | 0 | Failed |
| 33 | Product C | SAM | 1.5 | 11 | Clear | 0 | Failed |
| 34 | Product A | ASE | 2.5 | 23.2 | Clear | 0.42 | Small-Big Beads |
| 35 | Product B | ASE | 2.5 | 12.4 | Clear | 0.32 | Small-Big Beads |
| 36 | Product C | ASE | 2.5 | 92.9 | Opaque | 0.38 | Small-Big Beads |
| 37 | Product A | ASE | 1.5 | 60.9 | Haze | 0 | Failed |
| 38 | Product B | ASE | 1.5 | 33.3 | Haze | 0.01 | Failed |
| 39 | Product C | ASE | 1.5 | 242 | Opaque | 0 | Failed |

For all the spiked commercial liquid dish detergents, the two-stage polymers of the present technology exhibited overall better turbidity, visual clarity, yield stress and bead suspension properties than the single-stage SAM and ASE comparative polymers.

What is claimed is:

1. A staged emulsion polymer comprising:
(A) from about 50 to about 95 percent by weight of a first stage crosslinked polymer core which is prepared by polymerizing a first monomer mixture comprising: (a) from about 25 to about 60 weight percent of at least one $C_1$-$C_8$ alkyl (meth)acrylate monomer; (b) from about 10 to about 30 weight percent of at least one ethylenically unsaturated $C_3$-$C_6$ carboxylic acid monomer; (c) from about 10 to about 40 weight percent of at least one $C_1$-$C_5$ hydroxyalkyl ester of (meth)acrylic acid monomer; (d) from about 1 to about 20 weight percent of at least one monomer selected from an associative monomer, a semi-hydrophobic monomer, and mixtures thereof; and (e) from about 0.05 to about 1.5 weight percent of at least one crosslinker per 100 parts by weight of the monomer mixture; and
(B) from about 5 to about 50 percent by weight of a second stage polymer shell which is prepared by polymerizing a second monomer mixture comprising: (a') from about 20 to about 60 weight percent of at least one $C_1$-$C_8$ alkyl (meth)acrylate monomer; (b') from 0 to about 40 weight percent of at least one ethylenically unsaturated $C_3$-$C_6$ carboxylic acid monomer; (c') from 0 to about 40 weight percent of at least one $C_1$-$C_5$ hydroxyalkyl ester of (meth)acrylic acid; (d') from 0 to about 10 weight percent of at least one monomer selected from an associative monomer, a semi-hydrophobic monomer, and mixtures thereof; and (e') from 0 to about 0.3 parts by weight of at least one crosslinker per 100 parts by weight of the monomer mixture, subject to the proviso that when present said the at least one second stage crosslinker ranges from greater than 0 percent to about 25 percent of the amount of crosslinker in said first monomer mixture.

2. A staged emulsion polymer of claim 1, wherein the sum of the at least one monomer b and the at least one monomer c in said first monomer mixture ranges from about 25 to about 55 wt. % of said first monomer mixture.

3. A staged emulsion polymer of claim 1, wherein the sum of the at least one monomer b' and the at least one monomer c' in said second monomer mixture ranges from about 25 to about 55 wt. % of said second monomer mixture.

4. A staged emulsion polymer of claim 1, wherein said at least one $C_1$-$C_8$ alkyl (meth)acrylate monomer in said first monomer mixture and in said second monomer mixture is independently selected from methyl (meth)acrylate, ethyl (meth)acrylate, n-butyl (meth)acrylate, t-butyl (meth)acrylate, ethylhexyl (meth)acrylate, and mixtures thereof.

5. A staged emulsion polymer of claim 1, wherein said at least one $C_1$-$C_8$ alkyl (meth)acrylate monomer in said first monomer mixture and in said second monomer mixture is independently selected from ethyl acrylate, butyl acrylate, ethylhexyl acrylate, and mixtures thereof.

6. A staged emulsion polymer of claim 1, wherein said at least one ethylenically unsaturated $C_3$-$C_6$ carboxylic acid monomer in said first monomer mixture and in said second monomer mixture is independently selected from acrylic acid, methacrylic acid, itaconic acid, citraconic acid, maleic acid, maleic anhydride, fumaric acid, crotonic acid, aconitic acid, and mixtures thereof.

7. A staged emulsion polymer of claim 1, wherein said at least one $C_1$-$C_5$ hydroxyalkyl ester of (meth)acrylic acid monomer in said first monomer mixture and in said second monomer mixture is independently selected from hydroxyethyl (meth)acrylate, hydroxypropyl (meth)acrylate, and mixtures thereof.

8. A staged emulsion polymer of claim 1, wherein said at least one $C_1$-$C_5$ hydroxyalkyl ester of (meth)acrylic acid monomer in said first monomer mixture and in said second monomer mixture is independently selected from hydroxyethyl acrylate, hydroxyethyl methacrylate, hydroxypropyl acrylate, hydroxypropyl methacrylate, and mixtures thereof.

9. A staged emulsion polymer of claim 1, wherein said at least one associative monomer in said first monomer mixture and in said second monomer mixture includes (i) an ethylenically unsaturated end group portion; (ii) a polyoxyalkylene mid-section portion, and (iii) a hydrophobic end group portion containing 8 to 30 carbon atoms.

10. A staged emulsion polymer of claim 1, wherein said at least one semi-hydrophobic monomer in said first monomer mixture and in said second monomer mixture includes (i) an ethylenically unsaturated end group portion; (ii) a polyoxyalkylene mid-section portion, and (iii) an end group portion selected from hydrogen or an alkyl group containing 1 to 4 carbon atoms.

11. A staged emulsion polymer of claim 1, wherein said at least one associative monomer in said first monomer mixture and in said second monomer mixture is independently selected from a monomer represented by formulas (III) and (IV):

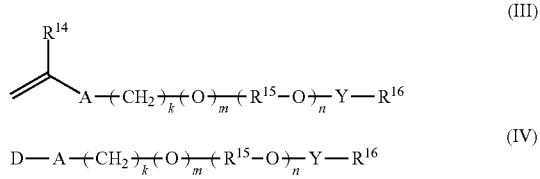

wherein $R^{14}$ is hydrogen or methyl; A is —$CH_2C(O)O$—, —$C(O)O$—, —$O$—, —$CH_2O$—, —$NHC(O)NH$—, —$C(O)NH$—, —$Ar$—$(CE_2)_z$-$NHC(O)O$—, —$Ar$—$(CE_2)_z$-$NHC(O)NH$—, or —$CH_2CH_2NHC(O)$—; Ar is a divalent arylene; E is H or methyl; z is 0 or 1; k is an integer ranging from 0 to about 30, and m is 0 or 1, with the proviso that when k is 0, m is 0, and when k is in the range of 1 to about 30, m is 1; D represents a vinyl or an allyl moiety; $(R^{15}$—$O)_n$ is a polyoxyalkylene moiety, which can be a homopolymer, a random copolymer, or a block copolymer of $C_2$-$C_4$ oxyalkylene units, $R^{15}$ is a divalent alkylene moiety selected from $C_2H_4$, $C_3H_6$, or $C_4H_8$, and combinations thereof; and n is an integer in the range of about 2 to about 150; Y is —$R^{15}O$—, —$R^{15}NH$—, —$C(O)$—, —$C(O)NH$—, —$R^{15}NHC(O)NH$—, or —$C(O)NHC(O)$—; $R^{16}$ is a substituted or unsubstituted alkyl selected from a $C_8$-$C_{30}$ linear alkyl, a $C_8$-$C_{30}$ branched alkyl, a $C_8$-$C_{30}$ carbocyclic alkyl, a $C_2$-$C_{30}$ alkyl-substituted phenyl, an araalkyl substituted phenyl, and an aryl-substituted $C_2$-$C_{30}$ alkyl; wherein the $R^{16}$ alkyl group, aryl group, phenyl group optionally includes one or more substituents selected from the group consisting of a hydroxyl group, an alkoxyl group, benzyl group styryl group, and a halogen group.

12. A staged emulsion polymer of claim 1, wherein said at least one associative monomer in said first monomer mixture and in said second monomer mixture is independently selected from a monomer represented by formula (V):

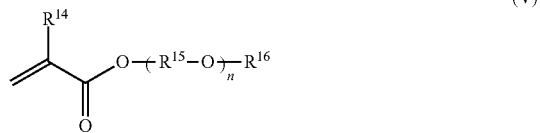

wherein $R^{14}$ is hydrogen or methyl; $R^{15}$ is a divalent alkylene moiety independently selected from $C_2H_4$, $C_3H_6$, and $C_4H_8$, and n represents an integer ranging from about 10 to about 60, ($R^{15}$—$O$) can be arranged in a random or a block configuration; $R^{16}$ is a substituted or unsubstituted alkyl selected from a $C_8$-$C_{30}$ linear alkyl, a $C_8$-$C_{30}$ branched alkyl, a $C_8$-$C_{30}$ carbocyclic alkyl, a $C_2$-$C_{30}$ alkyl-substituted phenyl, an araalkyl substituted phenyl, and an aryl-substituted $C_2$-$C_{30}$ alkyl, wherein the $R^{16}$ alkyl group, aryl group, phenyl group optionally comprises one or more substituents selected from the group consisting of a hydroxyl group, an alkoxyl group, benzyl group styryl group, and a halogen group.

13. A staged emulsion polymer of claim 1, wherein said at least one associative monomer in said first monomer mixture and in said second monomer mixture is independently selected from lauryl polyethoxylated (meth)acrylate, cetyl polyethoxylated (meth)acrylate, cetearyl polyethoxylated (meth)acrylate, stearyl polyethoxylated (meth)acrylate, arachidyl polyethoxylated (meth)acrylate, behenyl polyethoxylated (meth)acrylate, cerotyl polyethoxylated (meth)acrylate, montanyl polyethoxylated (meth)acrylate, melissyl polyethoxylated (meth)acrylate, and mixtures thereof, wherein the polyethoxylated portion of the monomer contains about 2 to about 50 ethylene oxide units.

14. A staged emulsion polymer of claim 1, wherein said at least one semi-hydrophobic monomer in said first monomer mixture and in said second monomer mixture is independently selected from a monomer represented by formulas (VI) and (VII):

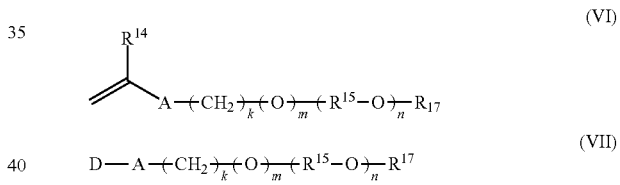

wherein $R^{14}$ is hydrogen or methyl; A is —$CH_2C(O)O$—, —$C(O)O$—, —$O$—, —$CH_2O$—, —$NHC(O)NH$—, —$C(O)NH$—, —$Ar$—$(CE_2)_z$-$NHC(O)O$—, —$Ar$—$(CE_2)_z$-$NHC(O)NH$—, or —$CH_2CH_2NHC(O)$—; Ar is a divalent arylene; E is H or methyl; z is 0 or 1; k is an integer ranging from 0 to about 30, and m is 0 or 1, with the proviso that when k is 0, m is 0, and when k is in the range of 1 to about 30, m is 1; $(R^{15}$—$O)_n$ is a polyoxyalkylene moiety, which can be a homopolymer, a random copolymer, or a block copolymer of $C_2$-$C_4$ oxyalkylene units, $R^{15}$ is a divalent alkylene moiety selected from $C_2H_4$, $C_3H_6$, or $C_4H_8$, and combinations thereof; and n is an integer in the range of about 2 to about 150; $R^{17}$ is selected from hydrogen and a linear or branched $C_1$-$C_4$ alkyl group; and D represents a vinyl or an allyl moiety.

15. A staged emulsion polymer of claim 1, wherein said at least one semi-hydrophobic monomer in said first monomer mixture and in said second monomer mixture is independently selected from a monomer represented by formulas by formulas (VIII) and (IX):

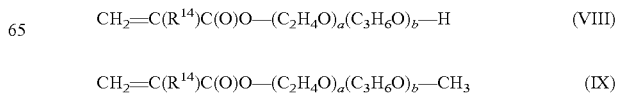

wherein $R^{14}$ is hydrogen or methyl, and "a" is an integer ranging from 0 or 2 to about 120; and "b" is an integer ranging from 0 or 2 to about 120, subject to the proviso that "a" and "b" cannot be 0 at the same time.

16. A staged emulsion polymer of claim 1, wherein said at least one semi-hydrophobic monomer in said first monomer mixture and in said second monomer mixture is independently selected from methoxy polyethyleneglycol (meth)acrylate, polyethyleneglycol (meth)acrylate, and mixtures thereof, wherein the polyethoxylated portion of the monomer contains about 2 to about 50 ethylene oxide units.

17. A staged emulsion polymer of claim 1, wherein the said at least one crosslinker is selected from a polyunsaturated monomer, an amphiphilic crosslinking surfactant, and mixtures thereof.

18. A staged emulsion polymer of claim 17, wherein the said at least one polyunsaturated monomer crosslinker is selected from polyallyl ethers of trimethylolpropane, polyallyl ethers of pentaerythritol, polyallyl ethers of sucrose, and mixtures thereof.

19. A staged emulsion polymer of claim 17, wherein the said at least one polyunsaturated monomer crosslinker is selected from pentaerythritol diallyl ether, pentaerythritol triallyl ether, pentaerythritol tetraallyl ether, and mixtures thereof.

20. A staged emulsion polymer of claim 17, wherein the said at least one polyunsaturated monomer crosslinker is present in said monomer mixture in an amount from about 0.05 to about 1 parts by wt. per 100 parts by weight of the monomer mixture.

21. A staged emulsion polymer of claim 17, wherein the said at least one amphiphilic crosslinking surfactant is represented by the formula:

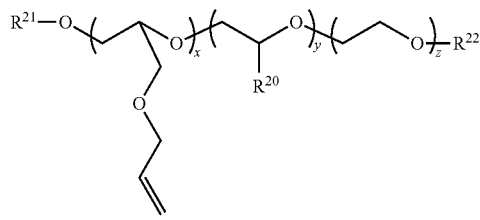

wherein:
$R^{21}$ is a $C_{10-24}$ alkyl, alkaryl, alkenyl, or cycloalkyl;
$R^{20}$ is $CH_3$, $CH_2CH_3$, $C_6H_5$, or $C_{14}H_{29}$;
$R^{22}$ is H or $Z^-M^+$;
$Z^-$ is $SO_3^-$, or $PO_3^{2-}$;
$M^+$ is $Na^+$, $K^+$, $NH_4^+$, or an alkanolamine;
x is 2-10;
y is 0-200; and
z is 4-200.

22. A staged emulsion polymer of claim 17, wherein the said at least one amphiphilic crosslinking surfactant is represented by the formula:

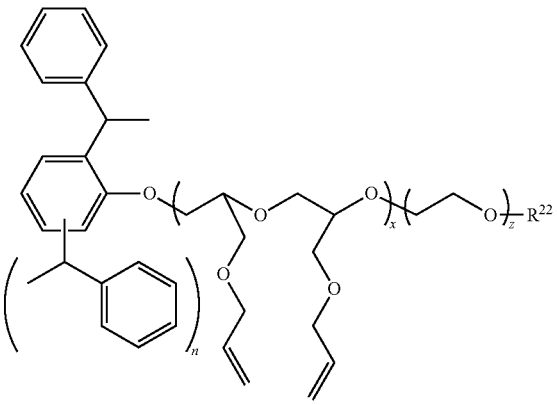

wherein:
n is 1 or 2;
x is 1-4
z is 4 to 40; and
$R^{22}$ is H, $SO_3^-M^+$ or $PO_3^{2-}M^+$, and M is selected from $Na^+$, $K^+$, $NH_4^+$ or an alkanolamine.

23. A staged emulsion polymer of claim 17, wherein the said at least one amphiphilic crosslinking surfactant is represented by the formula:

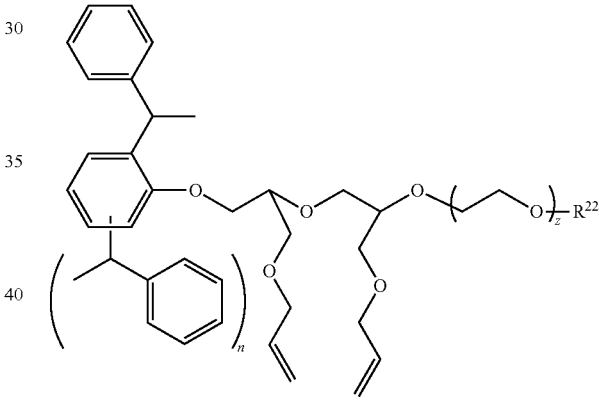

wherein:
n is 1 or 2;
z is 4 to 40; and
$R^{22}$ is H, $SO_3^-M^+$ or $PO_3^{2-}M^+$, and M is selected from $Na^+$, $K^+$, $NH_4^+$ or an alkanolamine.

24. A staged emulsion polymer of claim 17, wherein the said at least one amphiphilic crosslinking surfactant is present in said first monomer mixture in an amount ranging from about 0.1 to about 1.5 parts by wt. per 100 parts by weight of the monomer mixture.

25. A staged emulsion polymer of claim 1, wherein said first monomer mixture and/or said second monomer mixture further comprises at least one monomer selected from a $C_{10}$-$C_{22}$ alkyl (meth)acrylate.

26. A staged emulsion polymer of claim 1, wherein said first monomer mixture and/or said second monomer mixture further comprises a monomer selected from decyl methacrylate, lauryl methacrylate, tetradecyl methacrylate; stearyl methacrylate; behenyl methacrylate, and mixtures thereof.

27. A staged emulsion polymer of claim 1, wherein said first monomer mixture comprises from about 20 to about 30 wt. % ethyl acrylate, from about 7 to about 15 wt. % butyl acrylate, from about 10 to about 20 wt. % methacrylic acid, from about 15 to about 25 wt. % of hydroxyethyl methacrylate, from about 1 to about 7 wt. % of an associative monomer, and from about 0.1 to about 1 part by wt. % based on 100 wt. parts of said monomer mixture of at least one crosslinking agent selected from an amphiphilic crosslinking surfactant.

28. A staged emulsion polymer of claim 1, wherein said second monomer mixture comprises from about 5 to about 10 wt. % ethyl acrylate, from about 1 to about 5 wt. % butyl acrylate, from 0 or 1 to about 6 wt. % methacrylic acid, from 0 or 1 to about 7 wt. % of hydroxyethyl methacrylate, from about 0.1 to about 3 wt. % of an associative monomer, and from about 0.5 to about 1.25 wt. parts of an amphiphilic crosslinking surfactant, based on 100 wt. parts of said monomer composition.

29. A staged emulsion polymer of claim 1, wherein said second monomer mixture comprises 0 or 0.01 to about 0.5 wt. parts of an amphiphilic crosslinking surfactant, based on 100 wt. parts of said monomer composition.

30. A staged emulsion polymer of claim 1, wherein said second stage polymer is linear.

31. A staged emulsion polymer of claim 1, wherein said first monomer mixture contains a protective colloid.

32. A staged emulsion polymer of claim 1, wherein said first monomer mixture contains a protective colloid selected from poly(vinyl alcohol), poly(vinyl acetate), and mixtures thereof.

33. A detersive composition comprising:
(A) water;
(B) about 0.1 to about 5 wt. % of at least one staged emulsion polymer of claim 1; and
(C) from about 5 to about 50 wt. % based on the total weight of the composition of at least one surfactant.

34. A detersive composition of claim 33, wherein the said at least one surfactant is selected from an anionic surfactant, cationic surfactant, amphoteric surfactant, nonionic surfactant, and mixtures thereof.

35. A detersive composition of claim 33, wherein said composition is a laundry detergent, or a dish washing detergent, or an automatic dish washing detergent, or a car wash detergent, or a hard surface cleaner.

36. A detersive composition of claim 33, wherein said composition is a personal care cleansing detergent selected from shampoos, 2-in-1 conditioning shampoos, body washes, liquid hand soaps, and facial cleansers.

37. An aqueous composition comprising:
(A) water;
(B) about 0.1 to about 5 wt. % of at least one staged emulsion polymer of claim 1.

38. An aqueous composition of claim 37, further comprising a neutralizer.

* * * * *